(12) United States Patent
Hosek et al.

(10) Patent No.: US 10,488,851 B2
(45) Date of Patent: Nov. 26, 2019

(54) SCALABLE MOTION CONTROL SYSTEM

(71) Applicant: Brooks Automation, Inc., Chelmsford, MA (US)

(72) Inventors: Martin Hosek, Lowell, MA (US); Stuart Beale, Lowell, MA (US); Roumen Botev, Groton, MA (US); Matthew Coady, Hollis, NH (US); Christopher Hofmeister, Hampstead, NH (US); Mark Ives, Merrimack, NH (US); Jairo Moura, Marlboro, MA (US); Robert Caveney, Windham, NH (US)

(73) Assignee: BROOKS AUTOMATION, INC., Chelmsford, MA (US)

( * ) Notice: Subject to any disclaimer, the term of this patent is extended or adjusted under 35 U.S.C. 154(b) by 846 days.

(21) Appl. No.: 14/698,110

(22) Filed: Apr. 28, 2015

(65) Prior Publication Data

US 2016/0018816 A1    Jan. 21, 2016

Related U.S. Application Data

(62) Division of application No. 13/011,970, filed on Jan. 24, 2011, now Pat. No. 9,020,617, which is a division (Continued)

(51) Int. Cl.
G05B 19/418 (2006.01)
G05B 19/414 (2006.01)

(52) U.S. Cl.
CPC ..... *G05B 19/4185* (2013.01); *G05B 19/4148* (2013.01); *G05B 2219/31207* (2013.01); *G05B 2219/33277* (2013.01); *Y02P 90/18* (2015.11)

(58) Field of Classification Search
CPC .......... G05B 19/4185; G05B 19/4148; G05B 2219/33277; G05B 2219/31207; Y02P 90/18

(Continued)

(56) References Cited

U.S. PATENT DOCUMENTS 3,699,317 A    10/1972  Middleditch
3,843,875 A    10/1974  Goodstal et al.
(Continued)

FOREIGN PATENT DOCUMENTS

EP    989498    3/2000
EP    1304604    4/2003
JP    2004280195    10/2004

OTHER PUBLICATIONS

Taiwan IPO Search Report, Taiwan Application No. 095120309 dated Nov. 13, 2013.

(Continued)

*Primary Examiner* — Thomas C Lee
*Assistant Examiner* — Anzuman Sharmin
(74) *Attorney, Agent, or Firm* — Perman & Green, LLP; Colin C. Durham

(57) ABSTRACT

A control system includes a clustered architecture having a master controller, a central control section including one or more first remote controllers under direct control of the master controller, and a distributed control section including a cluster controller controlled by the master controller. The cluster controller controls the activities of one or more second remote controllers. Each of the first and second remote controllers are utilized to drive one or more axes.

8 Claims, 46 Drawing Sheets

Related U.S. Application Data of application No. 11/178,615, filed on Jul. 11, 2005, now Pat. No. 7,904,182.

(60) Provisional application No. 60/688,636, filed on Jun. 8, 2005.

(58) Field of Classification Search
USPC .......................................................... 700/45
See application file for complete search history.

(56) References Cited

U.S. PATENT DOCUMENTS

| | | | |
|---|---|---|---|
| 4,358,822 A | 11/1982 | Sanchez | |
| 4,398,720 A | 8/1983 | Jones et al. | |
| 4,484,287 A | 11/1984 | Gama et al. | |
| 4,549,261 A | 10/1985 | Al Mouhamed | |
| 4,558,265 A | 12/1985 | Hayashida et al. | |
| 4,691,694 A | 9/1987 | Boyd et al. | |
| 4,727,303 A | 2/1988 | Morse et al. | |
| 4,734,866 A | 3/1988 | Bartelt et al. | |
| 4,745,857 A | 5/1988 | Putnam et al. | |
| 4,756,204 A | 7/1988 | Wittwer et al. | |
| 4,773,025 A | 9/1988 | Penkar et al. | |
| 4,804,170 A | 2/1989 | Young et al. | |
| 4,864,492 A * | 9/1989 | Blakely-Fogel | G06F 15/161 |
| | | | 706/45 |
| 4,925,312 A | 5/1990 | Onaga et al. | |
| 4,962,338 A * | 10/1990 | Daggett | G05B 19/4141 |
| | | | 318/568.11 |
| 4,967,126 A | 10/1990 | Gretz et al. | |
| 4,972,131 A | 11/1990 | Kojyo et al. | |
| 4,975,856 A | 12/1990 | Vold et al. | |
| 4,999,553 A | 3/1991 | Seraji | |
| 5,001,646 A | 3/1991 | Caldwell et al. | |
| 5,019,968 A | 5/1991 | Wang et al. | |
| 5,025,385 A | 6/1991 | Froyd | |
| 5,038,089 A | 8/1991 | Szakaly | |
| 5,086,401 A * | 2/1992 | Glassman | A61B 34/20 |
| | | | 606/53 |
| 5,129,044 A | 4/1992 | Kashiwagi et al. | |
| 5,144,549 A | 9/1992 | Youcef-Toumi | |
| 5,179,514 A | 1/1993 | Rastegar et al. | |
| 5,214,749 A | 5/1993 | Brown | |
| 5,245,263 A * | 9/1993 | Tsai | B25J 9/042 |
| | | | 318/46 |
| 5,263,662 A | 11/1993 | Fowler et al. | |
| 5,331,881 A | 7/1994 | Fowler et al. | |
| 5,386,499 A | 1/1995 | Tokita | |
| 5,438,746 A * | 8/1995 | Demarest | A61B 17/06004 |
| | | | 163/1 |
| 5,465,212 A | 11/1995 | Fowler et al. | |
| 5,684,375 A | 11/1997 | Chafee et al. | |
| 5,740,449 A | 4/1998 | Densham et al. | |
| 5,742,138 A | 4/1998 | Kato et al. | |
| 5,751,130 A | 5/1998 | Hart et al. | |
| 5,784,542 A * | 7/1998 | Ohm | B25J 3/04 |
| | | | 700/247 |
| 5,881,077 A | 3/1999 | Densham et al. | |
| 5,898,878 A | 4/1999 | Densham et al. | |
| 5,963,444 A | 10/1999 | Shidara et al. | |
| 6,028,410 A * | 2/2000 | Leavitt | B25J 9/1664 |
| | | | 318/568.15 |
| 6,037,733 A | 3/2000 | Genov et al. | |
| 6,246,929 B1 | 6/2001 | Kaloust | |
| 6,275,778 B1 * | 8/2001 | Shimada | B25J 9/1633 |
| | | | 100/245 |
| 6,298,283 B1 * | 10/2001 | Kato | B25J 9/1676 |
| | | | 318/16 |
| 6,317,651 B1 * | 11/2001 | Gerstenberger | B25J 9/1664 |
| | | | 700/245 |
| 6,330,483 B1 | 12/2001 | Dailey | |
| 6,434,448 B1 | 8/2002 | Kosaka et al. | |
| 6,470,225 B1 | 10/2002 | Yutkowitz | |
| 6,643,563 B2 | 11/2003 | Hosek et al. | |
| 6,990,430 B2 | 1/2006 | Hosek | |
| 7,163,179 B1 | 1/2007 | Taylor | |
| 7,337,256 B2 | 2/2008 | Hosek et al. | |
| 7,406,029 B1 * | 7/2008 | Ciancaglini | H04B 10/03 |
| | | | 370/216 |
| 2001/0008985 A1 | 7/2001 | Wada | |
| 2003/0020421 A1 | 1/2003 | Vu et al. | |
| 2003/0108415 A1 | 6/2003 | Hosek et al. | |
| 2004/0002778 A1 | 1/2004 | Giamona et al. | |
| 2004/0044432 A1 | 3/2004 | Franz | |
| 2004/0073336 A1 * | 4/2004 | Huang | B25J 9/1674 |
| | | | 700/245 |
| 2004/0074877 A1 | 4/2004 | Hochhalter | |
| 2004/0108828 A1 * | 6/2004 | Jung | G05B 19/4062 |
| | | | 318/652 |
| 2004/0124802 A1 | 7/2004 | Brogardh et al. | |
| 2004/0143369 A1 | 7/2004 | Takenaka et al. | |
| 2004/0158666 A1 | 8/2004 | Korowitz | |
| 2004/0167743 A1 | 8/2004 | Hosek | |
| 2005/0075755 A1 | 4/2005 | Takenaka et al. | |
| 2006/0109376 A1 | 5/2006 | Chaffee et al. | |
| 2006/0138975 A1 | 6/2006 | Lim et al. | |
| 2007/0010898 A1 | 1/2007 | Hosek et al. | |
| 2007/0041545 A1 * | 2/2007 | Gainsboro | H04M 3/2281 |
| | | | 379/188 |

OTHER PUBLICATIONS

Moura et al: "Neural Network Based Perturbation Identification Approach for High Accuracy Tracking control of Robotic Manipulators" Proceedings of the International Mechanical Engineering Congress and Exposition dated Nov. 1, 2003, pp. 1189-1197.

Martin Hosek: "Clustered-Archtecture Motion Control System Utilizing IEEE 1394b Communication Network" 2005 American Control Conference. Proceedings of the 2005 Portland, OR, USA Jun. 8-10, 2005.

\* cited by examiner

FIG. 17

| QUADLET # | 31 | 30-16 | 15-8 | 7-0 |
|---|---|---|---|---|
| 0 | D | MESSAGE TYPE | MESSAGE ID | RESERVED |
| 1 | MESSAGE HEADER | | | |
| 2 | MESSAGE BODY | | | |
| ... | | | | |
| n | | | | |

NAME: MESSAGE HEADER (1705), MESSAGE BODY 1700, 1710, 1715, 1720, 1725

FIG. 18

| QUADLET # | 31-24 | 23-16 | 15-8 | 7-0 |
|---|---|---|---|---|
| 0 | D / OPERATION | MESSAGE TYPE / AXIS ID: 0-AXIS 0, 1-AXIS 1 | MESSAGE ID / VENDOR COMMAND ID BITS 15 (MSB)-0 (LSB) | RESERVED |
| 1 | MESSAGE HEADER / VENDOR SPECIFIC HEADER | | | |
| 2 | COMMAND PARAMETER 1 | | | |
| ... | ... | | | |
| n | COMMAND PARAMETER n | | | |

DESCRIPTION 1800, 1810, 1820, 1825, 1830, 1835, 1840, 1845

FIG.19

| QUADLET # | NAME | 31-24 | 23-16 | 15-8 | 7-0 |
|---|---|---|---|---|---|
| 0 | MESSAGE HEADER | 0 | MESSAGE TYPE | MESSAGE ID | RESERVED |
| 1 | MESSAGE BODY | VENDOR SPECIFIC | | | |
| 2 | | | | | |
| ... | | | | | |
| n | | | | | |

| QUADLET # | NAME | 31-24 | 23-16 | 15-8 | 7-0 |
|---|---|---|---|---|---|
| 0 | MESSAGE HEADER | 0 | MESSAGE TYPE | MESSAGE ID | RESERVED |
| 1 | EVENT PARAMETER 1 | | | | |
| 2 | EVENT PARAMETER 2 | | | | |
| 3 | EVENT PARAMETER 3 | | | | |
| 4 | EVENT PARAMETER 4 | | | | |
| 5 | EVENT PARAMETER 5 | | | | |
| 6 | EVENT PARAMETER 6 | | | | |

| QUADLET # | NAME | 31–24 | 23–16 | 15–8 | 7–0 |
|---|---|---|---|---|---|
| 0 | MESSAGE HEADER | D | MESSAGE TYPE | MESSAGE ID | RESERVED |
| 1 | MESSAGE BODY 1 | | | | |
| 2 | MESSAGE BODY 2 | | | | |
| ... | ... | | | | |
| n | MESSAGE BODY n | | | | |

| QUADLET # | NAME | 31–24 | 23–16 | 15–8 | 7–0 |
|---|---|---|---|---|---|
| 0 | MESSAGE HEADER | D | MESSAGE TYPE | MESSAGE ID | RESERVED |
| 1 | CHARACTER 1–4 | | | | |
| 2 | CHARACTER 5–8 | | | | |
| 3 | CHARACTER 9–12 | | | | |
| 4 | CHARACTER 13–16 | | | | |
| 5 | CHARACTER 16–20 | | | | |
| 6 | CHARACTER 21–24 | | | | |

2245

ADLET? 2300

| QUADLET # | NAME | 31–24 | 23–16 | 15–8 | 7–0 |
|---|---|---|---|---|---|
| 1 | COMMANDED POSITION | | | | |
| 2 | COMMANDED VELOCITY | | | | |
| 3 | NETWORK TIME | | | | |
| 4 | FEED FORWARD TERM | | | | |
| 5 | GAIN TERM | | | | |
| 6 | CURRENT (TORQUE) LIMIT TERM | | | | |

| QUADLET # | NAME | 31–24 | 23–16 | 15–8 | 7–0 |
|---|---|---|---|---|---|
| 1 | ACTUAL POSITION | | | | |
| 2 | DIGITAL I/O STATES | | | | |
| 3 | NETWORK TIME | | | | |
| 4 | COMMANDED POSITION | | | | |
| 5 | ACTUAL VELOCITY | | | | |
| 6 | STATUS WORD | | | | |

FIG.24

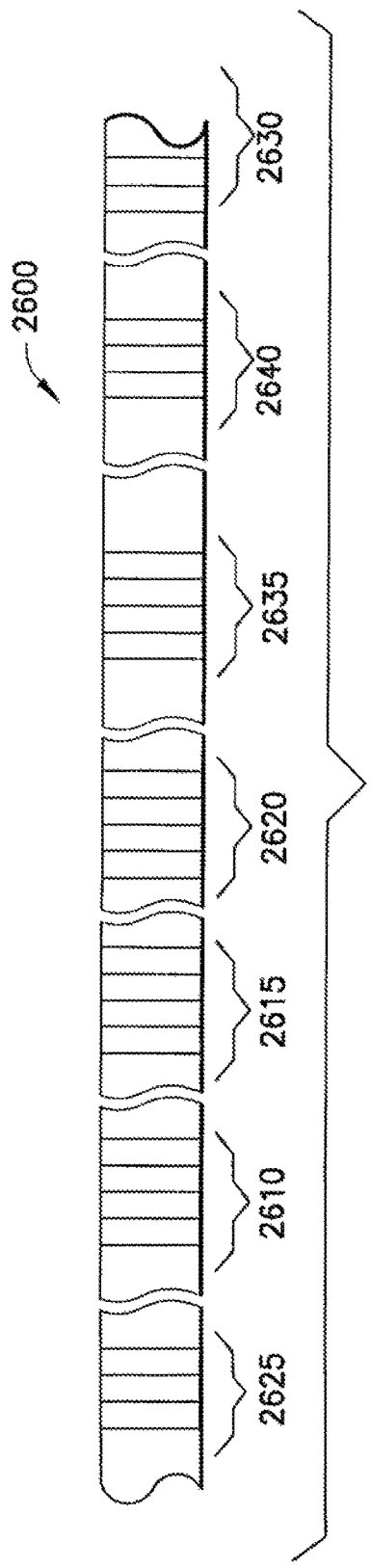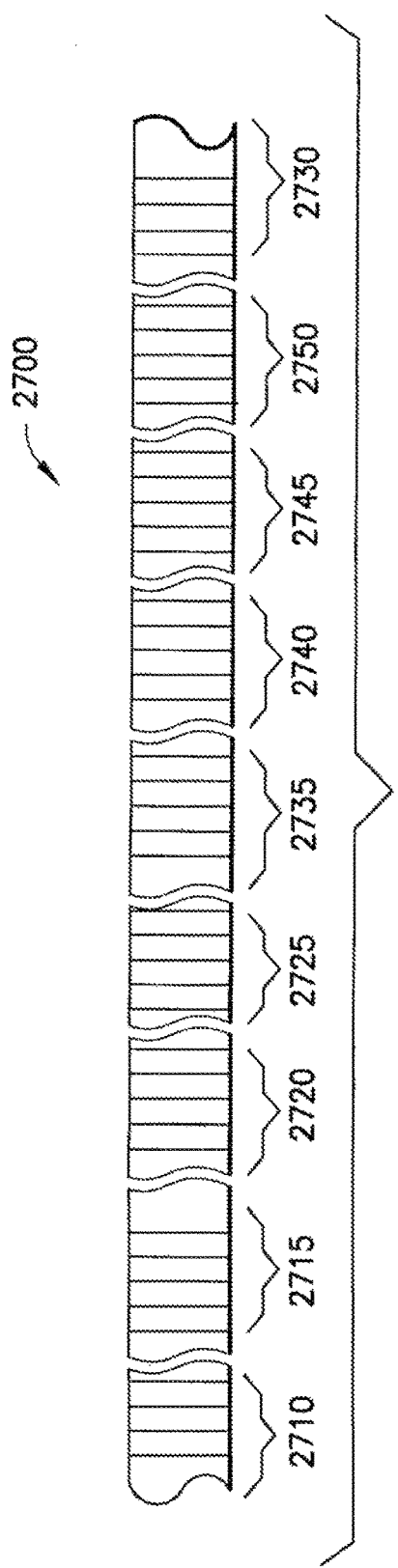
FIG. 26
FIG. 27

| QUADLET # | NAME | 31-24 | 23-16 | 15-8 | 7-0 |
|---|---|---|---|---|---|
| 0 | SAMPLE1: TRACE VAR 1 | FIRST SAMPLE (RECORD) BEGINS | | | |
| 1 | SAMPLE1: TRACE VAR 2 | | | | |
| ... | ... | | | | |
| m-1 | SAMPLE1: TRACE VAR m | FIRST SAMPLE (RECORD) ENDS | | | |
| M | SAMPLE2: TRACE VAR 1 | SECOND SAMPLE (RECORD) BEGINS | | | |
| ... | ... | | | | |
| n*m-1 | SAMPLE n : TRACE VAR 1 | nth SAMPLE (RECORD) BEGINS | | | |
| n*m | SAMPLE n : TRACE VAR 2 | | | | |
| ... | ... | | | | |
| (n)*m+m-1 | SAMPLE n : TRACE VAR m | nth SAMPLE (RECORD) ENDS | | | |

FIG.32

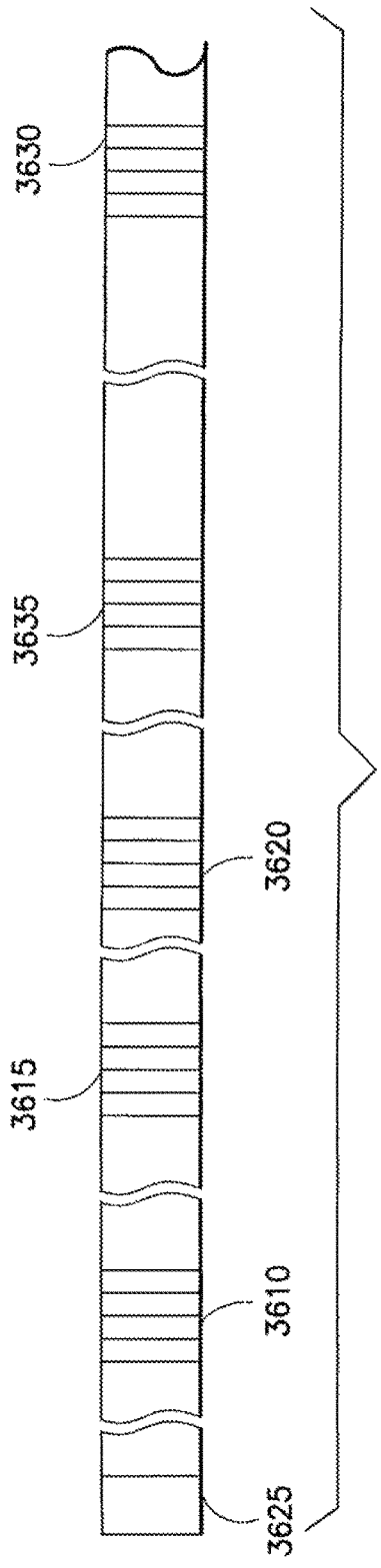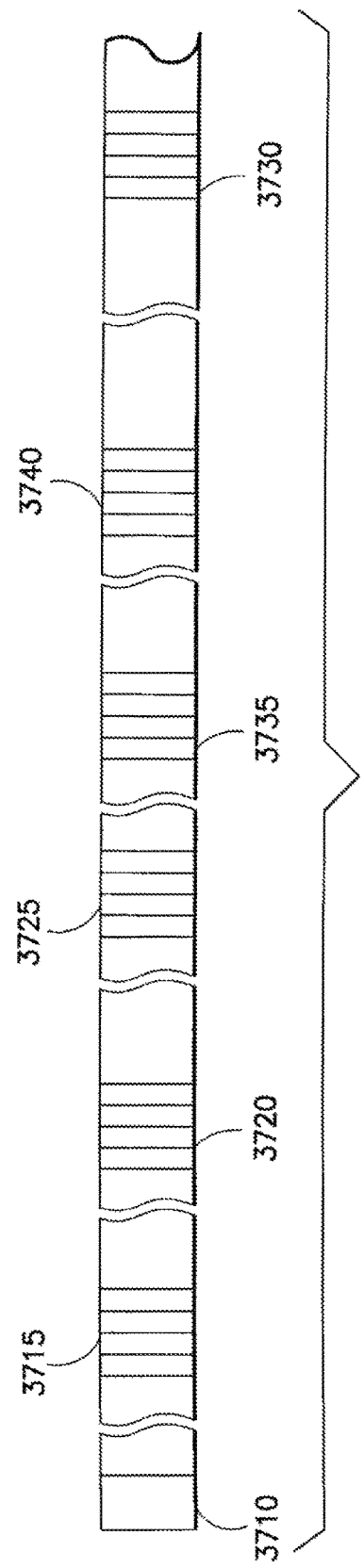

FIG. 42b

SequenceRecipe

+ <<property>> ResourceName: String
- s Parameters: string="ParameterArray"

+ SequenceRecipe ()
- IsResource ()
+ UsingReflectionCreateRecipe ()
+ SetInstance ()
+ GetInstance ()
SequenceRecipe ()
+ GetObjectData ()
+ <<get>> ResourceName ()
+ <<get>> ResourceList ()
+ <<get>> Params ()
+ <<get>> Params ()

+Recipes

- CreateNonCustomRecipes ()
+ AddSequence ()
+ AddTemplate ()
- AddTemplateToObjectTree ()
- AddSequenceToObjectTree ()
- AddSequenceToParent ()
- AddTemplateToParent ()
+ RunSequence ()
+ IsSequenceAvailable ()
+ GetMethodInfo ()
- FindMethodInfo ()
+ GetObjectList ()
- CleanUpSequenceParents ()
+ GetSequenceList ()
+ GetSequence ()
+ RemoveSequence ()
+ CreateRecipe ()
+ GetResourceTypeList ()
+ GetTemplate ()
+ GetTemplateNames ()
+ CreateSequenceFromTemplate ()
- ResolveMoveParent ()
- AssignMoveParent ()
- LockResources ()

4310

- UnLockResources ()
+ TemplatesLoadEvent ()
- FindSequenceParent ()
- FindTemplateParent ()
+ RemoveSequenceParent ()
+ RenameSequenceParentFolder ()
+ IsTemplateNameUnique ()
+ UpdateTemplateParent ()
+ <<add>> TemplatesLoadedFromXML ()
+ <<remove>> TemplatesLoadedFromXML ()
+ <<get>> Recipes ()
+ <<get>> SequenceNameList ()
+ <<get>> TemplateNameList ()
+ <<get>> TemplateList ()
+ <<get>> TemplateRecipeNameList ()
+ <<get>> GetInstanceReference ()

FIG. 42c

| FIG. 42a |
| FIG. 42b |
| FIG. 42c |

FIG. 42

SCALABLE MOTION CONTROL SYSTEM

CROSS-REFERENCE TO RELATED APPLICATIONS

This is a divisional application of U.S. patent application Ser. No. 13/011,970, filed 24 Jan. 2011 (now U.S. Pat. No. 9,020,617), which is a divisional of U.S. patent application Ser. No. 11/178,615, filed 11 Jul. 2005 (now U.S. Pat. No. 7,904,182), which claims the benefit of U.S. Provisional Application No. 60/688,636, filed 8 Jun. 2005 all of which are incorporated by reference herein in their entirety.

The disclosed embodiments are related to a control system for complex multi-axis non-linear machines, in particular, to a system for accurate and synchronized control of precision robots with a desirable combination of performance, flexibility, and scalability.

BACKGROUND

As a result of technological improvements in the area of electronics and communication, control technology for complex motion systems has taken a clear direction toward a networked architecture. A networked solution utilizes multiple simple controllers, referred to as remote controllers, which are located close to the components subject to control, such as motors and other actuators, and are coordinated by a master controller through a communication network.

The networked architecture opens numerous challenges in the areas of the division of the controls intelligence between the master and remote controllers, implementation of advanced control algorithms, communication network utilization, synchronization of components driven by different remote controllers, handling of events associated with inputs on multiple remote controllers, such as capturing positions of multiple axes of motion, accommodating a human presence in the work space, and dealing with power loss situations.

The division of the controls intelligence between the master and remote controllers may vary from a fully centralized architecture, where all or a majority of the control algorithms run on the master controller, to a distributed solution, where control algorithms are implemented on substantially autonomous remote controllers.

The benefits of a highly centralized architecture include the ability to provide advanced control algorithms, which often require real-time information from multiple axes, such as multi-input-multi-output (MIMO) control, and can be conveniently implemented on the master controller. The remote controllers in such an architecture require comparatively low computational power and small amounts of on-board memory, allowing for a relatively simple and inexpensive design.

These advantages may be achieved at the cost of a relatively high utilization of the communication network due to intensive time-critical data exchange between the remote controllers and the master controller because the master controller is closing the control loops. These systems usually have limited scalability because the maximum number of axes is constrained by the computational power of the master controller as well as the bandwidth of the communication network. In addition, since the remote controllers may not have enough intelligence to autonomously support failure-related operations, such as performing a controlled stop of the respective motion axes in the case of a failure of the communication network, satisfactory control in the event of a failure may be problematic to achieve.

In contrast, control systems with distributed control algorithms, which close the control loops on the remote controllers, executing on trajectory information received from the master controller, utilize comparatively low network traffic and substantially less time-critical data that may be conveniently buffered at the remote controllers to improve the overall capacity margin of the communication network. This approach may provide desirable scalability of the control system since increasing the number of remote controllers for additional axes automatically increases the overall computational power available for execution of the control loops. Furthermore, the remote controllers, being capable of generating simple trajectories and running control algorithms, have enough intelligence to support failure-related operations, such as a controlled stop, in the case of a failure of the communication network.

However, the additional intelligence of the remote controllers in the distributed architecture requires more computational power and memory, which generally makes the remote controllers more expensive. Also, implementation of full MIMO control algorithms is problematic since the control algorithms running on one remote controller generally do not have real-time access to the states of the axes driven by other remote controllers.

Implementation of a networked control system is generally facilitated by using a communication network with the appropriate capabilities. The IEEE 1394 communication network, also known as FireWire, is based on a high-speed serial bus which was developed to provide the same services as modern parallel buses, but at a substantially lower cost. The IEEE 1394b-2002 amendment defines features and mechanisms that provide gigabit speed extensions in a backwards compatible fashion and detection of physical loops in the bus topology and their subsequent resolution by selective disabling of physical layer (PHY) ports. A lightweight IEEE 1394 protocol was developed for efficient asynchronous communication to electronic instrumentation and industrial control devices by the 1394 Trade Association. Referred to as the Instrument and Industrial Control Protocol (IICP), it uses a dual-duplex plug structure for transfer of data and command/control sequences in a flow-controlled manner.

Control systems for accurate and synchronized control of precision robots generally require a certain level of system integrity, that is, the control systems may require interlocks, fail safe mechanisms, mechanisms for maintaining a minimum 100% up time, mechanisms and techniques to avoid damage to products being produced, and mechanisms and techniques to accommodate a human presence in workspaces of the control system.

State-of-the-art electronics and computers that implement programmable systems with a specified level of integrity tend to be marketed to the high-end of industrial machinery and processes. These types of systems are generally applicable to more stringent categories, for example, EN954 Category 4 or IEC61508 SIL 3, and use high-end processors or embedded CPU's. These types of systems are generally expensive and have more capability than required for low-end machinery or systems requiring lower levels of integrity, such as Category 2 or 3.

A machine designer who wishes to implement an alternative solution to programmable integrity to avoid the added cost of the specialized high-end electronics is faced with an extremely complex task of making the electronics, network and software of a control system meet integrity requirements and obtaining regulatory authority or auditor approval. Another issue with the existing technology that implements a specified level of integrity is size and form-factors, which are unsuitable for integrity applications with stringent space constraints.

There is a need for a control system that has the advantages of both a centralized and distributed architecture, that is flexible and scalable, that synchronizes component operations, that accommodates power losses and human presence in a workspace of the components subject to control, and that provides required system integrity levels.

SUMMARY

The disclosed embodiments are directed to a control system including a clustered architecture having a master controller, a central control section including one or more first remote controllers under direct control of the master controller and a distributed control section including a cluster controller controlled by the master controller, wherein the cluster controller controls the activities of one or more second remote controllers. Each of the first and second remote controllers are utilized to drive one or more axes.

The disclosed embodiments are also directed to a method of operating an axis of a control system that includes generating a trajectory for the axis in terms of a position, velocity, and acceleration for each point of a plurality of points on the trajectory, and calculating an inverse dynamic model of the axis to determine a gain value and a feedforward term for each point.

The disclosed embodiments are further directed to a method of synchronizing nodes on a network, including issuing a start message including a time stamp indicating the time the message was sent, updating a high resolution clock using the time stamp, and compensating for a difference between a time indicated by the time stamp and a time the high resolution clock was updated.

The disclosed embodiments are still further directed to a message set for communicating among nodes of a control system that includes an action message for exchanging commands and command responses, an event message for reporting data relating to a predetermined event to a master controller, a string message for providing a serial message channel between a remote controller and the master controller, and a data port message for sending data to a network node.

The disclosed embodiments also include a method of obtaining axis data at the time of an event, including buffering data at one or more axis nodes, recording time information of a triggering event occurring at a triggering event node of the one or more axis nodes, and processing the buffered data to determine a set of values at a time period indicated by the recorded time information.

The disclosed embodiments are yet further directed to a control system having a plurality of nodes organized in a clustered architecture, and a wireless communication network through which two or more of the nodes communicate.

The disclosed embodiments also include a method for controlling an axis of a control system including calculating an operating parameter value for an end effector of the axis, and generating a motion profile for an individual joint of the axis such that a motion profile for the end effector does not exceed the operating parameter value.

A method for controlling an axis is also disclosed that includes calculating a velocity and a torque for a position of the axis, predetermining a first maximum time period during which an axis velocity may exceed the calculated velocity, predetermining a second maximum time period during which an axis torque may exceed the calculated torque, and disabling the axis if the first or second maximum time period is exceeded.

Another embodiment disclosed herein includes a method of verifying the integrity of data transmitted over a control system network. The method includes storing operating parameters at a node on the network, and verifying that commands received through the network do not cause operations of the node that exceed the operating parameters.

A method of verifying the integrity of a control system network as part of the disclosed embodiments includes issuing a periodic message, and disabling one or more nodes of the control system network if the message is not received within a time period.

The disclosed embodiments also include a method of maintaining the integrity of a control system network including assigning nodes of the network into zones such that motion in a first zone is isolated from motion in zones other than the first zone, and controlling the zones so that events of the first zone do not effect the operation of zones other than the first zone.

The present embodiments are also directed to a method of bringing an axis to a controlled stop, that includes determining if power has been lost to a system including the axis, applying a trajectory to the axis that brings the axis to a zero velocity within a predetermined time period, and removing power from the axis at the end of the predetermined time period.

The embodiments described herein also include a method for compensating for synchronization delays in a control system that include determining a delay between a network node issuing a message and a network node receiving the message, and using the determined delay to adjust trajectory data for the receiving node.

A method of operating a robot is disclosed that includes recording an idle time of the robot, determining performance characteristics of the robot upon exceeding an idle time threshold, and directing the robot to perform a warm up exercise if the determined performance characteristics do not meet a specification.

An application program interface for a motion control system is also included in the disclosed embodiments and includes a standardized set of interface conventions for exchanging information among components of the motion control system, and a generalized command set that provides general commands to perform operations and specific arguments to identify particular components and actions for performing the operations.

BRIEF DESCRIPTION OF THE DRAWINGS

The foregoing aspects and other features of the disclosed embodiments are explained in the following description, taken in connection with the accompanying drawings, wherein:

FIG. 17 shows an exemplary control message structure;

FIG. 18 shows an exemplary ACTION message;

FIG. 19 shows an exemplary EVENT message structure;

FIG. 20 shows an example of a vendor specific EVENT message;

FIG. 21 shows an example of a STRING message structure;

FIG. 22 shows an example of a vendor specific STRING message;

FIG. 23 shows an example of a PVT or PVT-FG message structure;

FIG. 24 shows an example of a STATUS message;

FIG. 26 shows an exemplary PVT frame with an optional torque limit term;

FIG. 27 shows an exemplary PVT-FG frame with an optional torque limit term;

FIG. 32 shows an example of a TRACE message;

FIG. 36 shows an exemplary PVT frame with an additional TIME_OFFSET field;

FIG. 37 shows an exemplary PVT-FG frame with an additional TIME_OFFSET field;

DETAILED DESCRIPTION

Figure 1A:
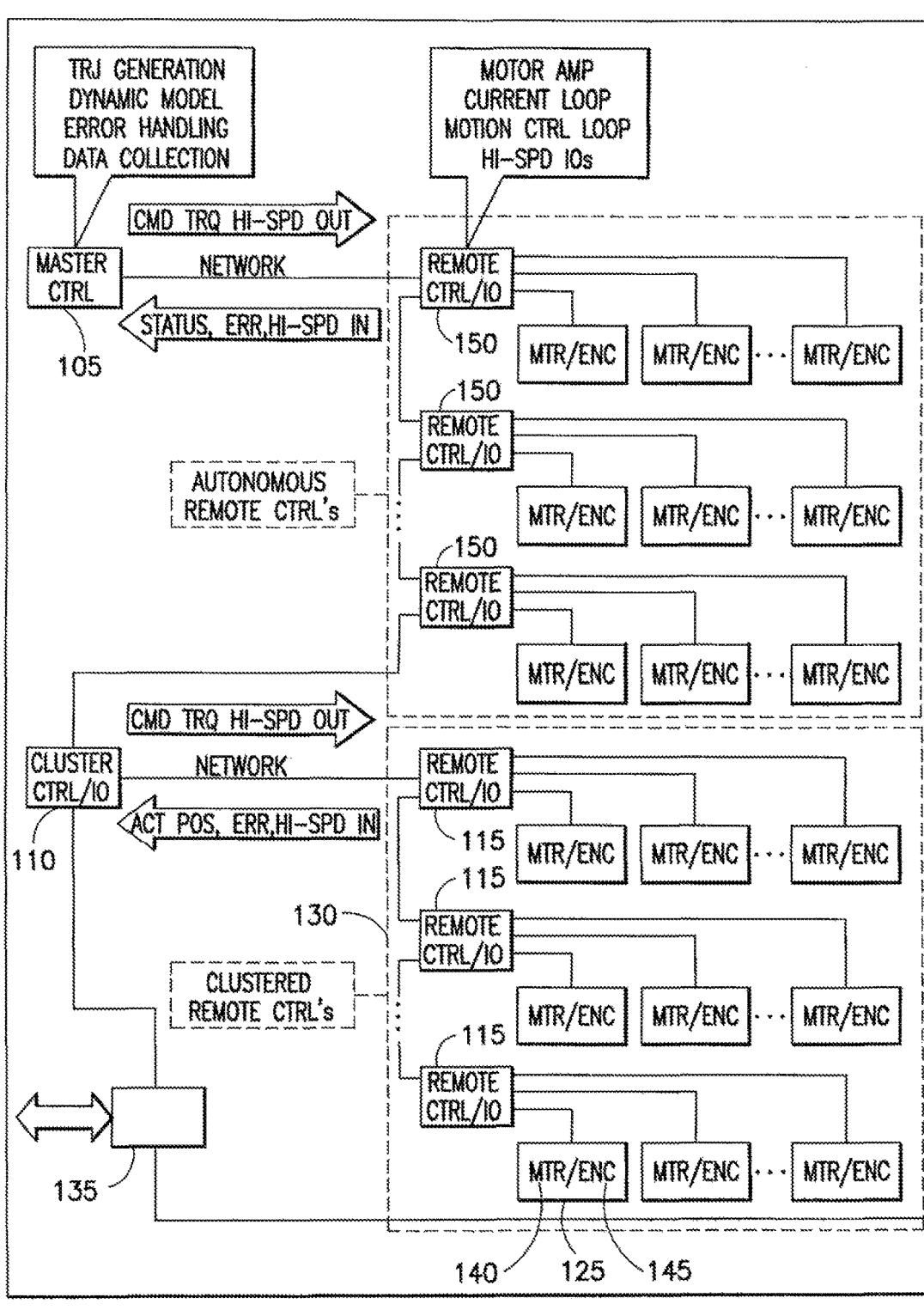
FIGS. 1(1a-1b) shows a block diagram of a clustered architecture control system suitable for practicing the disclosed embodiments.

FIGS. 1(1a-1b) shows a block diagram of a system 100 suitable for practicing the embodiments disclosed herein. Although the disclosed embodiments will be described with reference to the embodiment shown in the drawings, it should be understood that the disclosed embodiments can be embodied in many alternate forms of embodiments. In addition, any suitable size, shape or type of elements or materials could be used.

The control system 100 of the disclosed embodiments combines the benefits of a centralized and a distributed allocation of controls intelligence in a networked control system. This combinatorial architecture is referred to herein as a clustered architecture.

The clustered architecture control system 100 includes a master controller 105, one or more cluster controllers 110, one or more remote controllers 115, and one or more autonomous remote controllers 150 connected together through a communication network 120. The master controller 105, the cluster controllers 110, the remote controllers 115 and the autonomous remote controllers 150, may be referred to as network nodes.

As depicted diagrammatically in FIGS. 1(1a-1b), the master controller 105 supervises the overall operation of the control system 100, each of the cluster controllers 110 supervise the operations of one or more remote controllers 115, and each of the remote controllers are utilized to drive one or more axes 125. The axes may be part of one or more complex multi-axis non-linear machines, for example, a system of precision robots. The remote controllers 115 may be controlled by a cluster controller 110 and autonomous remote controllers 150 may be operated directly by the master controller 105. Remote controllers 115 may be generally grouped together in clusters 130.

The clustered architecture control system 100 may also include at least one bridge node 135 which allows the master controller to communicate with nodes on another communication network, such as a controller area network (CAN). The control system may then be able to control CAN based modules and components, for example, CAN axis controllers, grippers, doors, actuators, sensors, etc.

The clustered architecture provides the features of a centralized control network and the features of a distributed control network where required, within the network topology. The architecture as disclosed herein is advantageous because clusters 130 may be distributed where required within the network, and each cluster controller 110 is capable of providing highly centralized control within the cluster it manages. Network traffic associated with highly centralized control is generally confined within each cluster 130 and remote controllers 115 and autonomous remote controllers 150 may be located close to axes they control, reducing problems associated with power and signal cabling. In addition, the architecture allows for direct control of the autonomous remote controllers 150 by the master controller 105 where required. Furthermore, because intense network traffic is generally confined within the clusters 130, and the clusters 130 are capable of a high level of control, the architecture may accommodate a large number of clusters. Thus, the architecture provides a high level of scalability and allows for an efficient distribution of controllers.

As a centralized control example, the master controller 105 may directly control an autonomous remote controller 150, where the master controller may generate trajectories, run control algorithms and provide torque commands for implementation by the autonomous remote controller 150. The autonomous remote controller 150 may use the torque commands to produce control actions such as applying voltage to an axis actuator 140, for example, a motor. The autonomous remote controller 150 may also read feedback signals such as position information from a feedback device 145, for example, an encoder and current draw from the axis 125 and convey those to the master controller 105. In this example, while high performance is achieved, network utilization may also be high because the control and feedback loops are closed over the communication network 120.

As a distributed control example, the master controller 105 may coordinate activities among one or more autonomous remote controllers 150 and generate trajectory data for implementation by one or more autonomous remoter controllers 150. The autonomous remote controllers 150 may use the trajectory data in real time control algorithms to produce control actions such as applying power to axis actuators 140, and may also convey status information to the master controller 105. In this example, network utilization may be low since the feedback control loops are closed on the remote controllers. However, control performance of dynamically coupled axes may be limited because the feedback control loops generally do not have real-time access to information residing on other remote controllers.

As an example of a combinatorial clustered control, the master controller 105 may perform high level supervisory control functions and coordinate activities among one or more cluster controllers 110. A cluster controller 110 may run real time control algorithms including local dynamic modeling of the axes under its control and provide torque commands to its respective remote controllers 115. The remote controllers managed by the cluster controller 110 may, for example, apply power to axis actuators 140 in response to the torque commands, and may also convey axis information, such as actual positions, to the cluster controller 110. Thus, most control and feedback communication may generally occur locally between the cluster controller 110 and its respective remote controllers 115, conserving network utilization among nodes outside of the cluster.

The clustered architecture generally provides high performance control for subsets of components where necessary without burdening the entire communication network 120 with heavy time-critical traffic.

Figure 2:
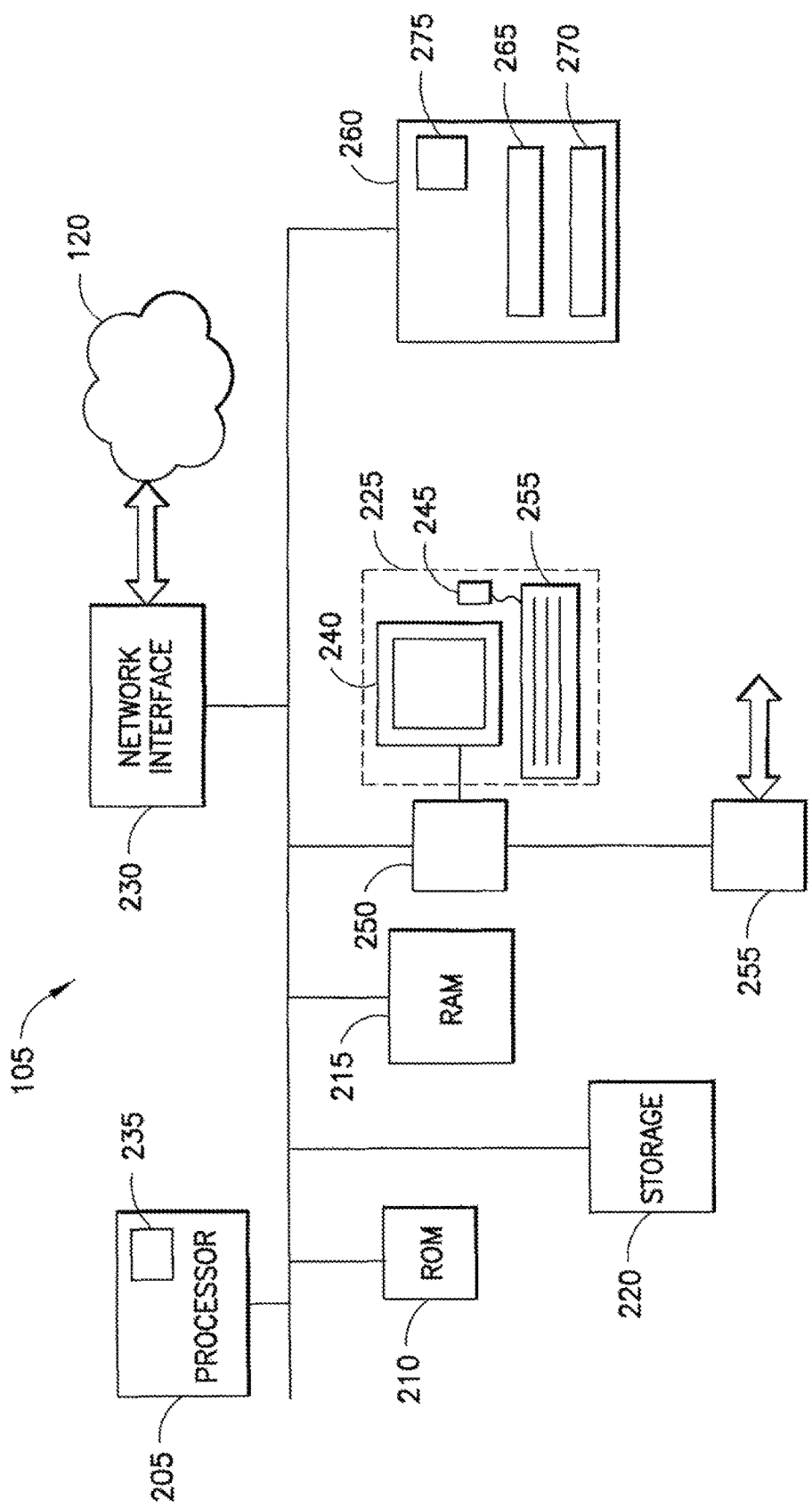
FIG. 2 shows a block diagram of a master controller that controls the operation of the clustered architecture control system.

Turning now to FIG. 2, the master controller 105 will be described in greater detail. As mentioned above, master controller 105 controls the operation of the clustered architecture control system 100. Master controller 105 may generally include a processor 205, read only memory 210, random access memory 215, program storage 220, a user interface 225, and a network interface 230.

Processor 205 may include an on board cache 235 and is generally operable to read information and programs from a computer program product, for example, a computer useable medium, such as on board cache 235, read only memory 210, random access memory 215, and program storage 220.

Upon power up, processor 205 may begin operating programs found in read only memory 210 and after initialization, may load instructions from program storage 220 to random access memory 215 and operate under control of those programs. Frequently used instructions may be temporarily stored in on board cache 235. Both read only memory 210 and random access memory 215 may utilize semiconductor technology or any other appropriate materials and techniques. Program storage 220 may include a diskette, a computer hard drive, a compact disk (CD), a digital versatile disk (DVD), an optical disk, a chip, a semiconductor, or any other device capable of storing programs in the form of computer readable code.

On board cache 235, read only memory 210, random access memory 215, and program storage 220, either individually or in any combination may include operating system programs. The operating system programs may be supplemented with an optional real time operating system to improve the quality of data provided by the master controller 105. The optional real time operating system may also allow the master controller 105 to provide a guaranteed response time to data and messages received from the cluster controllers 110 and the autonomous remote controllers 150.

In particular, on board cache 235, read only memory 210, random access memory 215, and program storage 220, either individually or in any combination may include programs for axis trajectory generation, dynamic modeling, error handling, data collection, and a messaging facility. The messaging facility may include programs for constructing and exchanging messages among network nodes, programs for constructing and exchanging frames, and may include programs for providing an applications program interface, as disclosed below. In addition, on board cache 235, read only memory 210, random access memory 215, and program storage 220 may be loaded with new or upgraded programs, for example, by processor 205 through network interface 230.

Network interface 230 may be generally adapted to provide an interface between master controller 105 and communication network 120. Communication network 120 may include the Public Switched Telephone Network (PSTN), the Internet, a wireless network, a wired network, a Local Area Network (LAN), a Wide Area Network (WAN), a virtual private network (VPN) etc., and may further include other types of networks including X.25, TCP/IP, ATM, etc. In one embodiment, communication network 120 may be an IEEE 1349 network, also referred to as a "Firewire" network.

Master controller 105 may include a user interface 225 with a display 240 and an input device such as a keyboard 255 or mouse 245. The user interface may be operated by a user interface controller 250 under control of processor 205. The user interface controller may also provide a connection or interface 255 to an external network, another control system, or a host computer.

The master controller 105 may generally perform high-level supervisory and control functions for the clustered architecture control system 100. These functions may include providing a communication interface with an operator and/or a higher level host computer, configuration data management, coordination of the cluster and remote controllers, motion sequencing and trajectory generation, dynamic modeling (if required), error handling and data logging.

Figure 3:
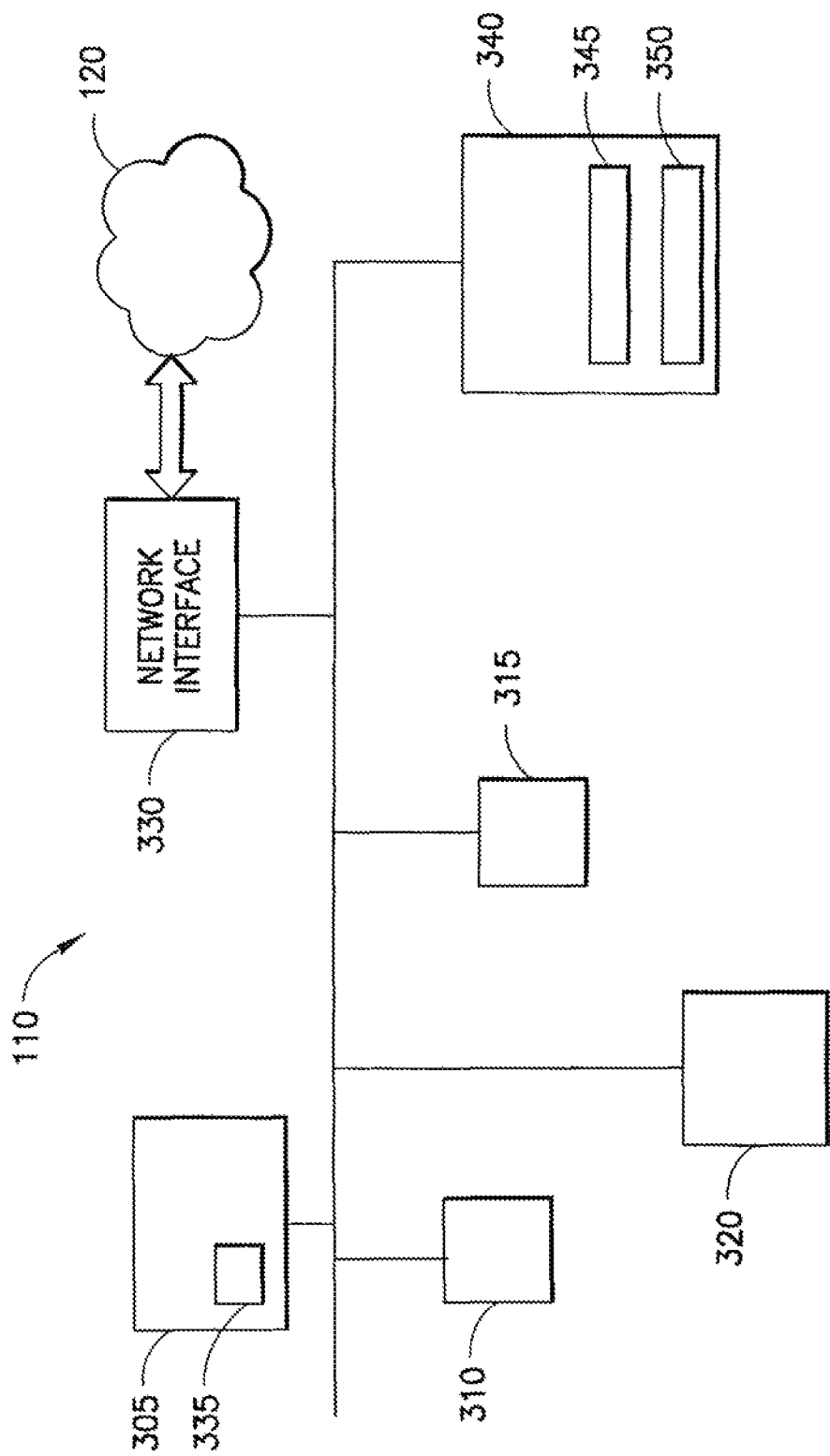
FIG. 3 depicts a block diagram of a cluster controller capable of operating under control of the master controller.

Turning now to FIG. 3, the structure and operation of a cluster controller 110 will be described. While a single cluster controller 110 will be described, it should be understood that the clustered architecture control system 100 may include any number of cluster controllers.

As previously mentioned, cluster controller 110 may receive information from master controller 105 and may utilize that information to control one or more axes 125. Cluster controller 110 may generally include a processor 305, read only memory 310, random access memory 315, program storage 320, and a network interface 330 to communication network 120. Processor 305 may also include an on board programmable memory 335.

Processor 305 is generally operable to read information and programs from a computer program product, for example, a computer useable medium, such as on board programmable memory 335, read only memory 310, random access memory 315, and program storage 320.

On board programmable memory 335, read only memory 310, random access memory 315, and program storage 320 may include programs for constructing and exchanging messages among network nodes and may include programs that support an applications program interface among network nodes. On board programmable memory 335, read only memory 310, random access memory 315, and program storage 320 may also include programs that allow the cluster controller 110 to receive motion commands from the master controller 105, generally in the form of frames having at least position, velocity, and a time stamp (PVT frames). The frames may include other data, for example, a feed forward term, a gain term, or both as will be described below. Random access memory 315 and program storage 320 may also operate individually or together to buffer frames as they are received.

Under program control, the cluster controller 110 may operate on the data included in the frames using real time control algorithms, including dynamic models of the axes it controls, in order to calculate torque commands for the remote controllers 115 that are part of its particular cluster. The cluster controller 110 may acquire data from the remote controllers 115, for example, actual axis positions, error indications, etc., and may report the data to the master controller 105.

Figure 4:
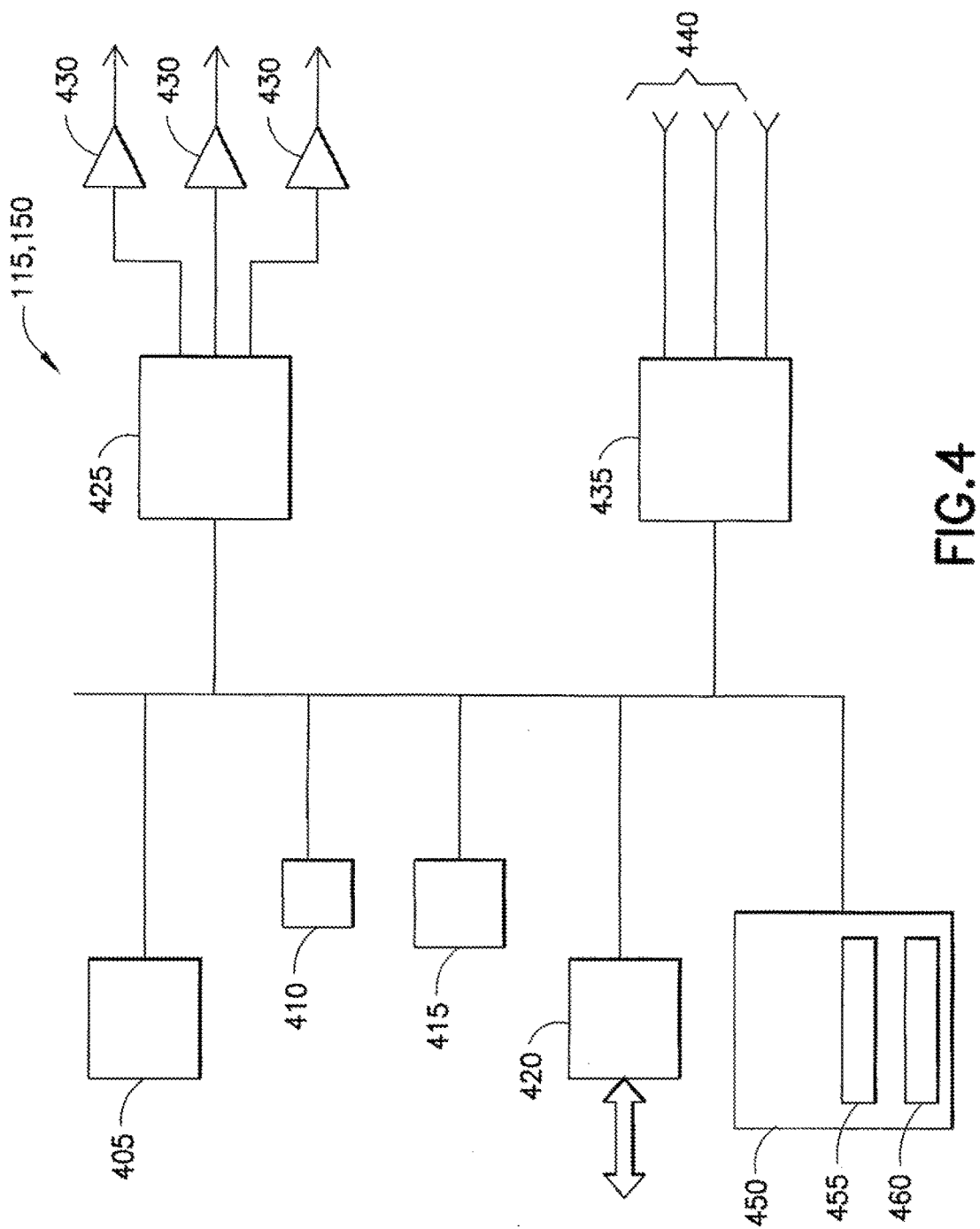
FIG. 4 shows a block diagram of a remote controller capable of operating under control of the master controller or a cluster controller.

The structure and operation of a remote controller 115 and an autonomous remote controller 150 will be described while referring to FIG. 4. While a single remote controller 115, 150 will be described, it should be understood that the clustered architecture control system 100 may include a plurality of remote controllers 115 and autonomous remote controllers 150. For purposes of this discussion, remote controllers 115 and autonomous remote controllers 150 will be referred to as remote controllers 115, 150. In some embodiments a remote controller 115 may have the capability to operate as an autonomous remote controller 150, and an autonomous remote controller 150 may have the capability to operate as a remote controller 115.

Remote controller 115, 150 generally operates to drive, and to receive position information from, one or more axes. In particular, the remote controller may be capable of single or multi-axis control, driving one or more current loops, for example for powering motor windings, generally implementing a motion control loop, and collecting data in real time. The remote controller 115, 150 may receive commands from and may provide information to the master controller 105 or a cluster controller 110.

Figure 1B:
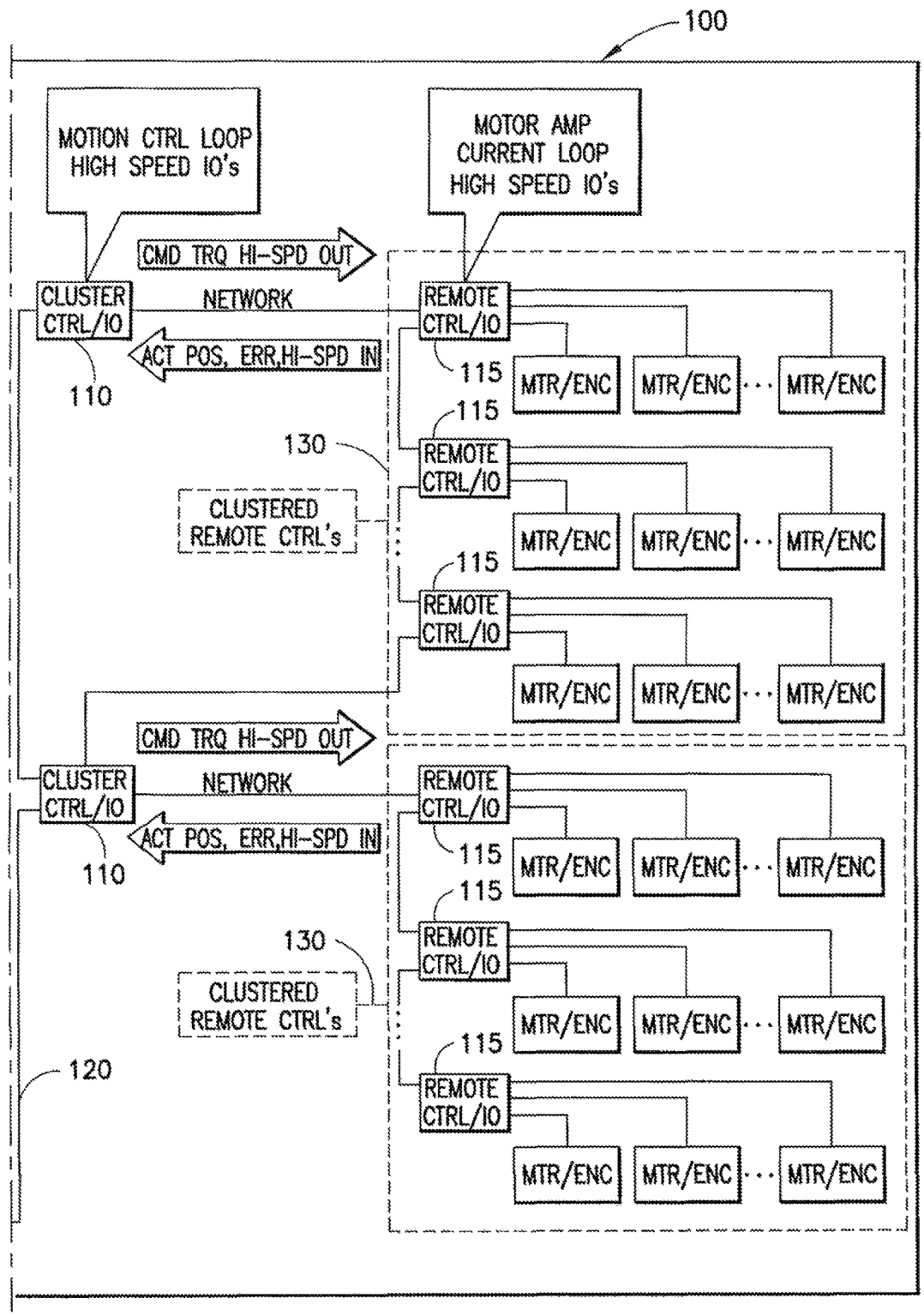

The remote controller 115, 150 may include a processor 405, a semiconductor memory device 410, non-semiconductor memory 415, and a network interface 420. The remote controller 115, 150 may also include circuitry 425 and drivers 430 for applying power to one or more axes 125 (FIGS. 1,1a-1b). The remote controller 115, 150 may further include circuitry 435 for receiving axis position information 440 from each of the one or more axes 125. The position information may be outputs from one or more encoders 145 that may be part of the axes 125.

Processor 405 generally operates under control of programs stored on a computer program product, for example, a computer useable medium, such as semiconductor memory 410 and non-semiconductor memory 415. Non-semiconductor memory 415 may include a diskette, a computer hard drive, a compact disk (CD), a digital versatile disk (DVD), an optical disk, or any other device capable of storing programs in the form of computer readable code.

Semiconductor memory 410 and non-semiconductor memory 415, either individually or in any combination, may include remote controller operating system programs. Semiconductor memory 410 and non-semiconductor memory 415, either individually or in combination, may also include programs for constructing and exchanging messages among network nodes and may include programs that support an applications program interface among network nodes. In particular, semiconductor memory 410 and non-semiconductor memory 415, either individually or in combination, may include programs for at least one of torque mode operation, set point mode operation, and point to point mode operation of the remote controller 115, 150. In addition, semiconductor memory 410 and non-semiconductor memory 415, either individually or in combination may operate to buffer frames as they are received as will be described below.

The remote controller 115 may operate in torque mode when controlled by a cluster controller 110. As mentioned above, the cluster controller 110 generally receives data frames from the master controller and utilizes them to calculate torque commands for the remote controllers in its cluster. Each remote controller 115 may perform control functions necessary to execute its respective torque commands.

For example, remote controller 115 may be pre-programmed with the characteristics of the axis or axes it controls, such as the number of motors, phases per motor, phase resistance, back EMF constant, etc. Cluster controller 110 may issue a command to remote controller 115 indicating the torque that an actuator 140, for example a motor, should exert. Remote controller 115 may compute a voltage, current, or power to be applied to actuator 140 for a particular time period using the pre-programmed characteristics that causes actuator 140 to exert the desired torque.

The remote controller 115 may also provide information back to the cluster controller 110 for determining the torque commands, for example, actual positions of the axes controlled by the remote controller 115. Encoder 145 may provide remote controller 115 with raw position information such as a number of encoder counts or steps, an angle measurement, etc. from which remote controller 115 may compute actual position information. Thus, the combination of the cluster controller 110 and the remote controller 115 may receive a smaller number of relatively high level commands in the form of frames from the master controller 105 and then exchange a relatively high number of commands and feedback between themselves to execute the motion directed by the frames.

When operating under control of the master controller 105, the remote controller may be referred to as an autonomous remote controller 150 as mentioned above. The autonomous remote controller 150 may operate in a setpoint mode. In the set point mode, the master controller 105 may send trajectory data to the autonomous remote controller 150. For example, the trajectory data may be in the form of PVT frames which may generally include a digital representation of a position, velocity, and a time stamp for a particular axis.

The autonomous remote controller 150 may execute real-time algorithms to determine a set of associated torque commands for the axis 125 that cause the axis to move according to the desired trajectories. The autonomous remote controller 150 may then use the torque commands to compute the power to be applied accordingly to actuator 140. In set point mode, the autonomous remote controller 150 may generally perform some of the functions of a cluster controller and may operate to close control loops between itself and the axes it controls, thus conserving the bandwidth of the communication network 120.

Alternately, an autonomous remote controller 150 may operate in a point to point mode under control of the master controller 105. In this mode, the autonomous remote controller 150 may receive a motion command from the master controller 105, and perform the necessary operations to execute the motion command. An exemplary motion command may include a three dimensional point in an axis workspace. The necessary operations to execute a motion command may include one or more of computing trajectories, computing torque commands, and computing the necessary power to be applied to the motors of the axes controlled by the autonomous remote controller 150 so that the axes reach the three dimensional point.

In response to the point to point motion command the autonomous remote controller 150 may send an answer reporting the results of the command. The master controller 105 may then send another point to point command with the next three dimensional point. This exchange may proceed until the autonomous remote controller 150 executes a desired sequence of motion commands. The point to point operational mode allows the master controller 105 to limit the data transmitted to the autonomous remote controller 150 to one end point per motion command, as opposed to a number of data frames, thus preserving the network bandwidth. However, in the point to point operational mode, the master controller 105 looses the capability of precise synchronization of trajectories executed by multiple autonomous remote controllers 150.

Figure 5A:
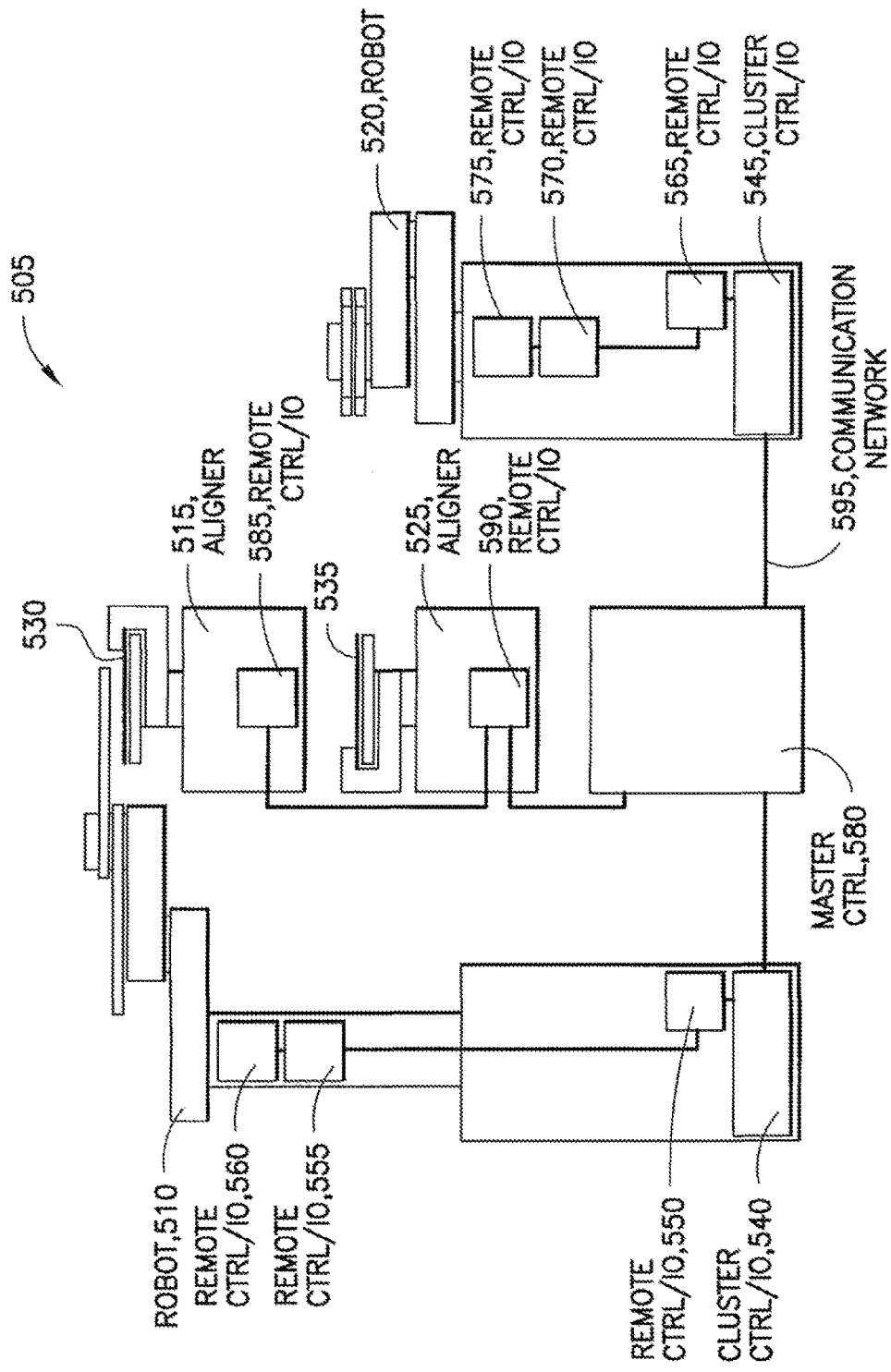
FIG. 5a shows an exemplary application of the clustered architecture control system.

An exemplary application of the clustered architecture control system is shown in FIG. 5a. A work cell 505 incorporating the control system includes two robots 510, 520 and two substrate aligners 515, 520. A cluster controller 540 and three remote controllers 550, 555, 560 are used to control robot 510. Similarly, another cluster controller 545 and three remote controllers 565, 570, 575 are used to control robot 520. A master controller 580 controls the two cluster controllers 540, 545 as well as autonomous remote controllers 585, 590 for the substrate aligners 515, 525. The master controller 580, cluster controllers 540, 545, remote controllers 550, 555, 560, 565, 570, 575 and autonomous remote controllers 585, 590 are connected by a communication network 595.

The robots 510, 520 may be five axis machines with complex non-linear dynamics while the aligners 515, 525 may be two axis machines. In this example, the robots 510, 520 pick substrates 530, 535 from designated locations and place them on aligners 525, 515, respectively. The aligners 525, 515 may scan the substrates 530, 535 for eccentricity and alignment features. After scanning, the robots 510, 520 may pick the substrates 530, 535 and place them elsewhere.

In one embodiment, the work cell 505 may be part of the clustered architecture control system 100 (FIG. 1, 1a-1b).

In order to maximize the throughput of the work-cell and to guarantee collision-free operation, the motion of the machines, that is, the robots 510, 520 and the substrate aligners 515, 525, should be accurately synchronized. There may be no dynamic coupling among any of the robots 510, 520 and the substrate aligners 515, 525. Each may use independent control algorithms without real-time data sharing. However, the mechanical configuration of the robots 510, 520 introduces strong dynamic coupling among individual axes within each robot manipulator. Coordination between the individual axes of robot 510 may be managed by cluster controller 540 in combination with remote controllers 550, 555, 560. Coordination between the individual axes of robot 520 may be managed by cluster controller 545 in combination with remote controllers 565, 570, 575. Thus, cluster controller 540 and remote controllers 550, 555, 560 form one cluster, and cluster controller 545 and remote controllers 565, 570, 575 form another cluster.

In the work cell 505 shown in FIG. 5a, the master controller 580 may generally provide supervisory functions, such as motion sequencing, data collection, event logging and error handling. In addition, it may calculate trajectories for all motion axes in the work cell 505. In this example, the master controller 580 assembles the calculation results into frames specific to each individual motion axis and sends them on a periodic basis over the network 595. The cluster controllers 540, 545 and the autonomous remote controllers 585, 590 recognize the frames and commands for the axes they control and operate accordingly.

For example, the cluster controllers 540, 545 may utilize dynamic models of robots 510, 520 for advanced multi-input-multi-output control, calculate torque commands, and periodically send those torque commands to the remote controllers in their respective clusters.

The autonomous remote controllers 585, 590 may be operating in a set point mode and may execute real-time algorithms to determine associated torque commands for the aligners 515, 525, respectively. The autonomous remote controllers 585, 590 may then use the torque commands to compute the power to be applied accordingly to motors within each of the aligners 515, 525.

It is important to note that the time-critical traffic associated with closing the control loops over the network 595 is contained within each of the two clusters without burdening the rest of the network 595, particularly the connection with the master controller 580, which would otherwise be subject to heavy real-time traffic associated with centralized control algorithms.

Figure 5B:
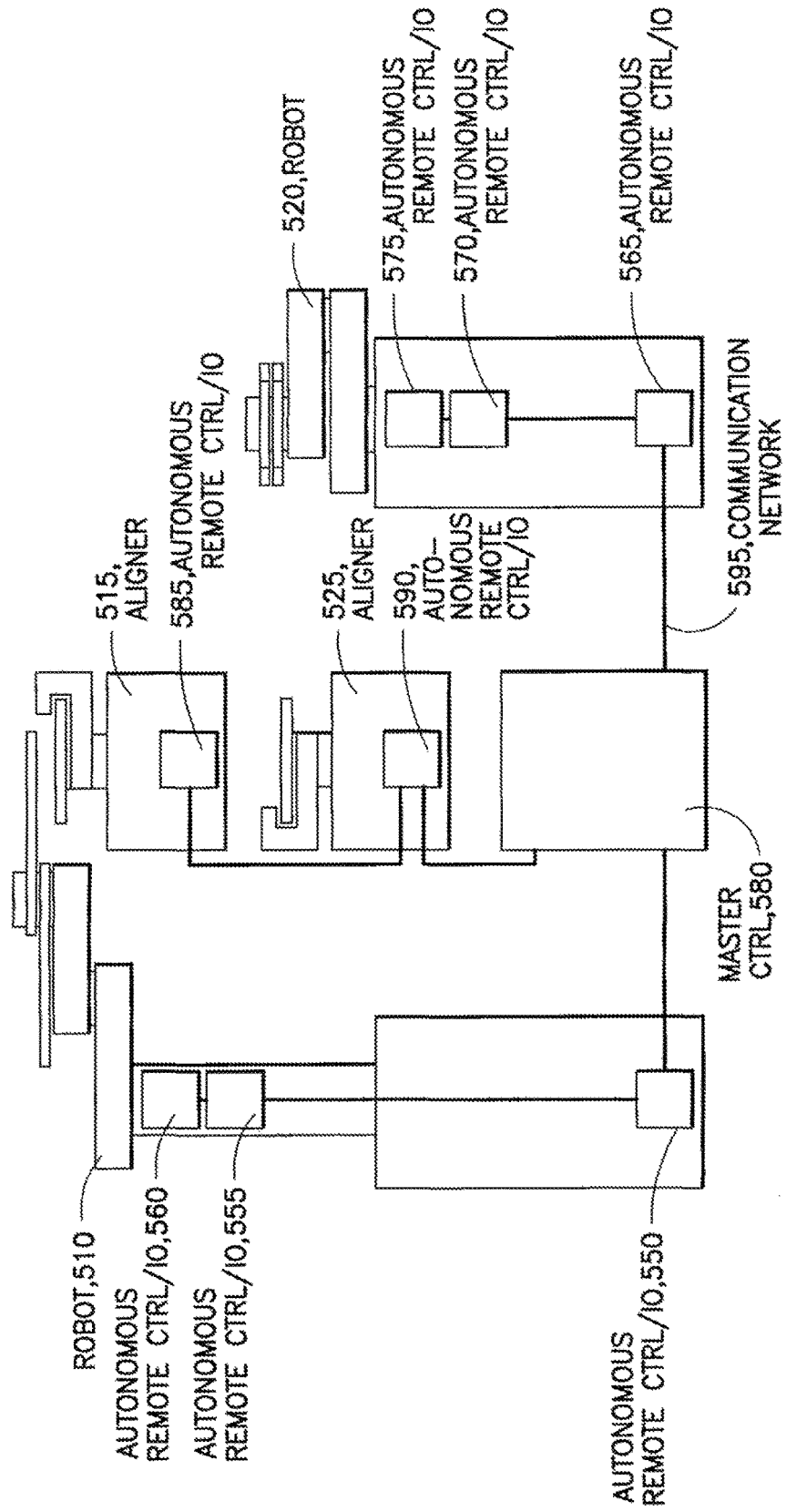
FIG. 5b shows an exemplary application of the control system using autonomous remote controllers.

It should be noted that the architecture allows the master controller 580 to directly control the autonomous remote controllers 585, 590 where required. An example application is shown in FIG. 5b. In many applications, the performance may be enhanced by the distributed model-based control method described below.

The clustered architecture control system disclosed herein is beneficial because each cluster controller is capable of providing highly centralized control within the cluster it manages. High volumes of network traffic generally required for highly centralized control are generally limited to each cluster. Clusters may be distributed where required within the communication network 120 and remote controllers may be placed in close proximity to the axes they control, reducing cabling requirements and problems associated with running control signals over any appreciable length.

In addition, because real-time data communication exists within the clusters and because intense network traffic is generally confined within the clusters, the clusters are capable of high-performance control, and the architecture allows a master controller to supervise a large number of clusters. As a result, the architecture provides high-performance control where required, a high level of scalability, and an efficient distribution of controllers.

One method, mentioned above, for controlling a machine such as robot 510 or aligner 585 is to calculate a trajectory for each axis. As previously mentioned, such a trajectory can be conveniently defined by a series of position, velocity and time values grouped into frames, referred to as PVT frames.

Figure 6:
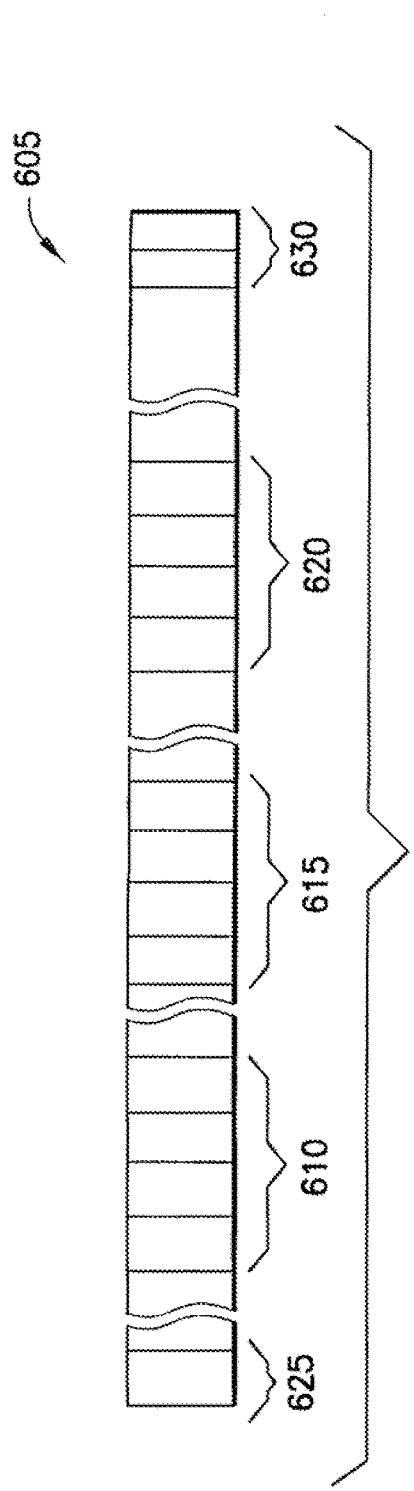
FIG. 6 shows an exemplary PVT frame used to convey position, velocity, and time information.

FIG. 6 shows an exemplary PVT frame 605. The PVT frame 605 includes position data 610, velocity data 615, and time data 620. In one embodiment the data is in binary format grouped together in one or more bytes. In another embodiment each of the position data 610, velocity data 615, and time data 620 occupies four bytes. PVT frame 605 may optionally include header information 625 and trailing information 630, both of which may include synchronizing, identification, parity, error correction, or other types of data. PVT frame 605 may include additional data of varying lengths or amounts between or among the header, position, velocity, time, and trailing data. It should be noted that while FIG. 6 shows the various information or data in specific locations or areas of the frame, the different types of information and data may be located anywhere within the PVT frame 605. It should also be noted that the PVT frame 605 is not limited to any particular length.

It is a feature of the disclosed embodiments to use these series of values as inputs for a dynamic model of the controlled machine to calculate a theoretical torque to be applied to each axis so that each axis follows the desired trajectory. It is also a feature of the disclosed embodiments to use elements of the dynamic model to scale feedback control signals used by the remote controllers for each axis.

The torque and scaling terms may advantageously account for non linearities and dynamic cross coupling among individual machine axes. The torque term is referred to herein as a feedforward term because it may not be dependent on an actual state of an axis, such as position or velocity. The scaling term is referred to as a gain term.

Figure 7:
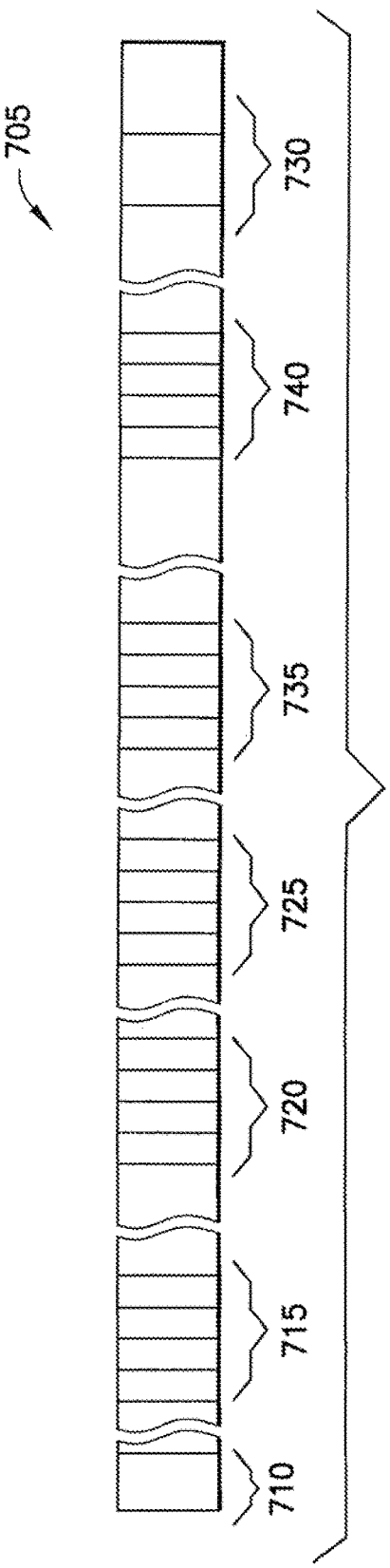
FIG. 7 shows an exemplary PVT-FG frame used to convey position, velocity, and time information with feedforward and gain terms.

Using the work-cell of FIG. 5a as an example, the master controller 580 may generate a trajectory for each axis of robot 510 in terms of a commanded position, velocity and acceleration. Using an inverse dynamic model of the robot 510, the master controller may utilize the trajectory information to generate corresponding feedforward, and gain terms. These terms may be grouped together with the trajectory information in frames specific to each axis, referred to as PVT-FG frames. FIG. 7 shows an exemplary PVT-FG frame 705. PVT-FG frame 705 includes optional header 710 position 715, velocity 720, time 725, and optional trailing information 730, similar to PVT frame 605. In addition, PVT-FG frame 705 includes at least one feedforward term 735 and at least one gain term 740. The data may be in binary format grouped together in one or more bytes. In one embodiment of PVT-FG frame 705 the position 715, velocity 720, time 725, feedforward 735, and gain 740 terms each occupy four bytes. Similar to PVT frame 605, PVT-FG frame 705 may include other data of varying lengths or amounts, distributed among or between the various terms.

The PVT-FG frames may then be distributed over the network 595. The cluster controller 540, which receives the data, may interpolate between two consecutive frames to obtain an instantaneous position, velocity, feedforward term and gain value, and utilize this information to control the robot 510. Similarly, the cluster controller 545 and autonomous remote controllers 585, 590 may receive corresponding data from the master controller 580, and utilize them to control the robot 520 and aligners 515, 525, respectively.

An exemplary technique for developing the feedforward and gain terms will now be explained in detail. The following dynamic model may be used:

$$\tau_i = \sum_{j=1}^{n} M_{ij}(\{\theta_{act}\})[\ddot{\theta}_{cmdj} + u_j(\theta_{cmdj}, \dot{\theta}_{cmdj}, \theta_{actj})] + \qquad(1)$$

$$h_i(\{\theta_{act}\}, \{\dot{\theta}_{act}\})$$

$$= \sum_{j=1}^{n} M_{ij}(\{\theta_{act}\})u_j(\theta_{cmdj}, \dot{\theta}_{cmdj}, \theta_{actj}) +$$

$$\sum_{j=1}^{n} M_{ij}(\{\theta_{act}\})\ddot{\theta}_{cmdj} + h_i(\{\theta_{act}\}, \{\dot{\theta}_{act}\})$$

where $\tau_i$ denotes torque applied to axis i, $\theta_{acti}$ and $\theta_{cmdi}$ are actual and commanded positions of axis i, respectively, $\{\theta_{act}\}$ and $\{\theta_{cmd}\}$ stand for position vectors defined as $\{\theta_{act}\}=\{\theta_{act1}, \theta_{act2}, \ldots, \theta_{actn}\}^T$ and $\{\theta_{cmd}\}=\{\theta_{cmd1}, \theta_{cmd2}, \ldots, \theta_{cmdn}\}^T$, $M_{ij}$ is an inertia matrix element indicating inertial cross-coupling between axes i and j, $h_i$ is a function including other position- and velocity-dependent dynamic effects for axis i, such as centrifugal, Coriolis and gravity terms, $u_i$ stands for control law output for a unit-inertia system corresponding to axis i, i varies from 1 to n, n is the total number of axes or degrees of freedom, and dot and double-dot indicate first and second time derivatives, respectively.

Provided that position and velocity tracking errors are small, the actual positions and velocities can be approximated with commanded quantities. Furthermore, neglecting the $M_{ij}u_i$ terms for i≠j, the dynamics of Equation (1) can be rewritten and approximated as the following inverse dynamic model:

$$\tau_i = M_{ii}(\{\theta_{cmd}\})u_i(\theta_{cmdi}, \dot{\theta}_{cmdi}, \theta_{acti}) + \qquad(2)$$

$$\sum_{j=1}^{n} M_{ij}(\{\theta_{cmd}\})\ddot{\theta}_{cmdj} + h_i(\{\theta_{cmd}\}, \{\dot{\theta}_{cmd}\}) = G_i u_i + F_i$$

where:

$$G_i = M_{ii}(\{\theta_{cmd}\}) \qquad(3)$$

$$F_i = \sum_{j=1}^{n} M_{ij}(\{\theta_{cmd}\})\ddot{\theta}_{cmdj} + h_j(\{\theta_{cmd}\}, \{\dot{\theta}_{cmd}\}) \qquad(4)$$

The above expressions for $G_i$ and $F_i$ define the gain and feedforward terms, respectively. The index i indicates which axis the feedforward and gain terms will be applied to. In order to further improve control performance, a disturbance observer may be utilized for each axis to compensate for the simplifications made.

The trajectory and inverse dynamic model computations for the controlled machine, in this example robot 510, may be performed by master controller 580. When values for $G_i$ and $F_i$ have been determined, master controller 580 may assemble PVT-FG frames for each axis and distribute them over the network 595 to the cluster controller 540 of the robot 510.

Cluster controller 540 of robot 510 may have instructions and algorithms stored in its memory to operate the robot 510, for example, by sending torque commands and receiving feedback signals between itself and the remote controllers 550, 555, 560. Using the PVT-FG frames from the master controller 580, the cluster controller 540 calculates enhanced torque commands for each axis controlled by remote controllers 550, 555, 560. The torque commands are said to be enhanced because the inverse dynamic model of Equation 2 and the resulting $G_i$ and $F_i$ terms from Equations 3 and 4, respectively, at least include elements and functions that represent inertial cross coupling between axes (e.g. $M_{ij}$) and position and velocity dependent effects (e.g. $h_i$). Thus, the cluster controller 540 calculates the torque commands using the $G_i$ and $F_i$ terms, resulting in torque commands that more accurately control the motion of the axes with which they are associated.

Once the enhanced torque commands have been calculated, the cluster controller 540 may then distribute them to the appropriate remote controller 550, 555, 560. Remote controllers 550, 555, 560 may generally be pre-programmed with the characteristics of the axes they control, such as the number of motors, phases per motor, phase resistance, back EMF constant, etc. In response to the enhanced torque commands, remote controllers 550, 555, 560 may compute the proper voltages, currents, or power to be applied to the motors they control.

Various algorithms including those using Equation 2, Equation 1, and a conventional single-input-single-output (SISO) feedback algorithm were applied to a five-axis robot similar to robot 510 to compare tracking errors and to verify the efficacy of the exemplary technique for developing the gain and feed forward terms, $G_i$ and $F_i$, respectively. The five-axis robot was a type generally utilized for automated pick-place operations in semiconductor manufacturing applications. The five-axis robot included an articulated arm with two end-effectors operating in parallel horizontal planes complemented by a vertical lift drive. This particular application represented a challenging test bed since the dynamics are highly non-linear with strong cross-coupling among axes. Among other operations, the five-axis robot was commanded to perform a straight-line extension move of a first end-effector in the radial direction.

Figure 8:
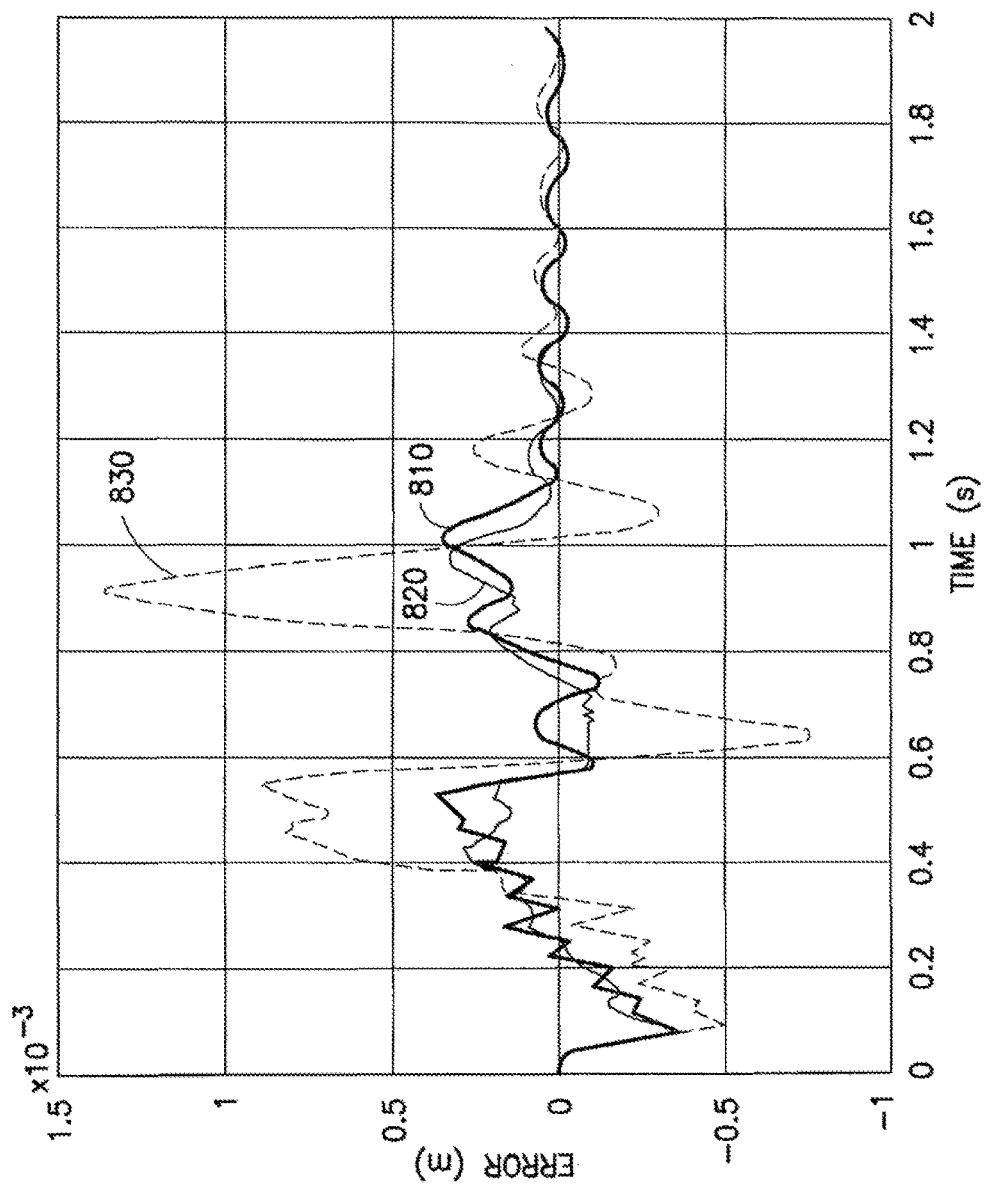
FIG. 8 shows a comparison of empirically derived tracking errors using different types of control algorithms.

FIG. 8 shows the measured tracking error of the first end-effector, in particular its normal component which indicates the deviation of the first end-effector from the desired straight-line path, for each applied algorithm. It is observed that the tracking performance of the algorithm using Equation 2 (810) closely approaches the performance of the algorithm using Equation 1 (820), and clearly outperforms the conventional single input single output feedback algorithm (830).

As mentioned previously with respect to the clustered architecture control system 100, it is important to accurately synchronize the axes of the system to maximize throughput and to guarantee collision-free operation.

It is a feature of the disclosed embodiments to synchronize operations controlled by the clustered architecture control system 100 by maintaining a common, accurate time reference on each of the network nodes, and by time stamping all time dependent network traffic. In particular, PVT and PVT-FG frames are stamped with a time at which the action described by the frame should occur, thus ensuring synchronization of axis motions across the communication network 120.

Referring to FIG. 2, the master controller 105 includes time keeping circuitry 260 which may have a high resolution register 265 and a low resolution register 270. The master controller may also include timing control circuitry for performing other operations associated with maintaining a common time reference among the network nodes. Referring to FIG. 3, each cluster controller 110 may also have time keeping circuitry 340 with a high resolution register 345 and a low resolution register 350. Referring also to FIG. 4, each remote controller 115 and autonomous remote controller 150 also may have time keeping circuitry 450 including a high resolution register 455 and a low resolution register 460.

Figure 9A:
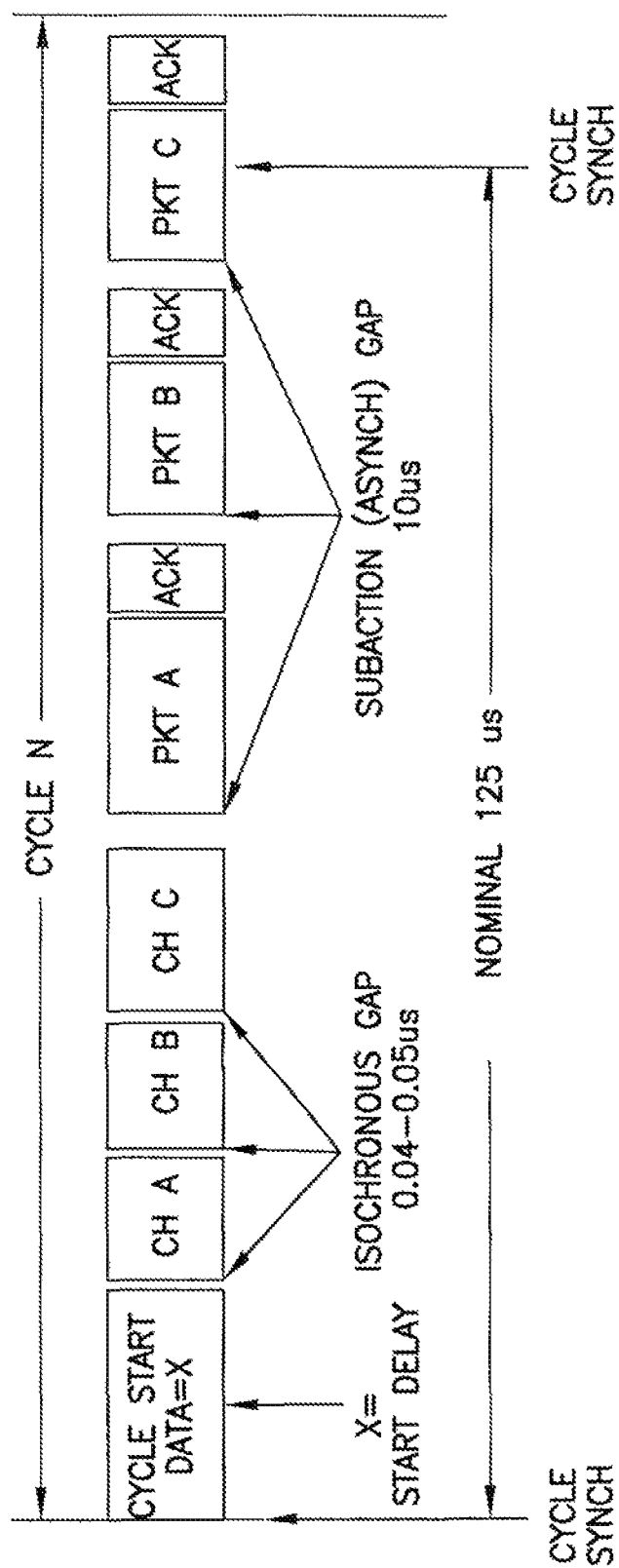
FIG. 9a shows an exemplary bus cycle of the communications network of the disclosed embodiments.
Figure 9B:
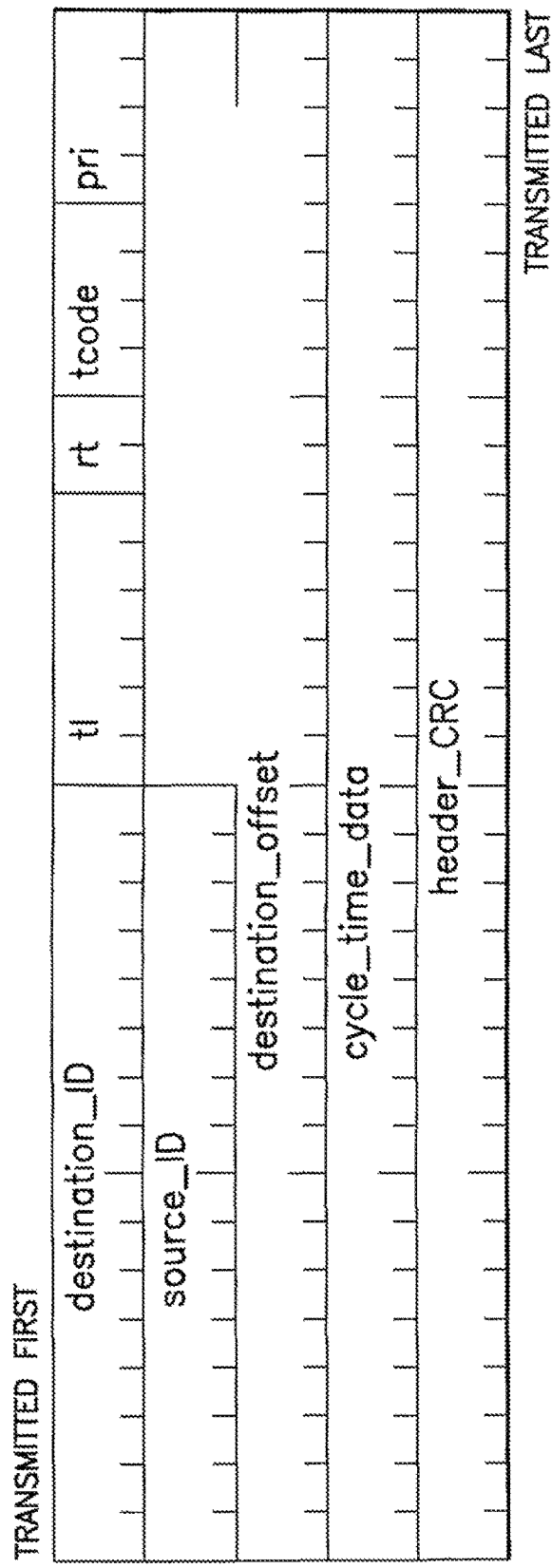
FIG. 9b shows an exemplary cycle start message of the communications network of the disclosed embodiments.
Figure 9C:
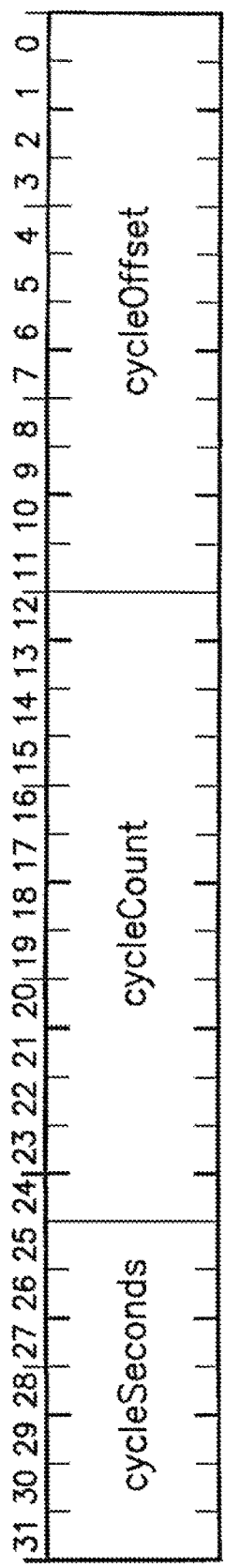
FIG. 9c shows an exemplary high resolution register for synchronization among communication network nodes.

In order to maintain a common time reference, the master controller may issue "cycle start" messages at the beginning of each bus cycle on the communication network 120. An exemplary bus cycle may occupy approximately 125 usec and may begin with the "cycle start" message followed by intervals for isochronous traffic and asynchronous traffic, as shown in FIG. 9a. FIG. 9b shows an exemplary cycle start message, and FIG. 9c shows an exemplary high resolution register 265, 345, 455.

Referring back to FIG. 2, the network interface 230 may generally provide a mechanism for automatically updating the high resolution registers 265, 345, 455 based on each cycle start message.

Each network node may also include a mechanism that provides interrupts when a new isochronous cycle has started, that is when the low order bit of the high resolution register toggles, and when 64 seconds have expired, indicating that the $7^{th}$ bit of the high resolution register has changed. When the communication network 120 is an IEEE 1394 network, some or all of the features described above may be provided according to the IEEE 1394 standard. In an IEEE 1394 network the high resolution registers may be referred to as CYCLE_TIME registers and the low resolution registers may be referred to as BUS_TIME registers.

Network synchronization may be achieved as follows. After the communication network 120 has been initialized or reset, the master controller 105 may assume control over the communications network 120 and may maintain the low resolution register 270 utilizing time keeping circuitry 260 and timing control circuitry 275. Each cluster controller 110, remote controller 115, and autonomous remote controller 150 may synchronize its own low resolution register 350, 460 with the low resolution register 270 on the master controller 105 on initialization or reset. Each cluster controller 110, remote controller 115, and autonomous remote controller 150 then maintains and updates its low resolution register 350, 460 based on its high resolution register 345, 455. The communication network 120 itself may generally provide facilities for automatic synchronization of the high resolution registers 265, 345, 455 across the communication network 120. The master controller 105 sends PVT or PVT-FG frames to the cluster controllers 130 or to the autonomous remote controllers 150.

In the synchronized system disclosed herein, the PVT or PVT-FG frames include a time stamp which indicates when in the future the PVT or PVT-FG frame should be executed. Upon reaching the indicated time, the cluster controllers 130 and autonomous remote controllers 150 operate their respective axes according to the information received in the frames.

In summary, a common time reference is maintained among the master controller 105, the cluster controllers 110, the remote controllers 115, and the autonomous remote controllers 150. By maintaining the common time reference and time stamping the PVT and PVT-FG frames with a time at which the action described by the frame should occur, synchronization of axis motions across the communications network 120 may be accurately sustained.

As mentioned above, a lightweight IEEE 1394 protocol has been developed for industrial control devices, referred to as the Instrument and Industrial Control Protocol (1394TA IICP, referred to as "IICP").

The IICP and other similar protocols may provide flow control, a framework for creating and closing communication connections among system components, a mechanism for reactivating connections after bus reset, and a mechanism of resolving PHY addresses to communication connections, from a master controller, thus removing the burden of enumerating the network from the remote controllers. In addition, communication connections may persist over a bus reset event when using these types of protocols.

It is a feature of the disclosed embodiments to provide extensions to the protocol being used that include a usage scheme and a message format for exchanging information among the master controller 105, the cluster controllers 110, and the autonomous remote controllers 115. The usage scheme and message format are referred to collectively as the protocol extensions.

The network protocol extensions described herein are advantageous in that they provide a specific message framework for network communication messages. The contents of the messages may be transparent to the transfer protocol employed.

Figure 10:
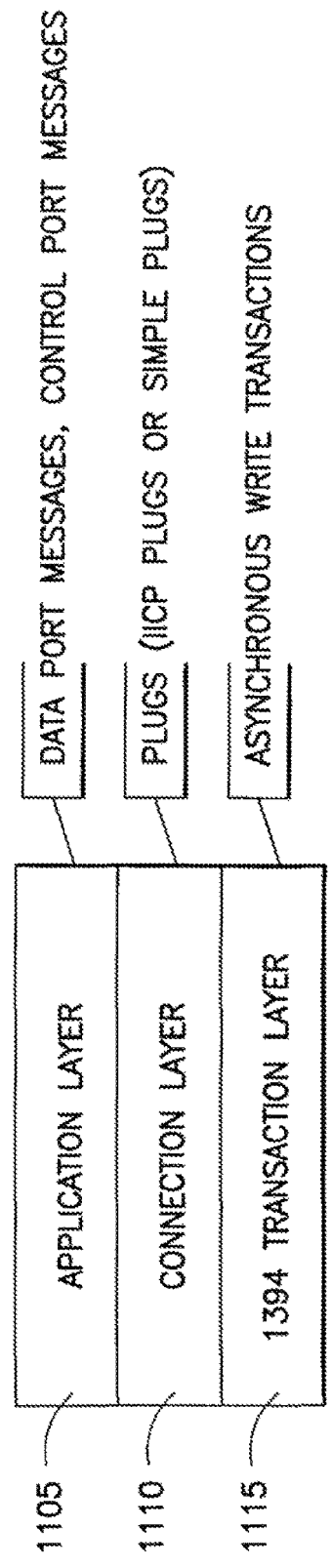
FIG. 10 shows a communication protocol structure.

An exemplary structure of the type of protocol being used in the control system 100 is shown in FIG. 10. The protocol may include an application layer 1105, a connection layer 1110, and a transaction layer 1115. The application layer 1105 uses the facilities of the connection layer 1110 and assumes that point to point connections, referred to as plugs, are established between a master device, such as the master controller 105 (FIG. 1, 1*a*-1*b*) and a remote device, such as a remote controller 150 (FIG. 1,1*a*-1*b*).

Figure 11:
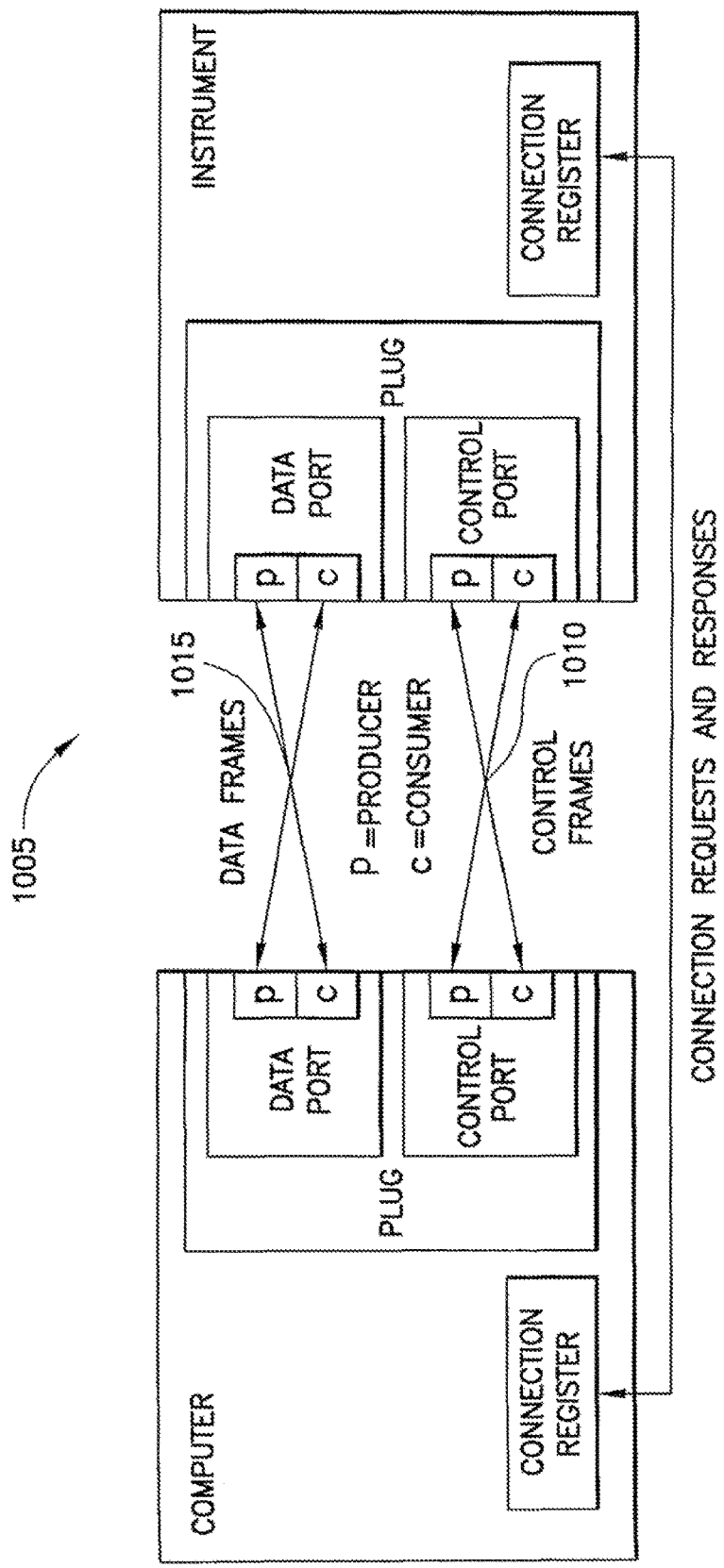
FIG. 11 shows a plug implementation as part of the communications protocol structure.

FIG. 11 shows an example of how these plugs may be implemented. The master device may open one or more plugs 1020 to each of the remote devices. A plug 1020 provides one or more ports 1025, 1030. Each port 1025, 1030 provides means for sending frames, such as PVT or PVT-FG frames, where the frames are opaque pieces of data from the port's perspective. A port 1025, 1030 generally operates in a duplex mode, i.e. data can be concurrently sent in both directions. The application layer 1105 may use the ports as a control port 1030 or a data port 1025. Messages on the control port 1030 generally have meta data incorporated in the header of the message, describing the content of the message. Data port messages generally lack such metadata. The remote controller 150 and the master controller 105 are generally made aware of the data port message structure through programming, predetermined tables, definitions, or by other means. Messages on a control port 1030 may define the content of, or otherwise identify messages on one or more data ports 1025. In some embodiments this may allow data port messages to be sent without header information or any message definition, lowering the overhead associated with sending such messages. The interaction between the control and data ports may be isolated to a particular plug, or messages on a particular control port may provide control for data ports of other plugs opened to the same or different remote devices.

It should be understood that the protocol extensions described in the disclosed embodiments are not limited in use to a particular protocol but may be used with any protocol that supports plugs.

The application layer extensions described herein utilize a layered approach that may include relatively simple control port message types. The extensions may also provide a framework for vendor specific extensions, that is messages that may be tailored specifically for a particular device manufacturer's component. This facilitates the use of vendor specific application layer command sets, wrapped in a number of control port message types. Data port message format may also be vendor specific.

A control port 1030 may generally exchange commands and responses between system components. A data port 1025 may transmit data frames which are addressed to specific objects on a remote controller or the master controller. Addressing may generally be implied from the port designation and may not be part of the message. The data port message structure may generally be vendor specific.

An exemplary control message structure 1700 is presented in FIG. 17. A Quadlet 1705 may denote a 32-bit wide piece of data. The D field 1710 may designate a direction, indicating whether the message is sent, for example, from the master controller 105 to a remote controller 150, or vice versa. The message type 1715 may designate a defined message type explained below. Up to $2^{15}$ message types may be defined. The Message ID field 1720 may be used for matching commands and response for transaction-like messages, for example, ACTION type messages. For stream-like messages, for example, STRING type messages, the Message ID field 1720 may be used to provide additional ordering information. ACTION and STRING type messages will be explained below. In some embodiments the Message ID field 1720 may be optional. The Reserved field 1725 may provide a placeholder for vendor specific extensions within the message header. Some specific control port messages may include ACTION, EVENT, and STRING type messages. The messages sent on the control port of a plug may all have similar structure. It is a feature of the disclosed embodiments that these message types may be relatively few, allowing a significant flexibility on the remote controller level in the implementation of specific commands. For example, all commands for setting and getting parameters may be ACTION commands, where the actual parameter to be set/get as well as the format of the data may be further defined by the remote controller manufacturer. Thus, remote controller manufactures may only be required to implement a very limited command set in order to be compliant with the control system.

An exemplary ACTION message 1800 is shown in FIG. 18. The ACTION message 1800 may be used to send commands to remote controllers and for remote controllers to send responses to previously sent commands from the master controller. A response to a previously sent ACTION command may generally copy the header of the command except for the D field 1810. For ACTION commands the Message ID field 1820 may be required. The format of the body of the message may be specific to a particular remote device vendor.

ACTION messages may be used for setting, getting, or storing configuration parameters on a remote device such as a remote controller, configuring one or more data ports for tracing, event, status, PVT or other application specific operations, operating I/O on a remote device, sending motion commands for discrete moves when trajectory is generated on the remote device, and for sending any other distinct command that the remote device supports, e.g. for configuration, diagnostics or transitioning the device to a another operational state. ACTION messages may be vendor specific.

In ACTION response messages from a remote device to the master controller, the reserved field 1825 may include an 8-bit vendor specific result code. With this provision, responses to ACTION commands that only include a result code can be implemented by sending only a header in response. Commands for setting parameter values in the remote device are an example of such a mode of operation.

The vendor specific header 1830 may indicate one of set, get, or store for a specific device parameter. The Axis ID field 1835 provides further dispatching for up to 256 axis (or instances) for the specific device parameter for a specific device. The Vendor command ID 1840 may indicate a vendor specific device parameter or command. The Vendor command ID 1840 may support up to 2^16 individual commands or parameters. The Vendor specific command parameters 1 . . . n 1845 may provide one or more optional parameters in a command or a response.

An exemplary EVENT message structure 1900 is shown in FIG. 19. The EVENT message 1900 is used to send event data from the remote controller to the master controller. The EVENT message may also provide mechanism for using a control port message instead of opening a separate plug for a given application specific data transfer. Event data may be sent through EVENT messages in lieu of opening an event specific plug.

The Message ID field 1920 in the message header is used to indicate a virtual event connection number. The value in this field may be a parameter in a vendor-specific "add parameter to event" control message.

An example of a vendor specific EVENT message 2000 is presented in FIG. 20. In this example, up to 6 virtual event connections may be set up. The number of event parameter fields, in this example, "Event parameter 1 . . . 6 (2045), depend on the specific drive parameter that is setup for event capture. These fields represent parameter values at the occurrence of the event. The event parameter fields contain 0 if a given parameter is not set for event capture. For this particular device manufacturer, up to 6 parameters can be configured as event parameters.

The STRING message type is used to create a virtual serial channel from the master controller to the remote controller and vice versa by sending unformatted text data. An example of a STRING message structure 2100 is depicted in FIG. 21.

The message ID 2120 may increase sequentially with every message sent from the remote device or the master controller (these counters increase independently) and provides additional means of sequencing the traffic if the messages are received out of order.

An exemplary vendor specific STRING command 2200 is presented in FIG. 22. In this example, the series of message bodies 2245 may each comprise four characters. The remote device for this example may support up to 6 quadlets of message body information and may encode characters using plain text ASCII encoding.

Data port message structures may generally represent pure data and may have no header. They may also be remote device vendor specific and should be interpreted in that context. The remote device manufacturer in this example uses PVT Status and TRACE message types. Other message types may also be used.

An exemplary PVT or PVT-FG message structure 2300 is shown in FIG. 23. The PVT message may generally represent one trajectory set point along a motion path. As previously mentioned, a PVT or PVT-FG message is generally sent from the master controller 105 to one or more cluster controllers 110 or autonomous remote controllers 150. The PVT or PVT-FG messages are used to send time-stamped trajectory set point data. Optionally, the PVT or PVT-FG messages may also include a torque limit term. The PVT or PVT-FG messages may also be used to send a periodic timestamp when the receiving cluster controller 110 or autonomous remote controller 150 is in a pre-operational state. The PVT or PVT-FG message may be sent at a periodic rate, for instance 100 Hz. In one embodiment, the PVT message includes a commanded position 2305, a commanded velocity 2310, and the network time 2315. The PVT or PVT-FG message may optionally include one or more of a feed forward term 2320, a gain term 2325, and a torque limit term 2330.

The STATUS message may generally present the remote device state at the time the STATUS message was generated. An example of a STATUS message 2400 is depicted in FIG. 24.

The STATUS message is generally sent from the one or more cluster controllers 110 or autonomous remote controllers 150 to the master controller 105. The STATUS message may be used to send time-stamped status, actual position and velocity data from one or more cluster controllers 110 or autonomous remote controllers 150 to the master controller 105.

Optionally, the STATUS message may be used to send time-stamped I/O data. The STATUS message may be sent at a periodic, for instance 100 Hz, rate or may be sent at an acyclic rate for low-latency I/O event capture. In one embodiment, the STATUS message includes an actual position 2405, states of various digital I/O devices 2410, a timestamp 2415, a commanded position 2420, an actual velocity 2425.

The status word 2430 contains information about the drive error/fault/warnings state. It contains also information about the state of the remote device PVT buffer (flow-control information).

An exemplary TRACE message 3200 is presented in FIG. 32. A TRACE message can contain up to n sampling records, each record may have up to m samples. The frame should comply also with the following device-specific constraints:

$$n*m<=128$$

$$m<=6$$

The TRACE_message 3200 is generally sent from the one or more cluster controllers 110 or remote controllers 115, 150 to the master controller. The TRACE_message 3200 is used to send time-stamped, periodically sampled, diagnostic data to the master controller 105. The TRACE_message 3200 may be sent at a periodic or variable rate of up to, for example, 16 kHz, and may be settable through an ACTION command. The structure of the data and other parameters of the trace (trigger, delay, sampling rate, etc.) is also settable through ACTION commands. In addition, like some of the other messages, the TRACE_message 3200 may be sent through a plug specifically opened to support high resolution data transfer. In one embodiment, the TRACE_message includes a number of trace variables 3205.

The protocol extensions of the disclosed embodiments may include specific implementations of the TRACE_message that may include such message types as PVTFG, HIRES_POS, and HIRES_VEL messages. The STATUS message described above may also constructed as a specific implementation of a TRACE message.

As previously mentioned, a PVT or PVT-FG message is generally sent from the master controller 105 to one or more cluster controllers 110 or autonomous remote controllers

150. The PVT or PVT-FG messages are used to send time-stamped trajectory set point data. Optionally, the PVT or PVT-FG messages may also include a torque limit term to support a teach mode, as will be described in detail below. The PVT or PVT-FG messages may also be used to send a periodic timestamp when the receiving cluster controller 110 or autonomous remote controller 150 is in a pre-operational state. The PVT or PVT-FG message may be sent at a periodic, for instance 100 Hz, rate. In one embodiment, the PVT message includes a timestamp of 4 bytes, a commanded position of 4 bytes, and a commanded velocity of 4 bytes. The PVT-FG message may optionally include one or more of a feed forward term of 4 bytes, a gain term of 4 bytes, and a torque limit of 4 bytes.

A HIRES_POS message is generally sent from the one or more cluster controllers 110 or autonomous remote controllers 150 to the master controller 105. The HIRES_POS message is used to send time-stamped, periodically sampled, actual position from one or more nodes to the master controller. The HIRES_POS message may be sent at a periodic or variable rate of up to, for example, 16 kHz, and may be settable through an ACTION command discussed below. In addition, the HIRES_POS message may be sent through a plug opened specifically for high resolution data transport. In one embodiment, the message includes a block having a timestamp of 4 bytes and an actual position of 4 bytes. The block may be repeated up to 16 times, representing 1 ms worth of data at a 62.5 sampling rate, with a total length up to 128 bytes.

In an alternate format, the HIRES_POS message may include a timestamp of 4 bytes, and a repeating actual position field of 4 bytes, that may repeat up to 16 times representing 1 ms worth of 16 kHz sampled data. The message may be constructed with one timestamp per frame assuming that samples are equally spaced with the sampling rate, and that the first position field is sampled at the time specified in the stamp.

A HIRES_VEL message is generally sent from the one or more cluster controllers 110 or autonomous remote controllers 150 to the master controller 105. The HIRES_VEL message is used to send time-stamped status, and periodically sampled actual velocity data to the master controller 105. The HIRES_VEL message may be sent at a periodic or variable rate of up to, for example, 16 kHz, and may be settable through an ACTION command discussed below. In addition, the HIRES_VEL message may be sent through a plug opened specifically to support high resolution data transfers. In one embodiment, the HIRES_VEL message may include a timestamp of 4 bytes and an actual velocity of 4 bytes.

In addition to carrying information from the cluster controllers 110 and autonomous remote controllers 150 to the master controller 105, STATUS, HIRES_POS and HIRES_VEL messages in accordance with the above description may be sent from one or more remote controllers 115 to one of the cluster controllers 110 or to the master controller 105.

Thus, the disclosed embodiments include protocol extensions, that is, a unique message set for exchanging information among the master controller 105, cluster controllers 110, remote controllers 115, and autonomous remote controllers 150. The unique message set is advantageous because it provides additional functionality for the clustered architecture control system 100 over and above the services provided by a standard network protocol, for example, the 1349TA IICP.

Figure 12:
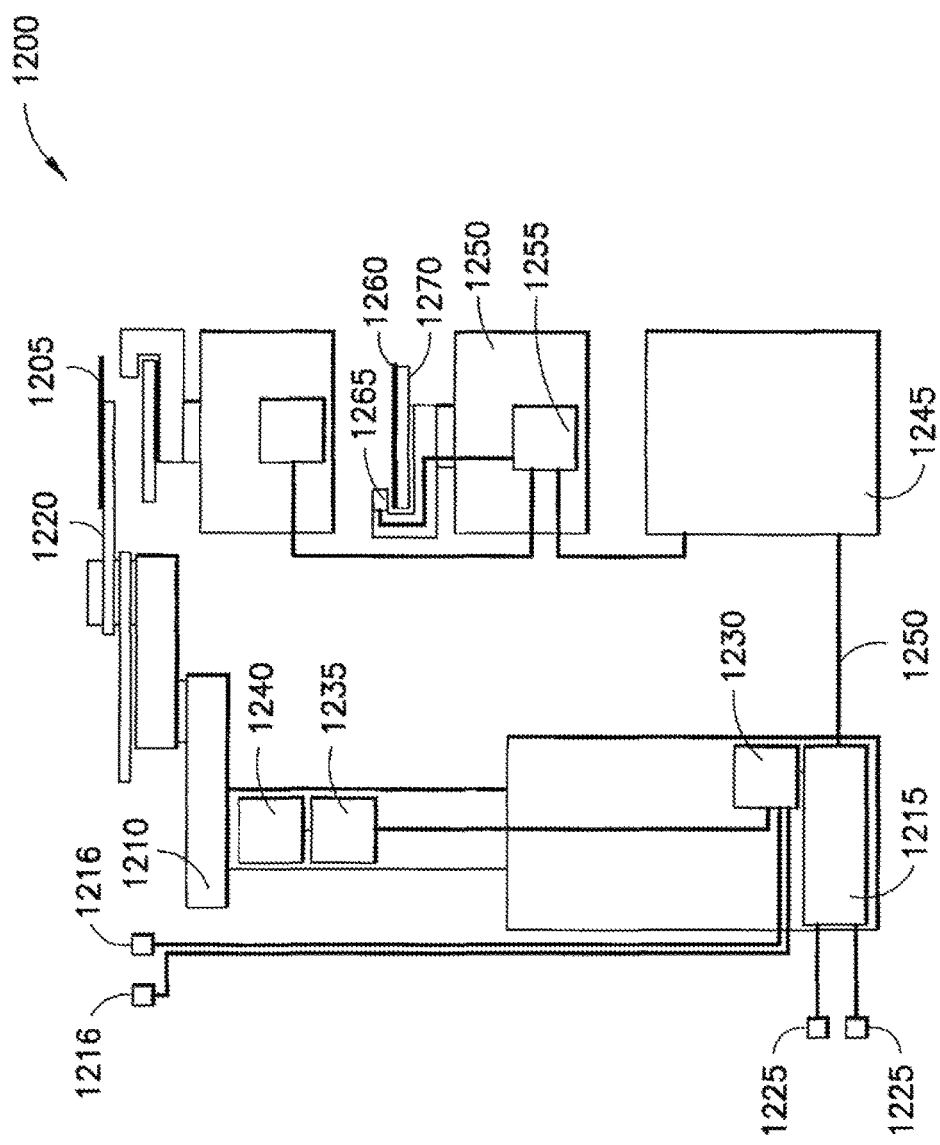
FIG. 12 shows a diagram of a work cell.

In a control system such as the clustered architecture control system 100 it may be advantageous to capture instantaneous axis or other characteristics from one or more of the cluster controllers 110 or remote controllers 115, 150 upon the occurrence of a particular event. FIG. 12 shows a work cell 1200 where such a feature may be beneficial. Work cell 1200 includes a robot 1210 with a cluster controller 1215 and three remote controllers 1230, 1235, 1240. The cluster controller 1215 communicates with a master controller 1245 through communications network 1250. In one embodiment, the work cell 1200 may be part of the clustered architecture control system 100 (FIGS. 1, 1*a*-1*b*).

As an example, "on the fly" recognition and correction for eccentricity or misalignment of a circular payload, such as a semiconductor substrate 1205, carried by the robot 1210, may require instantaneous data capture. In this case, the robot 1210 may move through a set of stationary sensors 1216 which detect the leading and trailing edges of the payload 1205. Remote controllers 1230, 1235, 1240 may capture certain characteristics, such as the positions and velocities of each axis of the robot 1210, and provide the data to master controller 1245. The master controller 1245 may then determine the position of the robot's end-effector 1220 as the payload edges are detected, and then determine the actual location of the center of the payload 1205. Once the payload center is determined, the master controller 1245 may alter the trajectory of the robot 1210 so that the payload 1205 is delivered in a centered manner regardless of the amount and direction of the initial eccentricity.

In another example, the robot 1210 may include one or more interlocks 1225 coupled to cluster controller 1215. If an interlock 1225 is tripped for some reason, it may be important to determine the positions of the robot's axes and the positions of other equipment the robot 1210 may be interacting with at the time the interlock 1225 is tripped.

It is a feature of the disclosed embodiments to capture instantaneous data from a set of axes of the clustered architecture control system 100 upon the occurrence of, or associated with, a triggering event. While the procedures described below generally include the master controller 1245, it should be understood that a cluster controller or remote controller with appropriate processing power and memory may also perform the functions provided by the master controller 1245.

Figure 13:
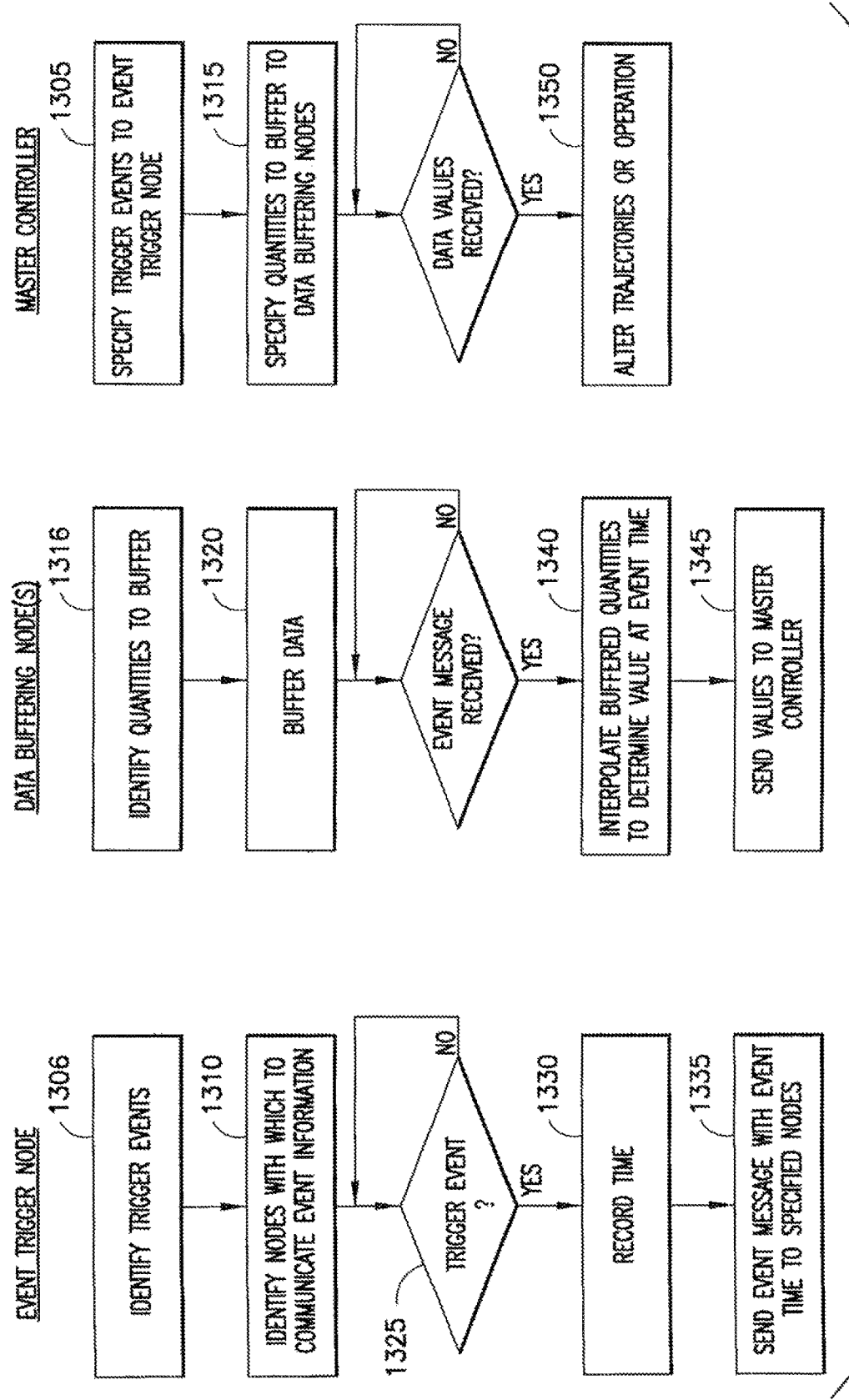
FIG. 13 shows flow diagrams for an instantaneous data capture sequence.

Referring to FIG. 12 and to the flow chart of FIG. 13, an instantaneous data capture sequence may proceed as follows. The remote controllers 1230, 1235, 1240 may be instructed to recognize certain events as trigger events, for example, a changing output state of one or more of the sensors 1216, as shown in blocks 1305 and 1306. The remote controllers 1230, 1235 1240 may also be instructed to communicate with a specified set of nodes upon the occurrence of a particular event as shown in block 1310. The remote controllers 1230, 1235 1240 may further be instructed to buffer one or more particular quantities of interest, for example, an axis position or velocity, at a specified sampling rate, typically lower than that of the servo loop used to control a particular axis, as shown in blocks 1315 and 1316. Thus, at least in one embodiment, every data point of a quantity of interest may not be sampled. The instructions may be part of each remote controller's operating system or instructions may be provided from cluster controller 1215 or master controller 1245. The quantity of interest, trigger events, and specified set of nodes may be different for each remote controller.

Once instructed, remote controllers 1230, 1235 1240 begin buffering data (block 1320) and observing for trigger events (block 1325). Upon occurrence of the trigger event, the remote controller recognizing the event records the time of the event as shown in block 1330, and as shown in block 1335, sends a message with the event time information to the specified set of nodes for the particular event. The specified nodes interpolate their buffered quantities of interest to determine a value for the quantities at the event time as shown in block 1340. The specified nodes send the interpolated values of the quantities of interest to the master controller as shown in block 1345. The master controller may then use the data to alter trajectories or operations within the system as shown in block 1350.

In some cases, direct communication among the remote controllers may not be desirable, e.g., due to a large number of plugs required. In this case, the master controller may distribute the event time to the specified nodes.

Figure 14:
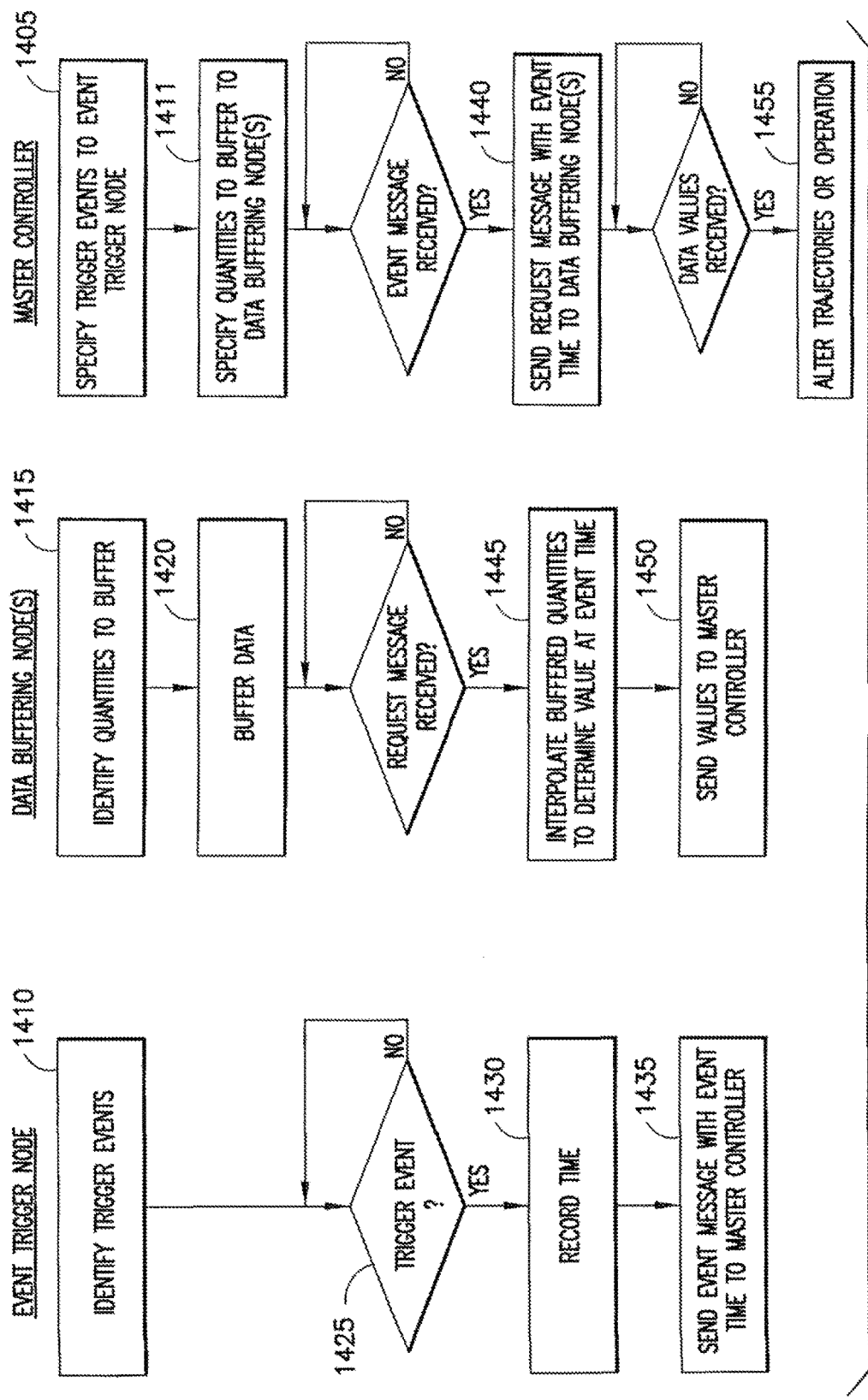
FIG. 14 shows flow diagrams for another embodiment of an instantaneous data capture sequence.

An instantaneous data capture data procedure modified to accommodate event time distribution by the master controller may proceed as follows. Referring now to FIGS. 12 and 14, the remote controllers 1230, 1235, 1240 may be instructed to recognize certain events as trigger events as shown in blocks 1405 and 1410, for example, a changing output state of one or more of the sensors 1216. The remote controllers 1230, 1235, 1240 may be instructed to buffer one or more particular quantities of interest as shown in blocks 1411 and 1415, for example, an axis position or velocity, at a specified sampling rate, typically lower than that of the servo loop used to control a particular axis. Once instructed, remote controllers 1230, 1235 1240 begin buffering data (block 1420) and observing for trigger events (block 1425).

Upon occurrence of the trigger event, the remote controller recognizing the event records the time of the event as shown in block 1430 and sends a message with the event time information to the master controller 1245 as shown in block 1435. The master controller 1245 then sends the event time to the set of nodes specified for the particular event as shown in block 1440. In block 1445, the specified nodes interpolate their buffered quantities of interest to determine a value for the quantities at the event time. As shown in block 1450, the specified nodes send the interpolated values of the quantities of interest to the master controller 1245. The master controller 1245 may then use the data to alter trajectories or operations within the system 1200, as shown in block 1455.

As another alternative, if one or more remote controllers do not possess sufficient resources for data buffering and interpolation, for example, due to limited memory or computational power, these operations may also be performed by the master controller. However, this approach may result in an increase in communication network traffic.

Figure 15:
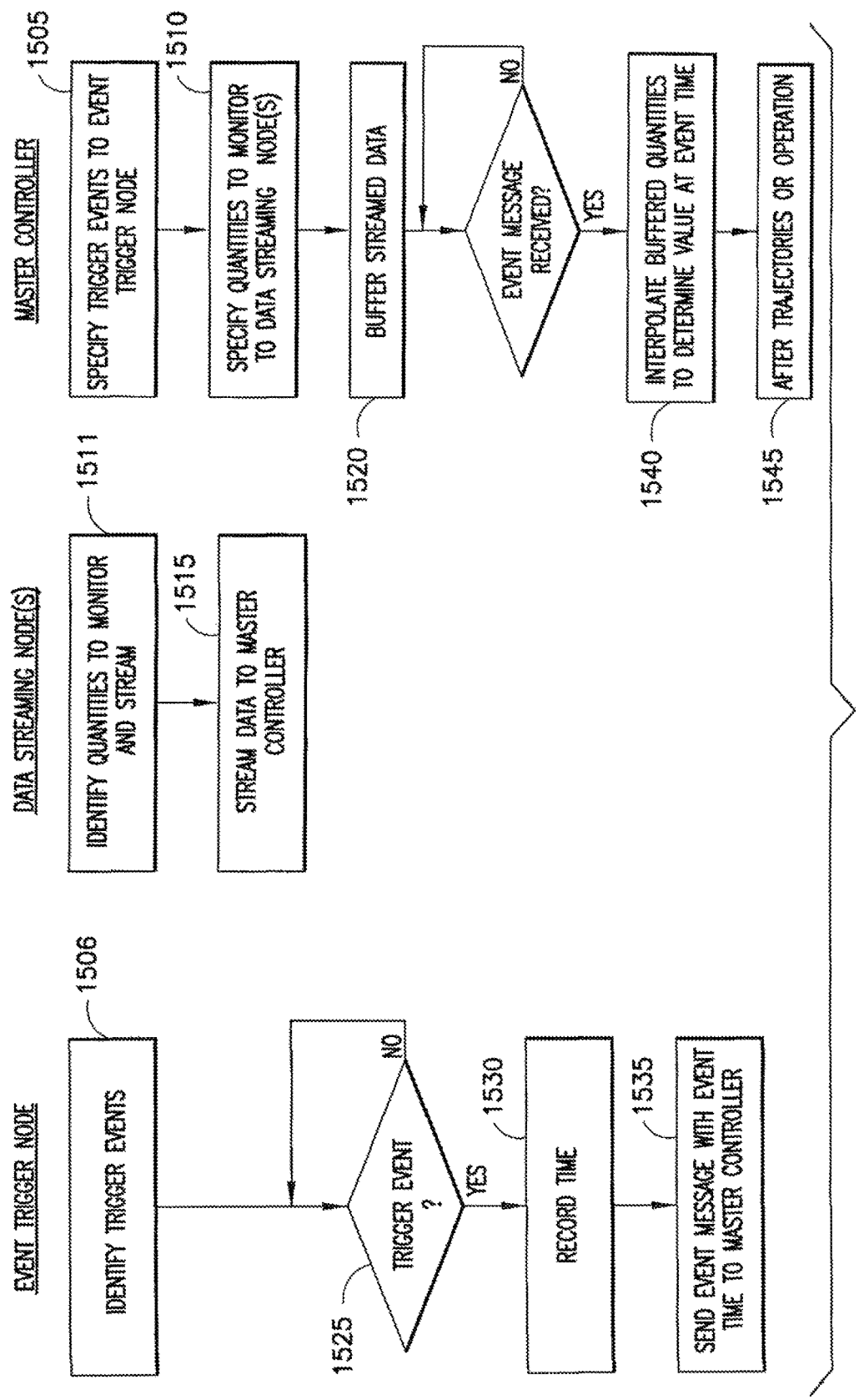
FIG. 15 shows flow diagrams for still another embodiment of an instantaneous data capture sequence.

With reference to FIGS. 12 and 15, an instantaneous data capture procedure modified to accommodate data buffering and interpolation by the master controller 1245 may proceed as follows. As shown in blocks 1505 and 1506, the remote controllers 1230, 1235, 1240 may be instructed to recognize certain events as trigger events, for example, a changing output state of one or more of the sensors 1216. As shown in blocks 1510 and 1511, the remote controllers 1230, 1235, 1240 may also be instructed to monitor one or more particular quantities of interest, for example, an axis position or velocity, at a specified sampling rate, typically lower than that of the servo loop used to control a particular axis. Once instructed, the remote controllers 1230, 1235, 1240 begin to periodically send the monitored quantities of interest to the master controller 1245 (block 1515), which stores them for a specified period of time, e.g., using a circular buffer, as shown in block 1520. At the same time, the remote controllers 1230, 1235, 1240 also begin monitoring for trigger events as shown in block 1525 As shown in block 1530, upon occurrence of the trigger event, the remote controller recognizing the event records the time of the event and as shown in block 1535, sends a message with the event time information to the master controller 1245. As shown in block 1540 the master controller 1245 then interpolates the buffered quantities of interest to determine a value for the quantities at the event time. The master controller 1245 may then use the data to alter trajectories or operations within the system 1200 as shown in block 1545.

While in the procedures described above the remote controllers are assumed to recognize trigger events, observe for them and record time when they occur, it should be understood that an autonomous remote controller, cluster controller or master controller may also perform these functions described above with reference to the remote controllers.

In many event capture applications, in particular for instantaneous position capture purposes, the resulting data include errors due to transition delays of the sensors that trigger the events. These errors become particularly significant in high-speed/high-accuracy applications where the axes of the controlled machine may travel an undesirably long distance from the time when an event physically occurs to the point when the event is signaled to the control system.

In the example above of "on the fly" recognition and correction for eccentricity or misalignment of the circular payload 1205, the end-effector 1220 of the robot 1210 may travel an undesirably long distance from the location where the edge of the payload passes through the sensors 1216 to the location where the trigger event is recognized and where the time is recorded. Assuming that the signal transition delays are deterministic, these errors can be minimized by a simple delay-compensation mechanism described below.

In order to estimate the length of motion between the location where an event occurs to the location where it is actually recognized by the control system, velocity information needs to be captured in addition to position data. Assuming that the velocities of the axes of interest remain substantially constant between the two locations, and provided that the time elapsed is equal to a known time delay, the motion of the axes of interest between the two locations can be reconstructed to obtain an estimate of the actual position of each axis at the time instant when the event physically occurred using the following expression:

$$\theta_{acti} = \theta_i - \dot{\theta}_i \tau, i=1,2,\ldots,m \qquad (5)$$

where $\theta_{acti}$ denotes actual position of axis i when the position capture event occurred, $\theta_i$ and $\dot{\theta}_i$ represent position and velocity of axis i, respectively, as captured by the control system, $\tau$ is sensor transition delay, and m indicates the number of axes of interest.

Figure 16:
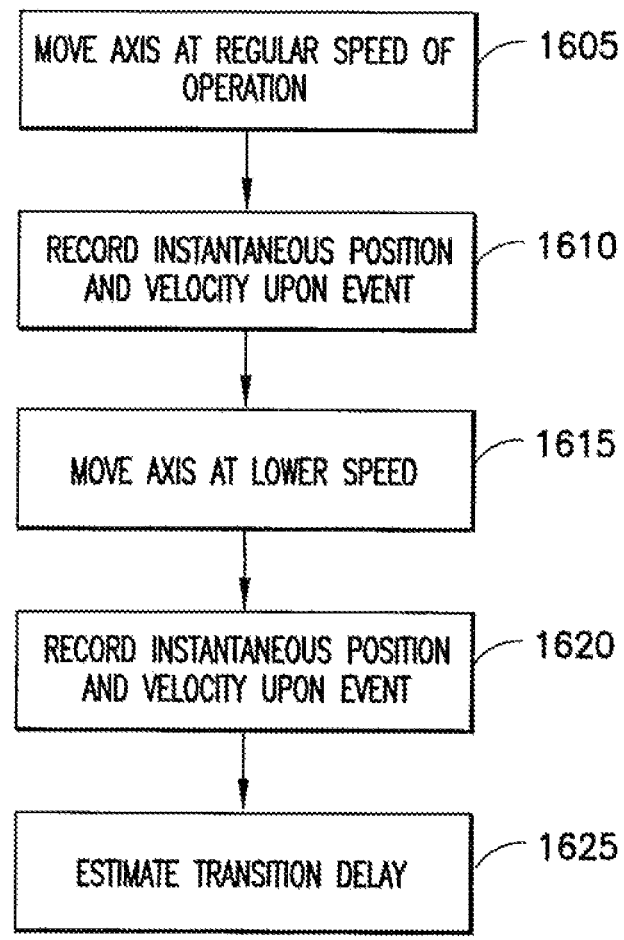
FIG. 16 shows a flow diagram for a procedure to calibrate for signal transition delays.

Although the transition delay of a sensor is typically included in the specifications, the actual latency often depends on the particular conditions in which the sensor is used. Consequently, a more accurate value of the transition delay may need to be obtained through a calibration process. Referring to FIGS. 12 and 16, an example involving a single axis of motion will be explained. The work cell 1200 of FIG. 12 may also include at least one aligner 1250 having an axis 1270 controlled by an autonomous remote controller 1255. The autonomous remote controller 1255 is in turn controlled by the master controller 1245. A notched substrate 1260 may have been placed on the aligner 1250 and the aligner may also have circuitry 1265 including sensors for detecting the position of the notch in the substrate 1260. As shown in block 1605 the autonomous remote controller 1255 may move the axis 1270 to trigger a position capture event, in this example, the circuitry 1265 sensing the notch in the substrate 1260. The autonomous remote controller 1255 moves the axis 1270 at a regular speed of operation and as shown in block 1610 records the instantaneous position and velocity of the axis 1270 when the circuitry 1265 detects the event. As shown in block 1615 the autonomous remote controller 1255 then moves the axis 1270 in the same direction to repeat the event at a substantially lower speed, which is selected so that the distance traveled by the axis 1270 in the time interval corresponding to the transition delay of the circuitry 1265 is smaller than the required position capture accuracy. As a result, the position error due to any transition delays may be neglected. Again, as shown in block 1620, the instantaneous position of the axis 1270 is captured when the circuitry 1265 detects the event. As shown in block 1625 the resulting data can be used to estimate the circuitry transition delay by solving Equation (5) for $\tau$, where $\theta_{acti}$ is approximated by the position capture result at the low speed, and $\theta_i$ and $\dot{\theta}_i$ are the event capture results at the regular speed of operation.

If combined motion of multiple axes is involved in the position capture event, the calibration procedure needs to take into account the geometrical configuration of the sensor(s) and moving component(s) of the system. An example calibration procedure for such a case can be found in commonly assigned U.S. patent application Ser. No. 10/739,375, incorporated by reference, where a position capture mechanism is utilized for on-the-fly recognition of eccentricity of a payload.

If the position capture event is triggered by motion of a controlled machine, for example the aligner 1250, the calibration process may be fully automated by the control system.

Thus, the disclosed embodiments provide a number of methods for capturing data about particular quantities of interest in the clustered architecture control system. The methods are advantageous in that they do not require a communication network with extremely low latency, which may be necessary to propagate trigger events among network nodes. When a triggering event occurs, the controller recognizing the event records the event time. The data around the event time from one or more axes may be interpolated to yield computed data values for the event time. The computed data values may be used to alter trajectories or operations within the system 1200. A calibration procedure is also provided to account for discrepancies between the time an event occurs and the time the event is recognized by the control system.

Robots requiring unlimited rotation may use slip rings or inductive/capacitive feed throughs to connect signal or power through the rotatable connection. As frequencies and bandwidth increase these types of connections become increasingly difficult to implement and to maintain. In the case of vacuum robots, slip rings may present a source of contamination. For robots mounted on cars or traversers providing communications and power generally requires cables with service loops. In addition, service connections to system components generally require connectors and associated cables.

It is a feature of the disclosed embodiments to utilize wireless connections to provide communications among system components in order to eliminate problems due to physical attributes of cabling, slip rings, feed throughs and various mechanical connections, to lower maintenance requirements in comparison to wired connections, and for increased reliability.

Referring to FIGS. 1(1*a*-1*b*), communication network 120 may include one or more wireless sections that provide a communication path among one or more of the master controller 105, the cluster controllers 110, the remote controllers 115 and autonomous remote controllers 150.

Figure 25:
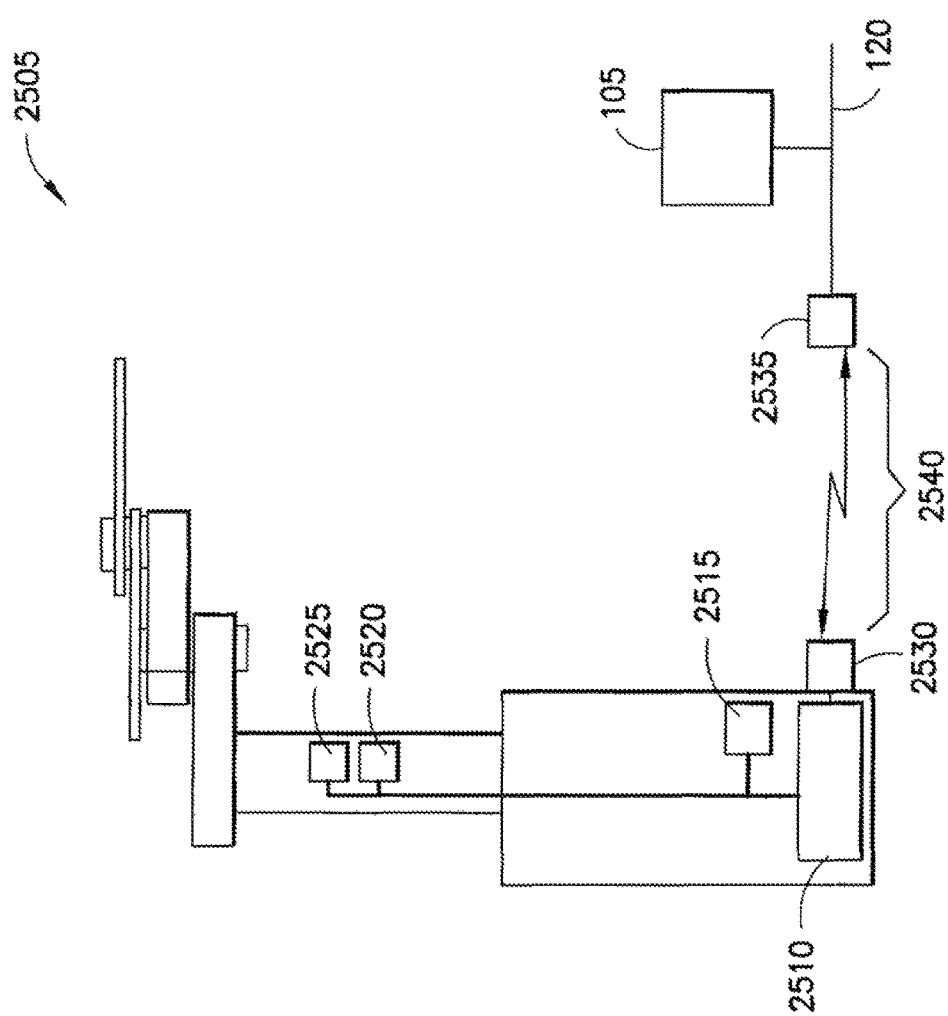
FIG. 25 shows a portion of the system of FIGS. 1(1a-1b) where a communications network has a wireless segment.

FIG. 25 shows a portion of the clustered architecture control system 100 in which a wireless connection has been implemented. A robot 2505 may include multiple axes and may be controlled by a cluster controller 2510 and three remote controllers 2515, 2520, 2525. The master controller 105 (FIGS. 1 (1*a*-1*b*), shown here again) controls the cluster controller 2510 through communication network 120. In this embodiment, the cluster controller 2510 and the communication network 120 have corresponding wireless interfaces 2530, 2535 that provide a wireless connection 2540 between them. The wireless interfaces 2530, 2535 may provide any suitable wireless communication protocol or signaling technique or standard, for example TDMA, CDMA, IEEE 802.xx, CIP protocol, Bluetooth, close range RF, optical, etc. The selected wireless protocol may include security features such as encrypted transmissions in order to prevent tampering.

In addition, other communication paths, for example, among controllers, axes, end effectors, and service connections may also be wireless. Still further, in a robotized automation system, loadports, fan systems, filter units, etc. may also utilize wireless connections. The wireless connections are advantageous because they allow communications without invading a component's surroundings with a cable. For example, a field service technician may connect to a component without having to enter the component's workspace. Utilization of wireless connections and protocols generally simplifies component connections and, in some instances, only power connections may require cabling.

The disclosed control system 100 may be required to accommodate a human presence in the workspace of each of the components and may include functions that ensure system integrity.

Hardware interlocks, such as door switches, normally prevent motors from being powered when an operator is within the workspace of the machinery subject to control, such as a robot. However, when teaching a system component, that is when the component is in teach mode, the normal hardware interlocks may be bypassed to allow an operator to enter the workspace of the robot. In many instances, a teach pendant used to direct the robot has a "live-man" switch that removes power to the robot in the event that pressure is not applied to the switch. According to the disclosed embodiments, the master controller 105 or cluster controller 110 may also provide commands that ensure that the speed and force of the robot are kept within acceptable limits specified to accommodate a human presence in the workspace.

The control system 100 may incorporate several features to accommodate the human presence. Referring to FIGS. 1(1*a*-1*b*), during general system operations, the master controller 105 may generate motion profiles for individual axes 125. In the example of FIG. 12, several axes may be grouped together as part of a robot 1210, and the master controller 1245 may generate a series of PVT frames for each axis controlled by the remote controllers 1230, 1235, 1240 so that the end effector 1220 executes a particular trajectory. It should be noted that although the end effector may be moving at a constant velocity, the velocity of the different axes that make up the robot 1210 may vary with position and time. Thus the velocity parameter of the PVT frames may vary with respect to position and time due to the robot kinematics. When an operator is present in the work cell 1200 the system may use velocity limiting techniques to protect the operator. In effect, the system may generate trajectories such that the resultant end effector motion profile is within a required speed limit. This may be accomplished by calculating the trajectory as described above for the robot while setting the velocity parameter of the PVT frames for axes controlled by remote controllers 1230, 1235, 1240 to a position- and time-dependent not-to-exceed limit.

Likewise, although the end effector may be exhibiting a constant force in a particular direction, the torque of the different axes that make up the robot 1210 may vary with position and time. A position- and time-dependent torque limit may also be imposed when an operator is present in the work cell 1200 such that the resulting force of the end effector remains below a particular limit by adding a term to the frames sent to the cluster controller 1215 which manages remote controllers 1230, 1235, 1240. In a particular position of the robot 1210 there is a unique relation between the torques applied by the motors at the axis level and the force produced by the end-effector. Consequently, it is possible to use the model of the robot to calculate the maximum motor torques such that the corresponding force produced by the end-effector 1220 cannot exceed a maximum allowable value. These maximum torques may be calculated every time when a new set of PVT or PVT-FG frames for axes controlled by remote controllers 1230, 1235, 1240 is generated and sent to the cluster controller 1215.

It is a feature of the present embodiments to utilize unique message frames, referred to as PVT LIMIT frames, in the teach mode of operation. The PVT LIMIT frames may be similar to those shown in FIGS. 6 and 7 above, however, their velocity term is calculated so as not to exceed a particular limit and they include an optional torque limit term.

FIG. 26 shows an exemplary PVT LIMIT frame 2600 with a torque limit term. The PVT LIMIT frame 2600 includes position data 2610, velocity data 2615, and time data 2620. In one embodiment the data is in binary format grouped together in one or more bytes. In another embodiment each of the position data 2610, velocity data 2615, and time data 2620 occupies four bytes. PVT LIMIT frame 2600 may optionally include header information 2625 and trailing information 2630, both of which may include synchronizing, identification, parity, error correction, or other types of data.

As a feature of the disclosed embodiments, PVT LIMIT frame 2600 includes a torque limit term 2635 that specifies a not to exceed torque limit. PVT LIMIT frame 2600 may also include additional data of varying lengths or amounts between or among the header, position, velocity, time, and trailing data. PVT LIMIT frame 2600 may optionally include another data field 2640 for any other suitable data. It should be noted that while FIG. 26 shows the various information or data in specific locations or areas of the frame, the different types of information and data may be located anywhere within the PVT LIMIT frame 2600. It should also be noted that the PVT LIMIT frame 2600 is not limited to any particular length.

FIG. 27 shows an exemplary PVT-FG LIMIT frame 2700 with an optional torque limit term. PVT-FG LIMIT frame 2700 includes optional header information 2710, position information 2715, velocity information 2720, time information 2725, and optional trailing information 2730.

In addition, PVT-FG LIMIT frame 705 includes at least one feedforward term 2735 and at least one gain term 2740. The data may be in binary format grouped together in one or more bytes. In one embodiment of PVT-FG LIMIT frame 705 the position 2715, velocity 2720, time 2725, feedforward 2735, and gain 2740 terms each occupy four bytes. Similar to PVT LIMIT frame 2600, PVT (FG) LIMIT frame 2700 may include other data of varying lengths or amounts, distributed among or between the various terms.

Similar to PVT frame 2600, the disclosed embodiments include a torque limit term 2745 as part of PVT-FG LIMIT frame 2700 that specifies a not to exceed torque limit. PVT LIMIT frame 2700 may also include additional data of varying lengths or amounts between or among the header, position, velocity, time, and trailing data. Another data field 2750 may be included for any other suitable data. It should be noted that while FIG. 27 shows the various information or data in specific locations or areas of the frame, the different types of information and data may be located anywhere within the PVT-FG LIMIT frame 2700. It should also be noted that the PVT-FG LIMIT frame 2700 is not limited to any particular length.

As mentioned above, the velocity and torque limit terms may be calculated to impose an overall limit on the speed and force of the end effector 1220 (FIG. 12). The trajectory is calculated for the end effector so that its velocity does not exceed the specified limit. The resulting position, velocity and acceleration profiles are then converted to positions, velocities and accelerations of individual axes using the inverse kinematic equations of the robot described above. The trajectory information is converted to PVT LIMIT or PVT-FG LIMIT frames and sent to cluster controller 1215 which manages remote controllers 1230, 1235, 1240.

It should be understood that the master controller may send PVT LIMIT or PVT-FG LIMIT frames also to autonomous remote controllers, for instance, if some or all of robot axes are controlled by autonomous remote controllers rather than by remote controllers subordinated to a cluster controller.

As one aspect of the disclosed embodiments, during the teach mode of operation, the cluster controller 1215, which manages remote controllers 1230, 1235, 1240, or generally an autonomous remote controller, which controls some or all of robot axes, may operate to crosscheck the trajectory data sent by the master controller 1245. Thus, when the controller receives a PVT LIMIT frame, the controller may operate to verify the applicability of the message and its data by performing a number of crosschecks including checking for a maximum velocity, a velocity tracking window, velocity debounce time, a maximum torque, and a maximum torque debounce time.

To check for a maximum velocity, the controller may recognize that the axis is in teach mode and also identify a maximum velocity limit for the axis. Upon receiving a frame, the controller verifies that the velocity term is below the maximum velocity specified for the axis in teach mode. In the event that the maximum velocity is exceeded, the remote controller may send an alert to the master controller.

The controller may also determine a velocity tracking window, that is, a maximum value for the difference between a commanded velocity from a frame message and an actual measured velocity, such as measured by an encoder for the axis. In the event that the velocity tracking window is exceeded the remote controller may send an alert as above. In some transient conditions, the velocity tracking window may be exceeded for brief periods of time without an alert being issued. However, this time period may also be specified and monitored, and if the velocity tracking window is exceeded for this specified time, the controller may also issue an alert.

As mentioned above, a maximum torque allowed for an axis may be determined during a trajectory execution, especially in teach mode. The controller may check the torque commanded by the control loop against the maximum torque specified by the limit terms of the PVT LIMIT or PVT-FG LIMIT frames received, and may generate an alert if the maximum torque specified by the frames is exceeded. As with the maximum velocity, the maximum torque may be exceeded for brief periods of time without an alert being issued. However, this time period may also be specified and monitored, and if the maximum torque is exceeded for this specified time, the controller may also issue an alert. The controller may recognize that the axis is in teach mode and also identify a relevant global maximum on the not-to-exceed torque limit it expects to receive in the frames. If this global maximum is exceeded, the controller may also issue an alert.

In addition to an alert, a failure of any of these parameters may also cause the controller to disable the motor driver output stage in order to stop any motion. The master controller may be alerted and may also stop all motion on all other associated axes.

Referring again to FIG. 12, another aspect of the disclosed embodiments used to accommodate a human presence in the workspace may include periodic verification that the communications network, the cluster controller and the master controller are functional. The remote controllers 1230 1235, 1240 may be programmed to monitor communications such that if a message is not received periodically the remote controller may stop motion for its axis.

For example, the remote controllers 1230, 1235, 1240 may be programmed to monitor the time period between message transmissions, such as receiving torque commands. As another example, an autonomous remote controller may monitor the time period between PVT frames. If a torque command or PVT frame does not arrive within the expected period, the remote controller or autonomous remote may consider the communication network 1250, the cluster controller 1215 or the master controller 1245 as not being functional and may proceed to stop motion on the axis or axes under its control. The periodic message monitored by the remote controller or autonomous remote controller may also be the cycle start message used to synchronize the clocks of these controllers.

The master controller 1245 may also monitor network communications by monitoring receipt of periodic status messages. Upon failure to receive a status message from the cluster controller 1215, or any of the remote controllers 1230, 1235, 1240, the master controller 1245 may attempt to stop all motion on any of the axes associated with the cluster controller 1215 and controlled by the remote controllers 1230, 1235, 1240.

The aspects of crosschecking the trajectory data, verification of the communications network, master controller, and remote controllers may be accomplished by hardware specifically for that purpose at each network node. For example, the cluster controller 1215, remote controllers 1230, 1235, 1240, or an autonomous remote controller may include dedicated circuitry that operates independently to perform any of the crosschecking functions described above for the trajectory data sent by the master controller 1245. As another example, one or more of the master controller 1245, the cluster controller 1215, remote controllers 1230, 1235, 1240, or an autonomous remote controller may each include dedicated circuitry for monitoring the time between messages or the receipt of periodic messages.

Figure 28:
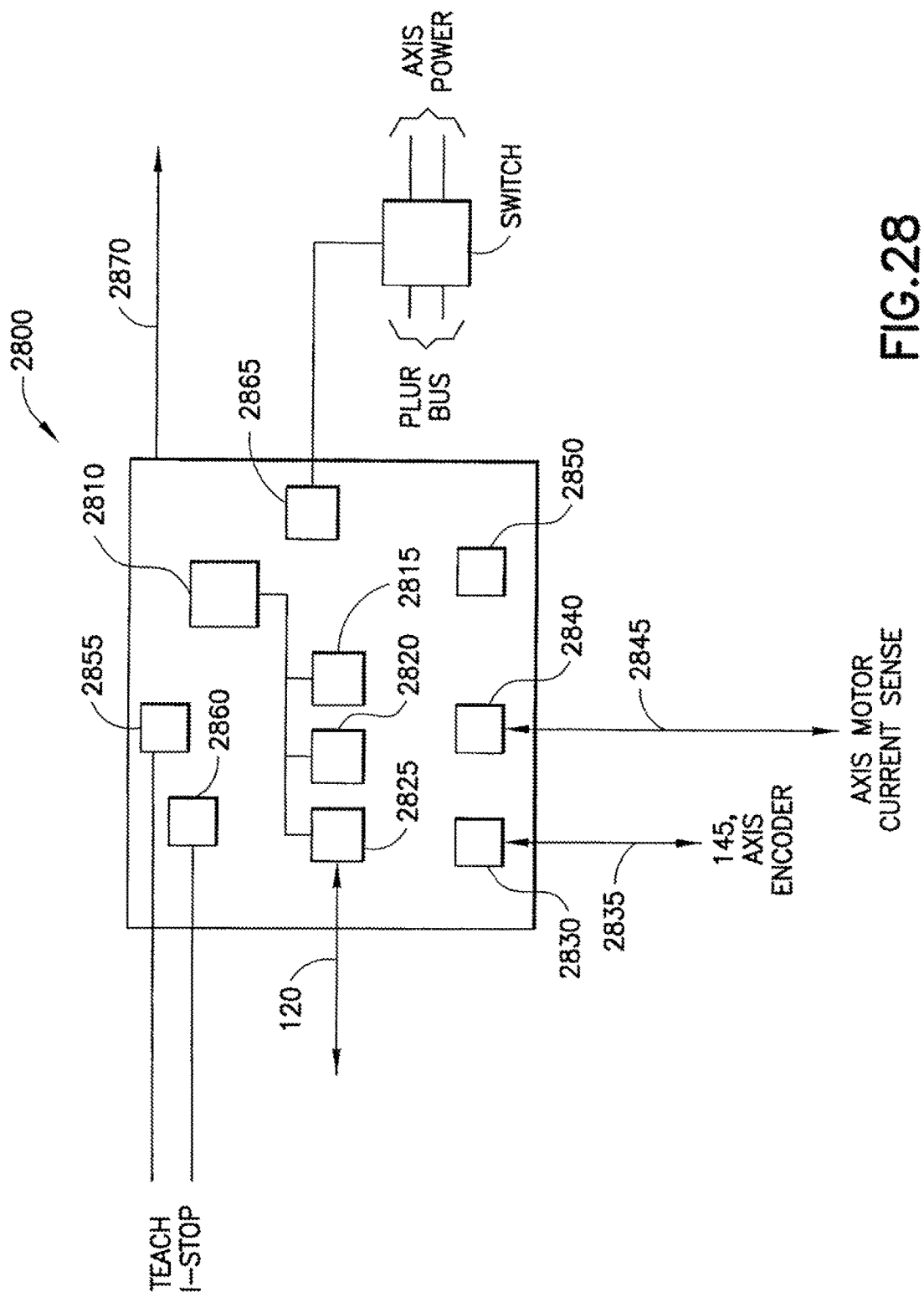
FIG. 28 shows a block diagram of a remote controller with a common integrated checking and shutdown circuitry unit.

FIG. 28 shows a block diagram of an exemplary integrity monitor 2800 that includes dedicated circuitry specifically for monitoring system integrity. The integrity monitor 2800 may include a processor 2810, a semiconductor memory device 2815, non-semiconductor memory 2820, and an interface 2825 to the communications network 120. The integrity monitor 2800 may also include axis encoder sensing circuitry 2830 for receiving axis position information signals 2835, and axis motor current sensing circuitry 2840 for receiving signals indicating an axis motor current draw 2845. In addition, the integrity monitor may also include a timer 2850, inputs for sensing that the teach mode is being employed (Teach, 2855) and any immediate stop requirements (I-Stop, 2860), and a switch interface 2865 to control power for the axis.

Generally, the processor 2810 operates under control of programs stored in memory 2815 to crosscheck trajectory velocity and torque data, verify the operation of the communications network 120, identify when a particular axis has exceeded its operating parameters, and remove power from the axis when required.

The processor 2810 may sense that the axis is in teach mode and may identify the maximum velocity limit for the axis using the velocity term in the PVT frames received. The processor 2810 may then operate to verify that the actual velocity of the axis term in the frames received does not exceed this maximum velocity specified for the axis in teach mode limit. The processor 2810 may also determine the velocity tracking window, if it has been exceeded and for how long. The processor 2810 may also determine the maximum torque allowed, if it has been exceeded, and for how long. In the event of a failure of any parameters, the processor 2880 may control the shutdown of the axis and coordinate with other controllers that may also be bringing their axes to a controlled stop.

The processor 2810 may also monitor the time period between message transmissions, such as receiving PVT frames, and may issue an alert or begin a controlled shutdown if a PVT frame does not arrive within the expected period. Optionally the integrity monitor 2800 may communicate with other integrity monitors through a dedicated network 2870.

The European machinery directive (EN 60204-1) defines two categories of an immediate stop. The first, Category 0, is defined, as an "uncontrolled shutdown", in which power is simply removed. The second category, Category 1, is defined as a "controlled shutdown", where power is maintained long enough to bring motion to a stop before being removed. It is highly desirable for the components of the control system to comply to a category 1 stop, for accommodating a human presence and to prevent product damage.

In the event of a power loss, it may be important to control the motion of the axes of the system so that the axes come to a stop without causing damage to equipment and material or endangering an operator. One method commonly used is to short the windings of an axis motor through a resistor when a power loss arises. However, this requires careful tuning of resistance values to match the motor winding parameters to get the desired decelerations, and may not be acceptable for robots that execute coordinated motions since substantial tracking errors and subsequent damage to equipment or material may occur if shutdown of the individual axes is not coordinated.

Another common practice is to include an uninterruptible power supply (UPS). While this solution provides the power necessary to bring axes to a stop in a coordinated fashion, it may add substantial cost, size and weight, and may require periodic service.

Another method includes providing capacitance or battery backup to the outputs of the power supplies to provide enough power to allow the remote controllers or autonomous remote controllers to bring their associated axes to a controlled stop. This may require substantial capacitance or battery capacity, however, because the power should remain relatively stable during the entire deceleration event.

One method utilized in the present control system may be based on rectification of the incoming AC voltage (220V in the exemplary case) through Power Factor Correction (PFC) circuitry with capacitance provided at the DC output of the PFC circuitry. The resulting DC voltage may be fed into a wide input range DC power supply (48V in the exemplary case). When power is lost, the capacitor keeps the DC power supply running despite a substantial decay in the input voltage.

The energy stored by the capacitance should be sufficient to allow the motion controller to plan and execute a trajectory that brings the robot's end-effector from its current velocity to zero velocity at a predefined deceleration rate specified to protect the equipment and material, and thus bring the robot to a controlled stop while maintaining coordinated motion along a specified trajectory, without damage and without losing the axes positional information.

Figure 33:
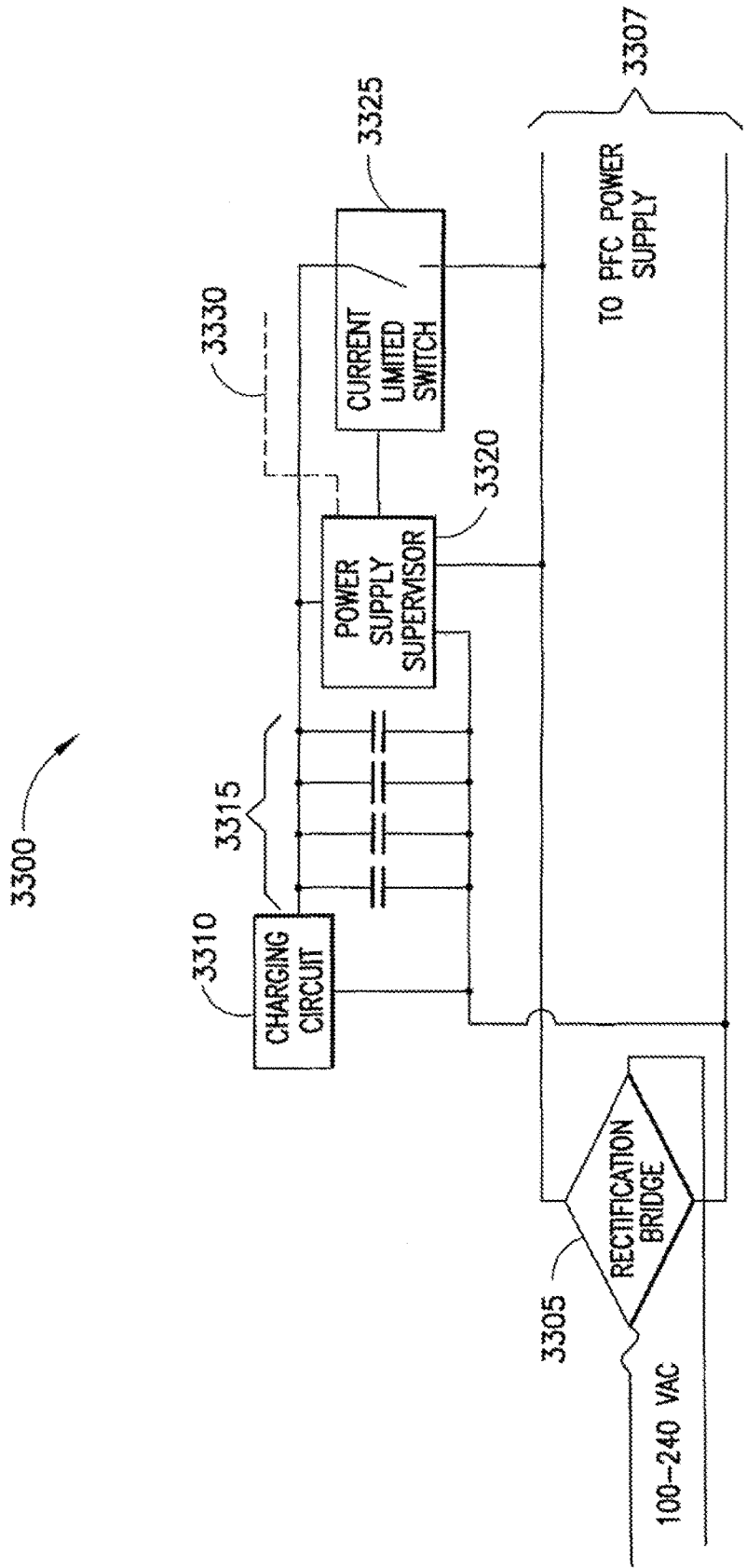
FIG. 33 shows an example of a capacitive storage module.

Another embodiment may include a capacitive storage module 3300 as shown in FIG. 33. The exemplary capacitive storage module may provide the necessary power to allow category 1 operation even during power outages and brownouts. Because of a unique design, the module may also facilitate the use of commercial off the shelf (COTS) PFC power supplies that may not comply to certain brownout requirements, for example, European Union or Semi F-47 voltage sag tests.

The components of the capacitive storage module 3300 may be mounted on a single printed circuit board. An AC voltage 3335 may be rectified by bridge 3305 and the rectified voltage output 3307 may be passed directly to the Power-Factor-Corrected power supply. In parallel with the rectified voltage output 3307, a charging circuit 3310 may charge and maintain a high voltage on a capacitive storage bank 3315. A power supply supervisor circuit 3320 may be connected in parallel with the capacitive storage bank 3315.

The power supply supervisor circuit 3320 may include a processor, memory, program storage, and various sensors and monitoring circuitry. The program storage may include programs accessed by the processor that direct the operations of the power supply supervisor, including monitoring output voltage 3307, operating switch 3325, monitoring the storage capacity and voltage of capacitive storage bank 3315, and monitoring the input voltage 3335.

The power supply supervisor 3320 may monitor the rectified voltage output 3307, either through a direct connection or by other mechanisms. When the power supply supervisor circuit 3320 determines that the rectified voltage output 3307 fails to meet a predetermined criteria, for example, as a result of a power loss, the power supply supervisor circuit 3320 connects the capacitive storage bank 3315 to the rectified voltage output 3307 through switch 3325.

Several advantages may be attained by this design. Firstly, the capacitors in the capacitive storage bank may be sized to provide only a small percentage more than the total power required for the deceleration event. Secondly, output voltage may be precisely maintained while the capacitors discharge approximately 85% of their stored energy since COTS PFC power supplies may generally operate over a wide input voltage range. Thirdly, energy storage at higher voltage makes this solution more compact and less expensive because energy stored in a capacitor is proportional to the product of capacitance and voltage squared, and the physical size of a capacitor is approximately proportional to the product of capacitance and voltage.

In another implementation, the power supply supervisor 3320 may provide the warning signal 3330 to external circuitry, for example, circuitry for monitoring system integrity, a power control function, or the master controller 105. The warning signal may be used to alert other network components of possible power problems and for other purposes, for example, to allow for a category 1 stop as defined by EN 60204-1. The control system may also use this warning signal 3330 to confirm that the capacitive storage bank 3315 is fully charged before initializing motion. The warning signal 3330 and the capacitive storage bank 3315 may typically be enabled concurrently, allowing the control system 100 to utilize the stored energy in the capacitor storage bank 3315 to bring any moving axes to rest. The energy stored may generally be equal to or greater than the energy required to bring the system to rest regardless of the state of the system. For example, the stored energy may include enough energy to bring the system to rest when all axes are moving at maximum velocity.

Alternatively, the timing of the warning signal 3330 may be shifted with respect to the engagement of the capacitive storage bank 3315 so that temporary input power abnormalities do not cause unnecessary disruptions in service. This is a particularly attractive method of implementation because it allows the use of power supplies that may not meet brownout requirements.

The warning signal may also provide information regarding energy storage capacity, input voltage, capacitor bank voltage, and input power quality which may be used for predictive and automatic failure detection.

It is another feature of the present embodiments to utilize monitored, redundant, solid state logic to detect and react to inputs which require the removal of axis power. This provides the flexibility to support an architecture in which immediate stop information can be shared across multiple zones as will be described below.

Figure 40:
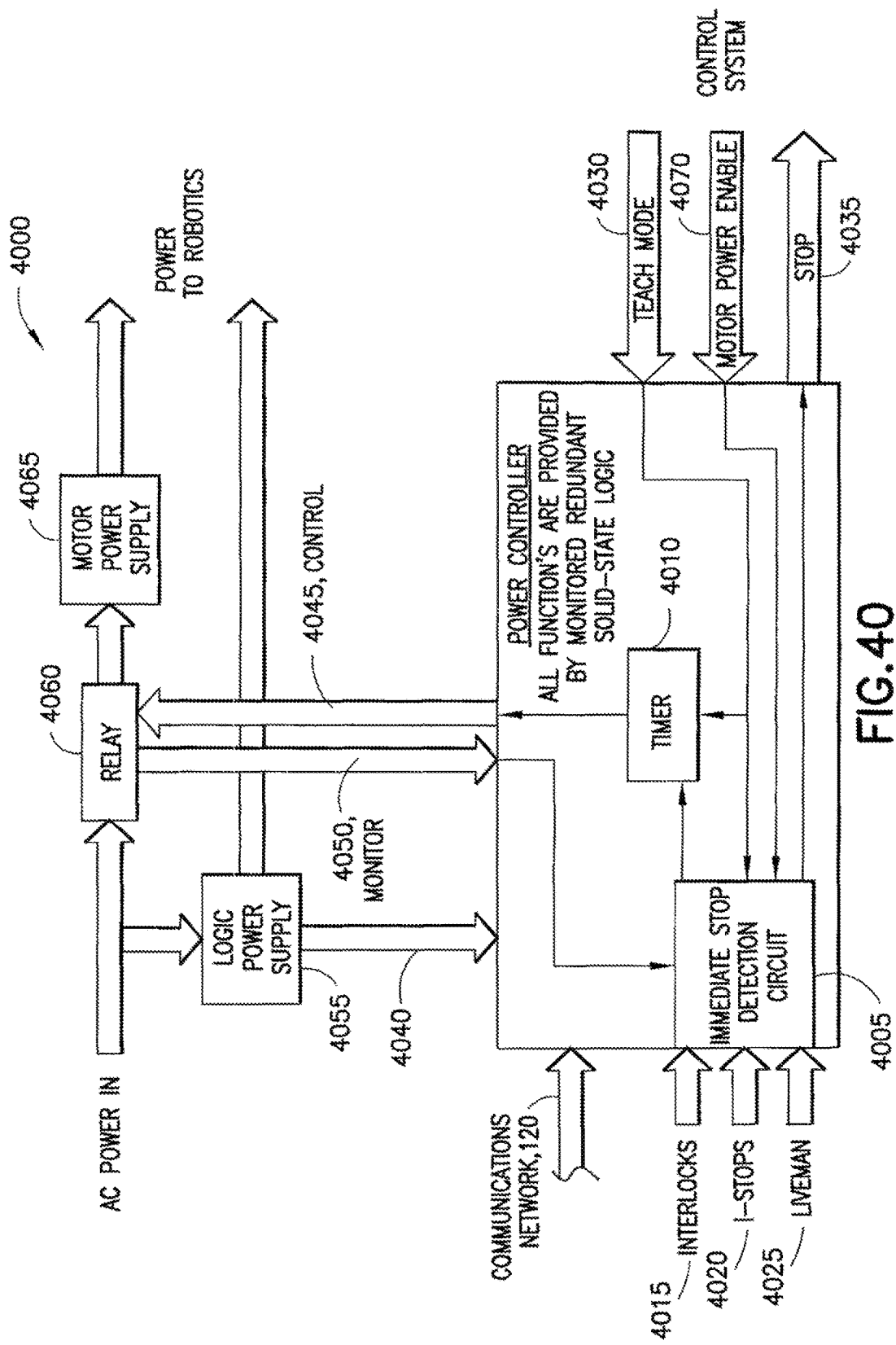
FIG. 40 shows a block diagram of power control circuitry.

A power control function 4000 for implementing this feature is shown in FIG. 40. The power control function includes circuitry for detecting immediate stop inputs 4005, one or more timers 4010, and various processors, memories, and support circuitry for carrying out the power control function. The power control function provides signals indicating that it has initiated power removal (Stop, 4035), control signals 4040 for one or more robotic logic power supplies 4055, and control signals 4045 for one or more relays 4060 controlling robotic motor power supplies 4065. The immediate stop detection circuitry 4005 receives inputs from various interlocks 4015, immediate stop signals 4020, liveman signals 4025, and teach mode signals 4030 from various control system components, and also receives motor power enable signals 4070 from the master controller 105 and monitor signals 4050 from the relays 4060. The liveman signals 4025 indicate that there is a human present in at least one robotic workspace of the control system 100. The teach mode signals 4030 indicate that at least one component of the system is being taught an operation.

While the power control function is described as including various hardware components it should be understood that the power control function may be implemented in hardware, software, or any combination of hardware and software.

When the master controller 105 requests that motor power be enabled, the power control function 4000 first verifies the state of all immediate stop 4020, liveman 4025, interlock 4015, and teach mode 4030 signals. The power control function 4000 also confirms that the contactors of relay 4060 are in the appropriate state and are not welded and may also verify that any solid state switches associated with the relay are not conducting. If the state of each of the immediate stop, liveman, interlock, teach mode signals, contactors, and switches meets all necessary requirements, the relay 4060 is enabled. It should be understood that the relay 4060 may also be implemented as one or more solid state switching device.

When any of the immediate stop, liveman, interlock, or teach mode signals reaches a state that requires the removal of motor power, the power control function alerts the master controller 105 and starts the timer 4010. The timer 4010 is programmed to allow adequate time for the system component generating the signal requiring power removal to come to a controlled stop. The duration of the timer 4010 may be determined by the system component mode of operation. For example, the timer may be set at different intervals for a robot traveling at different speeds, or in teach mode.

Upon expiration of the timer 4010, the power control function 4000 disables the motor power supply through relay control signal 4045. Motor power may only be re-applied when all of the immediate stop, liveman, interlock, or teach mode signals return to a state that allows resumption of motor power, and the motor power enable signal 4070 is reasserted.

The power control function 4000 may typically resides in a power distribution unit. It may serve groups of remote controllers and autonomous remote controllers, for instance, when incorporated into power distribution units of individual zones of the control system as described below. The power control function 4000 may also be implemented as a pluggable daughter card or module that may be reused in different power distribution units designed for specific applications.

Figure 41:
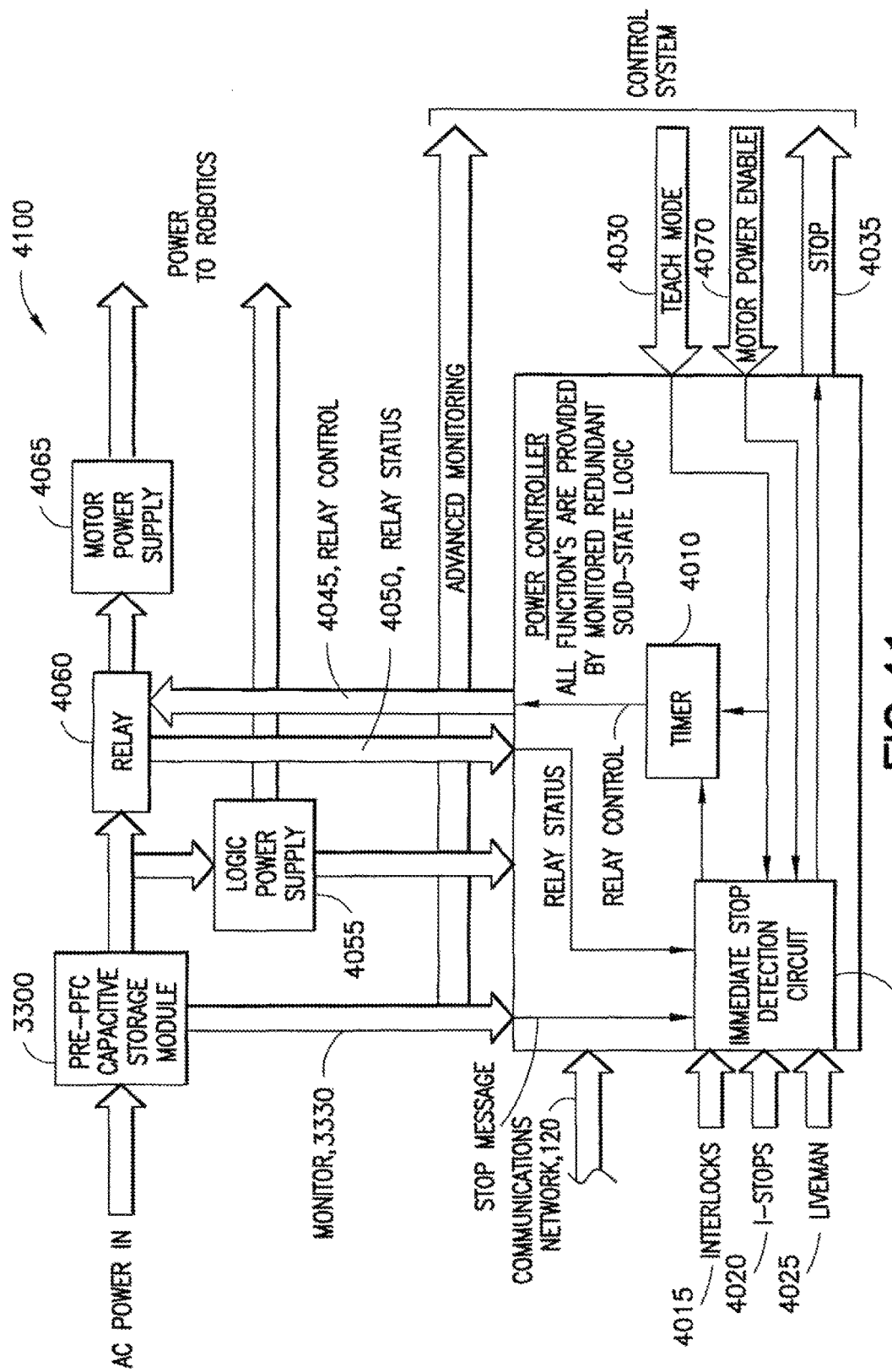
FIG. 41 shows another example of power control circuitry connected to a capacitive storage module.

FIG. 41 shows another embodiment of the power control function 4100 where the immediate stop detection circuit includes circuitry for sensing the warning signal 3330 from the power supply supervisor 3320 of the capacitive storage module 3300 discussed above. The warning signal 3330 may be used in a manner similar to the immediate stop, lineman, interlock, or teach mode signals to trigger power removal from one or more network components.

In a production environment where any failure and subsequent downtime can mean tens of thousands of dollars in damaged material and lost productivity, the reliability of a motion control system is a critical requirement. The architecture of the control system 100 (FIG. 1,1a-1b) of the disclosed embodiments may generally achieve better reliability by locating remote controllers close to the components subject to control, thus reducing the length and complexity of wires and harnesses which carry feedback and action signals. However, in some instances the communication network 120 itself may be vulnerable to failures since it may run relatively long distances and, in many cases, may remain fully operational only if all of the nodes and connections between them are functional. Otherwise said, in many topologies, a malfunction of a single connection or a single node may cause a segment or the entire communication network 120 to fail. Therefore, it is desirable to provide a communication network solution which will keep the control system 100 operational to the maximum extent possible even in the case of a faulty communication network connection, such as a cable break, or a failure of one or more of the network nodes.

The IEEE 1394b standard and other network standards and implementations may allow for inactive segments that form physical loops in an otherwise tree type network topology. The inactive segments may be used to provide redundant connections between nodes of the communication network 120. The network may be enabled to automatically disable the redundant connections, for example, by selective disabling of PHY ports. Upon a failure, the network may have the capability to selectively enable the redundant connections to form a path to nodes isolated by the failure. This may be accomplished, for example, by using the facilities inherent in the IEEE 1394b standard. Other network implementations may also have the capability of detecting and disabling redundant connections and then selectively enabling them in the event of a failure.

These features may be leveraged to offer a unique self-healing fault tolerance that guarantees that the control system 100 will operate even if there is a cable break or a complete failure of a node on the communication network 120. In particular, if a network node or an active network connection fails, the communication network 120 may reconfigure itself to route communications through a redundant connection that was not active before the failure. A connection between two network nodes will be referred to as a segment.

It is important to note that while the IEEE 1349 standard is used as an example when describing the disclosed embodiments, the disclosed embodiments are not limited to IEEE 1394 based networks. Other network implementations may also be utilized so long as they include features suitable for practicing the disclosed embodiments.

If a node on the network 120 fails, the network may reconfigure itself to route the communication through alternate segments, and may perform an immediate stop of all or selected axes of motion using the new communication routes. Thus, the physical loops in the bus topology may provide redundant communication paths through the entire network, which can be used as secondary data channels in the event of a failure.

Figure 34A:
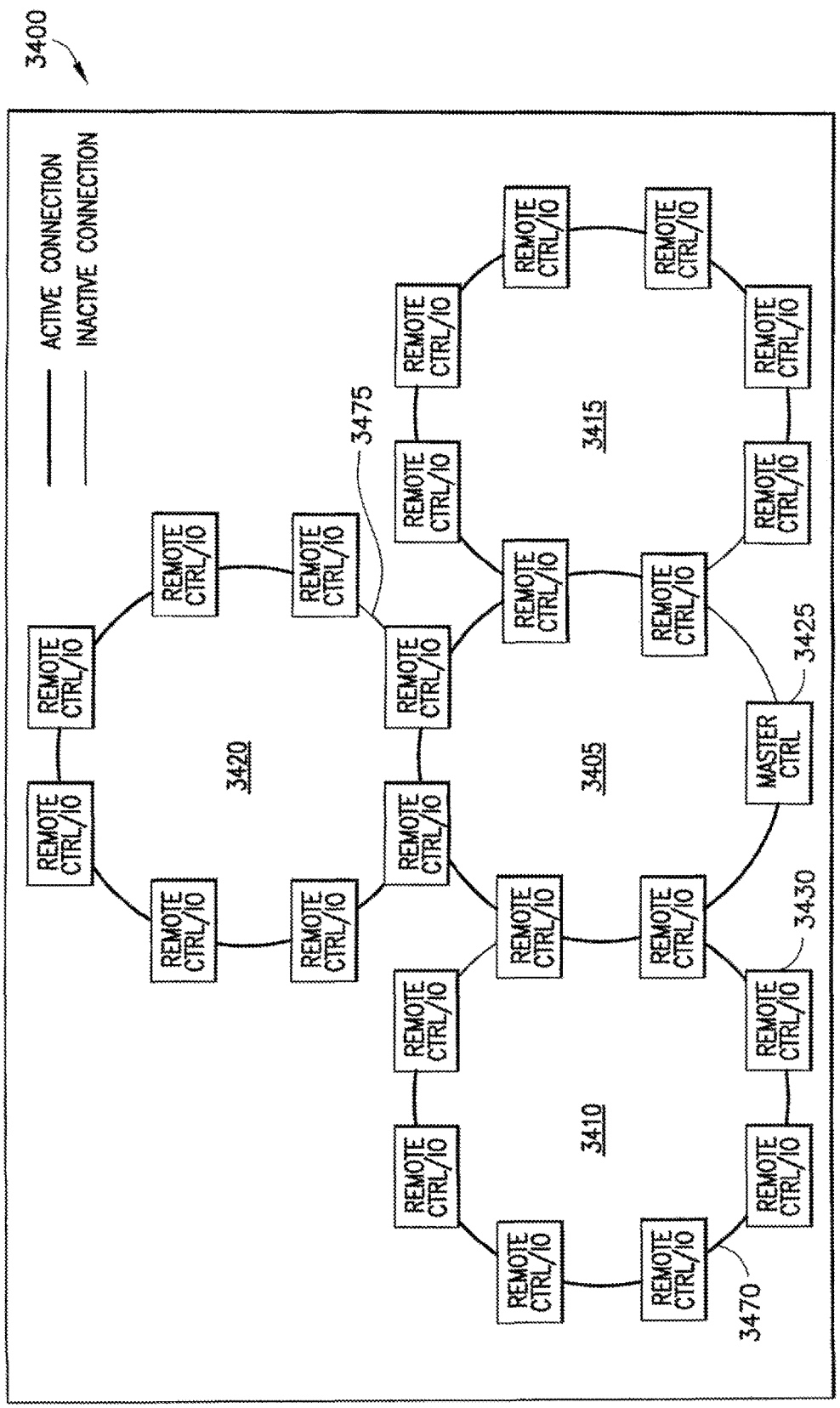
FIG. 34a shows an exemplary network topology that provides redundant connections.

FIG. 34a shows an exemplary topology 3400 of network 120 that provides redundant connections. Topology 3400 includes a main loop 2305 and a number of peripheral loops 3410, 3415, 3420. The main loop 3405 includes a master controller 3425 and each of the main loop 3405 and peripheral loops 3410, 3415, 3420 include remote controllers 3430. Note that the active segments 3470 of topology 3400 form a tree type topology while the inactive segments 3475 provide redundant loop connections between the nodes.

Figure 34B:
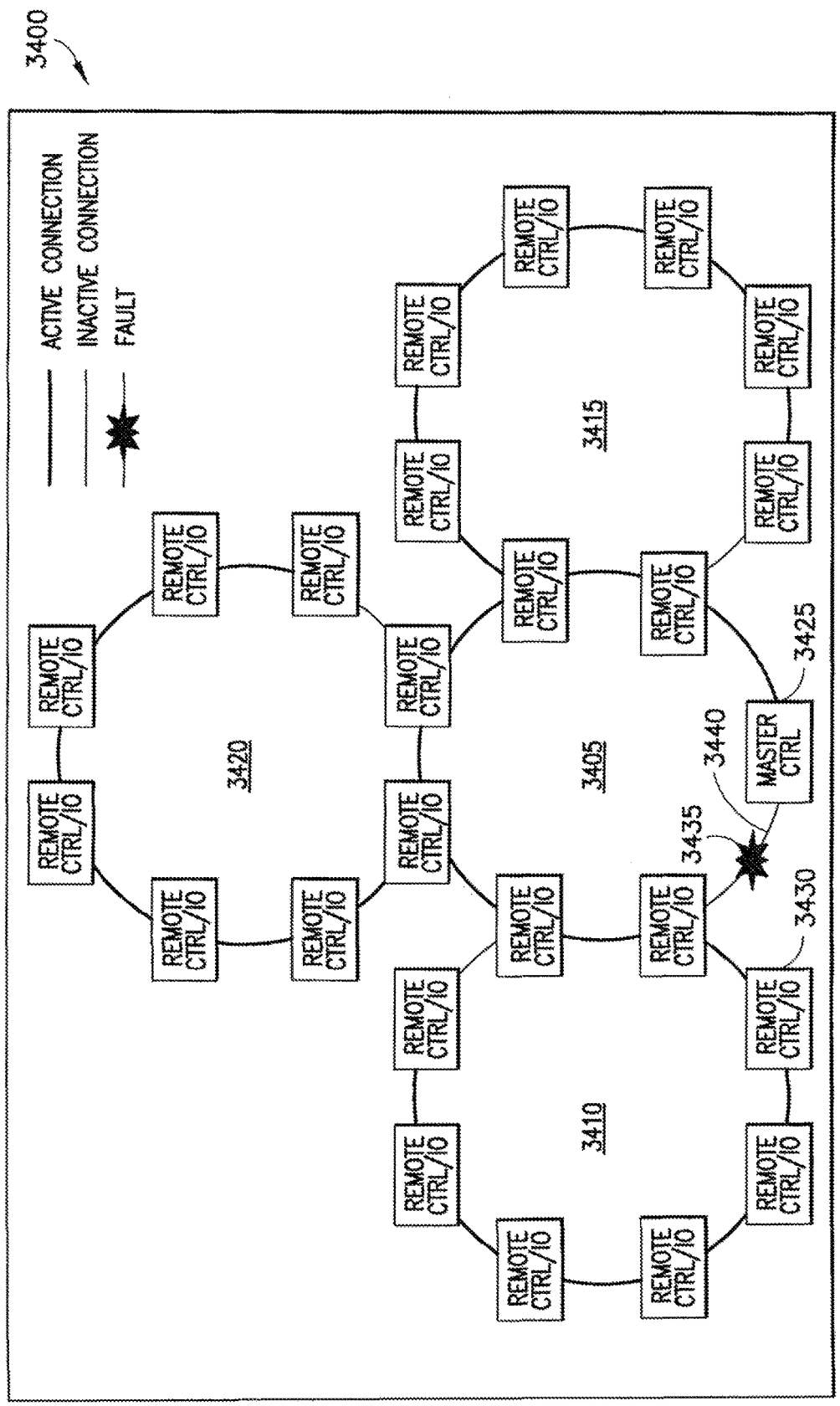
FIGS. 34b-34e show various aspects of a network failure compensation scheme.
Figure 34C:
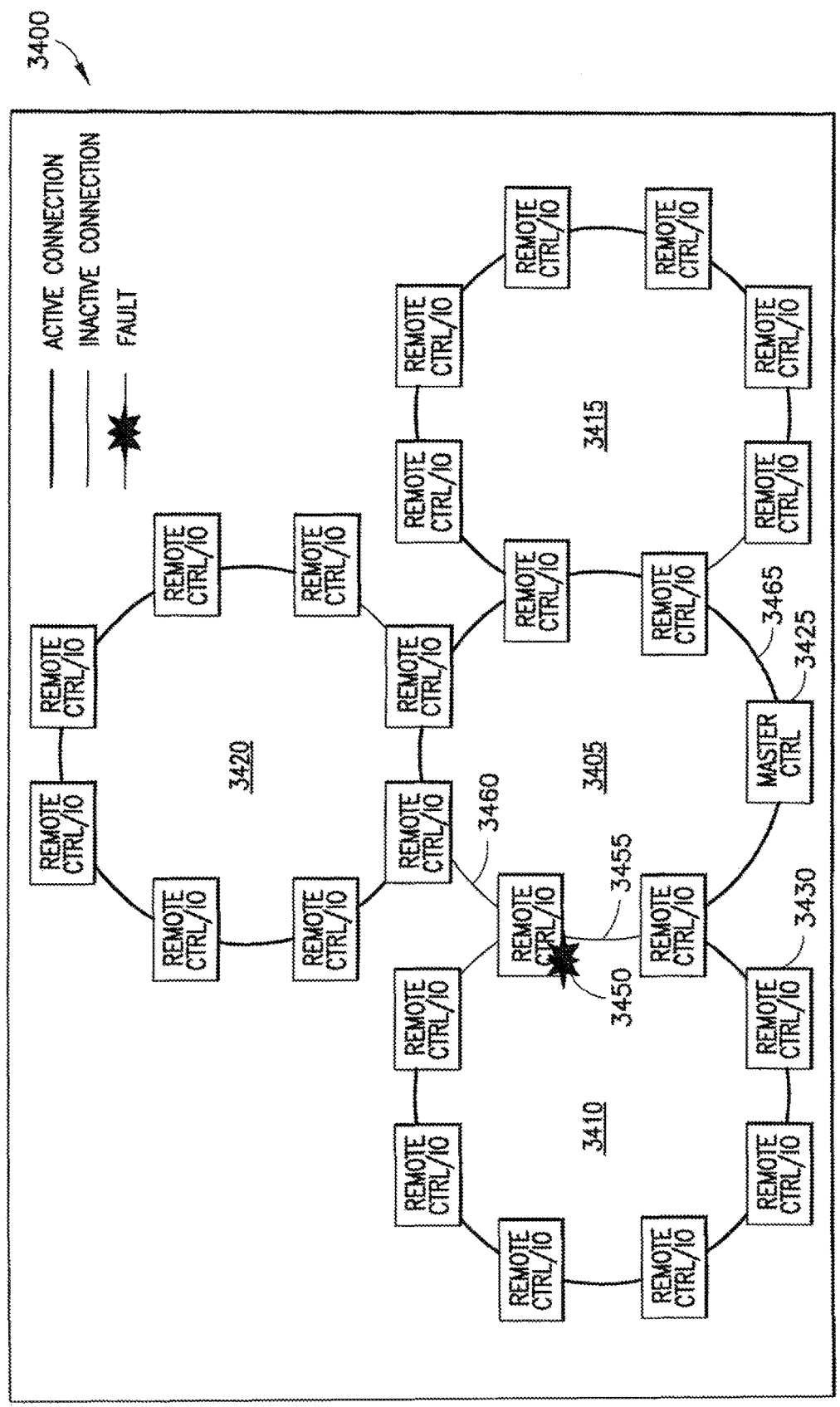
Figure 34D:
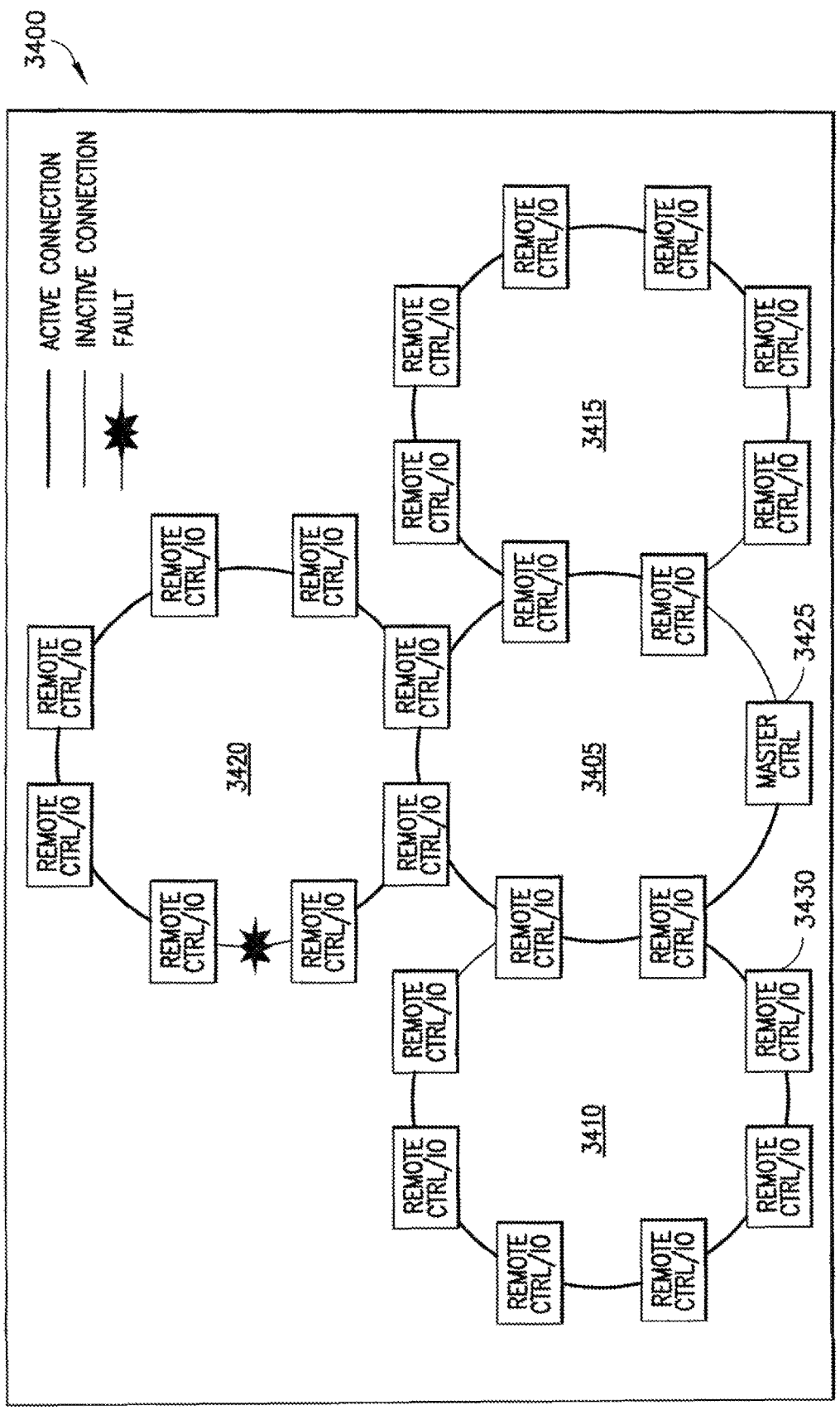
Figure 34E:
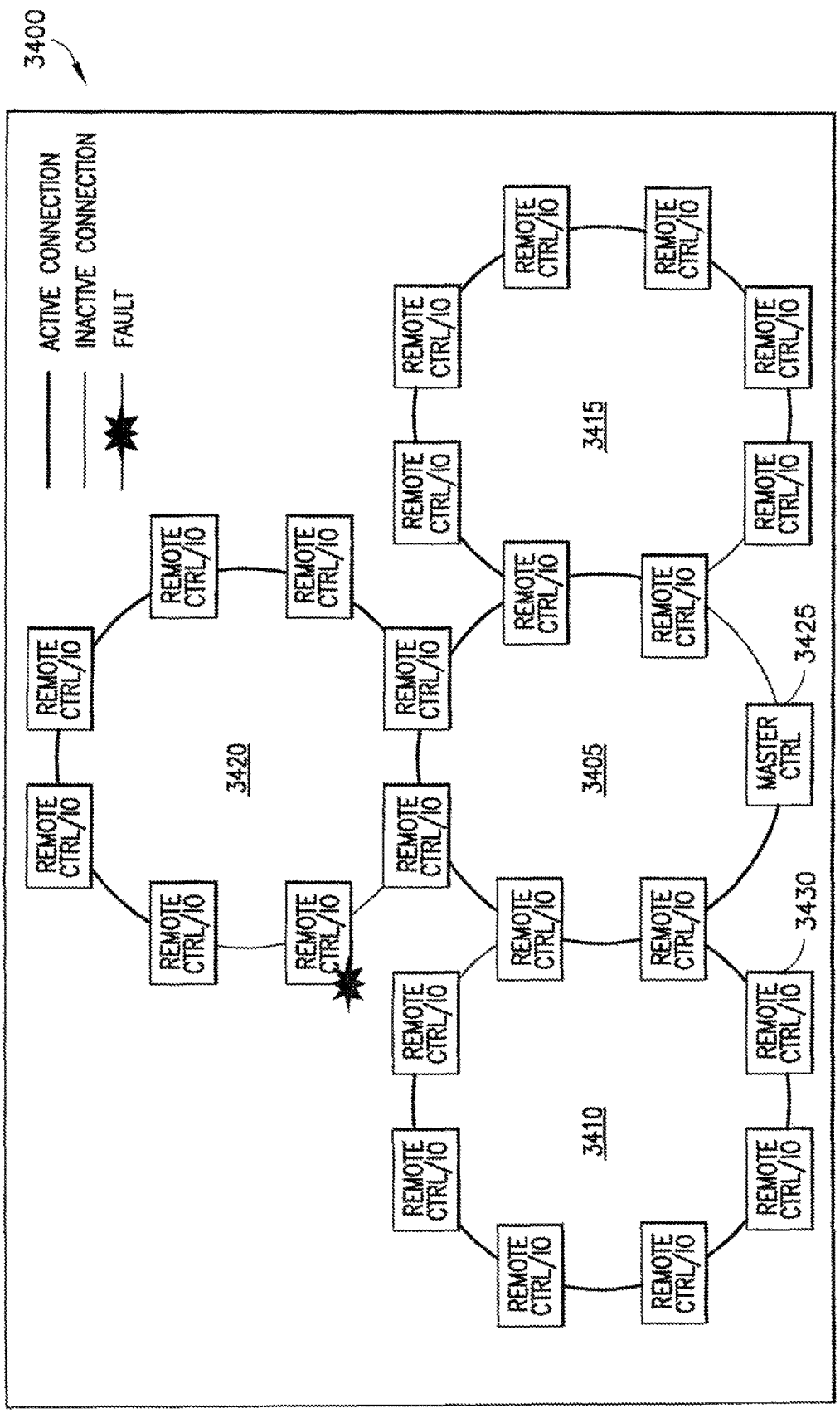

FIG. 34b shows the topology 3400 with a fault 3435 in a segment 3440 of the main loop 3405. As described above, the network 120 has disabled the now unused segment 3440 at the faulty node 3435 and has reconfigured itself to route communications through previously unused segment 3445. FIG. 34c shows the topology 3400 with a faulty node 3450, for example a faulty remote controller, in the main loop 3405. In this example, the network 120 has disabled segments 3455, 3460 and now routes communications through previously unused segment 3465. FIGS. 34d and 34e show similar exemplary failures and reconfiguration techniques in peripheral loop 3420.

In a simple ring topology, it may be relatively easy to identify a failure and switch to a redundant connection.

However, it may be substantially more difficult to enable such a self-organizing and self-healing functionality in a general system with multiple physical loops. The present embodiments offer a mechanism that utilizes the framework of any network implementation capable of utilizing redundant connections to compensate for failures to permit a control system with multiple physical loops in the communication network 120 to continue to function even as its configuration changes over time due to failures of segments or nodes.

The mechanism according to the present embodiments may also include a method for efficient buffering of trajectory frames, and a method for compensation for synchronization delays in the communication network.

Motion synchronization may be maintained in the clustered architecture control system 100 by synchronizing the clocks on all network nodes, including the master controller 105, cluster controllers 110, and remote and autonomous remote controllers 115. In one implementation, a synchronization message, also referred to as a cycle start message, may be sent by a node designated as a cycle master, which is typically the master controller 105.

The delay in receiving the synchronization message from the master controller 105 by a network node causes differences among clocks in the network nodes. The largest component of the delay is associated with repeater delays during the transmission of the synchronization message. Repeater delays refer to delays introduced by each node during the process of receiving the message and sending the message on to the next node until the message arrives at its destination. The total propagation delay for a given node may be assumed to be a cumulative sum of all repeater delays along the path from the master controller to the destination node.

The path of a cycle start message may be determined for each node from the network topology. The propagation delay may be estimated based on the message path. The estimated propagation delay for each node may be offset by adjusting the trajectory data in the PVT frames for that node.

In one approach for estimating the propagation delays, the master controller 105 may simply use a nominal value of 144 ns, based on the assumption that the network topology is designed so that the greatest propagation delay does not exceed 144 ns. In another approach, the repeater delay for each node may be predetermined and stored in a memory location, for example, within the node. The master controller may read the repeater delay for a particular node from the memory location. In one example, the repeater delay may be stored and read from a delay field in a node register, for example, a base PHY register.

The master controller 105 may then utilize the repeater delays to calculate a delay compensation for each node. In one embodiment, the master controller 105 may index the repeater delays by an Extended Unique Identifier (EUI-64) for nodes that report a EUI-64, and may use estimated values for nodes that do not.

Another method for estimating the total propagation delay from the master controller 105 to any of the nodes on the communications network 120 is for the master controller 105 to ping each node and record the response time to the ping. Alternately, the master controller may record the response to a PHY register request packet. The difference in the round-trip times for the ping or the request and response may be utilized as the cumulative propagation delay from the master controller to the different nodes on the communication network 120.

The delay compensation for each node may be recalculated by the master controller each time the communication network reconfigures itself.

Figure 38:
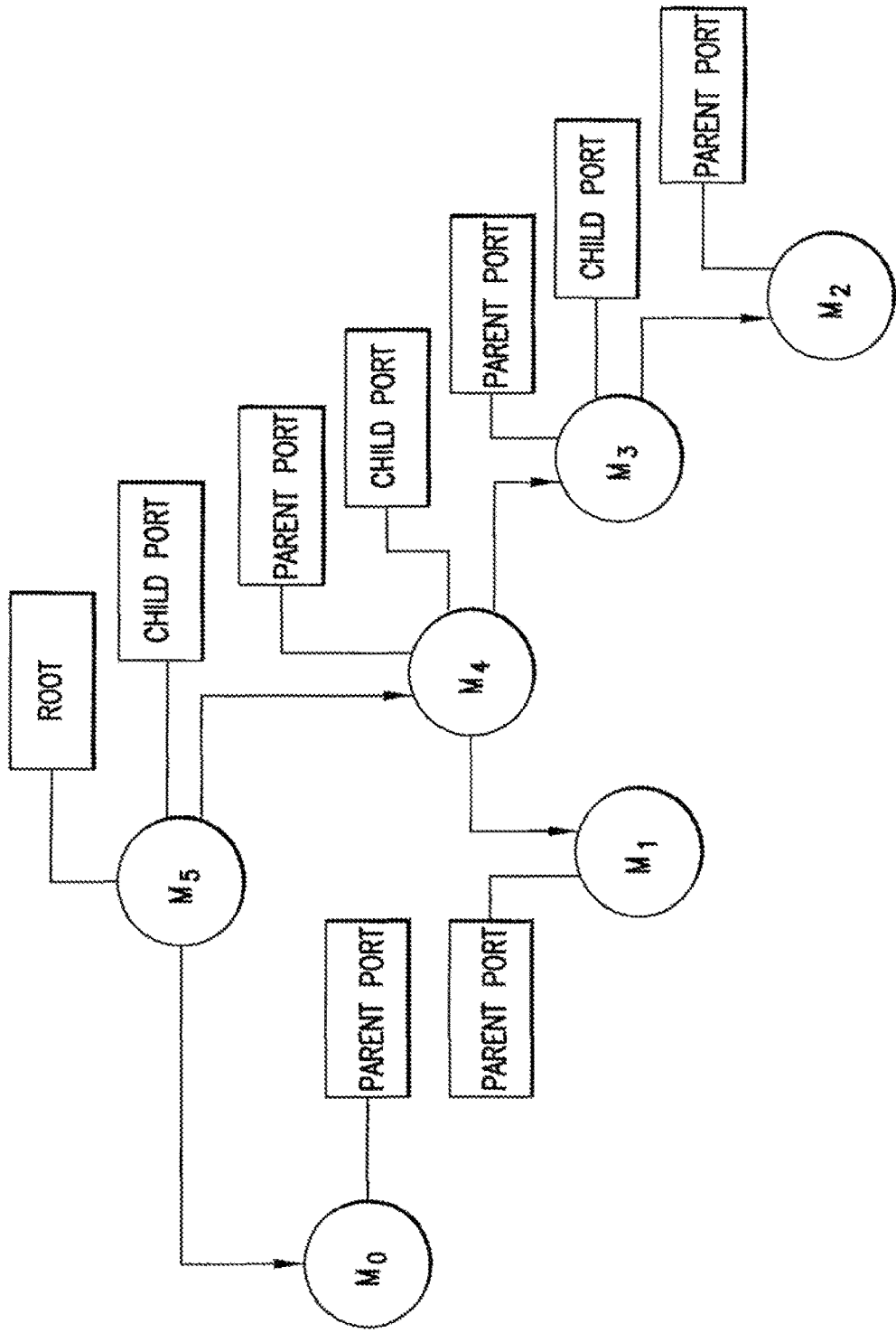
FIG. 38 shows a typical network self identification scheme.

FIG. 38 shows a result of a typical IEEE 1394b self-identification process. It is important to note that other network implementations may also be capable of such self-identification and that the disclosed embodiments are not limited to IEEE 1394b type networks.

Assuming that the path for node $M_0$ to the master (root) is defined by nodes $M_0, M_1, M_2, \ldots, M_n$, where $M_i$ are PHY id's and $M_n$ is the root ($M_0 < M1 < M2 < \ldots < M_n$), and denoting $p(M_i)$ as the parent of $M_i$ and the repeater delay for $M_i$ as $t(M_i)$, the total propagation delay for node $M_0$ is $\Sigma t(p(M_i))$, where $i=0, 1, 2, \ldots, n-2$.

The master controller 105 can be made aware of reconfiguration events by observing bus-reset and selfid-complete messages occurring on the communication network 120. The selfid-complete packets may provide enough information so that the master controller 105 may determine the new network topology and the paths from the master controller to each node. The path from each node to the master controller 105 may be uniquely defined by the concatenation of paths from any node to its parent node until the root is reached. The total propagation delay from each node may be determined from a sum of the repeater delays along that path. Once the total propagation delay for a node has been determined, the node may use the propagation delay information to offset trajectory data (PVT frames).

Figure 35:
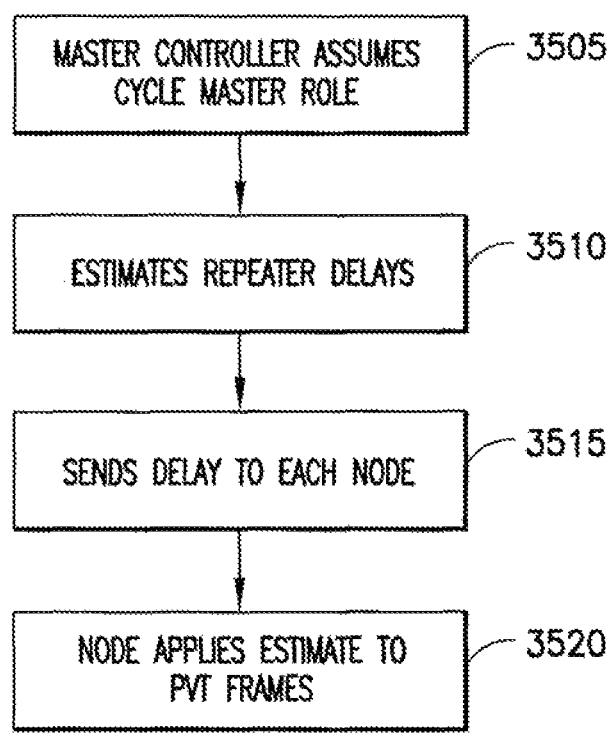
FIG. 35 shows a method of determining and applying repeater delays.

Referring to FIG. 35, the following procedure would be advantageous in recalculating propagation delays when the communication network 120 reconfigures as a result of a segment or node failure.

As shown in block 3505, the master controller 105 may generally obtain a cycle master role in the communication network 120 and, as shown in block 3510 may estimate the repeater delays for each node on the communication network 120 as described above. As shown in block 3515, the master controller sends the corresponding delay estimate to each node on the communication network 120. Each remote node on the communication network 120 applies the estimate received from the master controller 105 as a time offset when executing PVT frames as shown in block 3520. For instance, the time for execution of a given PVT frame can be calculated as the time field of the PVT frame minus the estimate of the propagation delay.

In another embodiment, the PVT or PVT-FG frames send by the master controller 105 may include an additional field called TIME_OFFSET which carries the propagation delay information.

Each network node may then apply the propagation delay information from the TIME_OFFSET field when executing PVT frames. For instance, the time for execution of a given PVT frame can be calculated as the time field of the PVT frame minus TIME_OFFSET.

In case of a topology change accompanied by a bus reset event, the remote node may discard the TIME_OFFSET field in the PVT frames that were buffered before the bus reset and are to be executed using the resynchronized clock after the bus reset, and may substitute the field with TIME_OFFSET information from the first PVT frame received after the bus reset.

FIG. 36 shows an exemplary PVT frame 3605 with an additional TIME_OFFSET field. The PVT frame 3605 includes position data 3610, velocity data 3615, and time data 3620. PVT frame 3605 may optionally include header information 3625 and trailing information 3630, both of which may include synchronizing, identification, parity, error correction, or other types of data. In addition, PVT frame 3605 may include a TIME_OFFSET field 3635 which includes propagation delay information for the node to which the frame is addressed.

It should be noted that while FIG. 36 shows the various information or data in specific locations or areas of the frame, the different types of information and data may be located anywhere within the PVT frame 3605. It should also be noted that the PVT frame 3605 is not limited to any particular length.

FIG. 37 shows an exemplary PVT-FG frame 3705 with an additional TIME_OFFSET field. PVT-FG frame 3705 includes optional header 3710 position 3715, velocity 3720, time 3725, and optional trailing information 3730, similar to PVT frame 3605. In addition, PVT frame 3705 may include a TIME_OFFSET field 3735 which includes propagation delay information for the node to which the frame is addressed.

Similar to PVT frame 3605, PVT-FG frame 3705 may include other data e.g. 3740 of varying lengths or amounts, distributed among or between the various terms.

As yet another approach, the propagation delays may be estimated directly on the network node. Each network node may determine the path from the master controller 105 based on the information in the self-id packets following a bus reset. Each node may then calculate an estimated delay essentially equal to the propagation delay, and apply the corresponding offset when executing PVT frames.

In the control system 100 events may occur that require one or more components to stop immediately, or to invoke some of the velocity limiting or force limiting features described above. These situations might adversely impact other components that interact with the affected component, and in some cases might unfavorably influence the entire control system.

It is a feature of the disclosed embodiments to divide the control system 100 into zones so that events requiring component stop, velocity limiting, or force limiting occurring in one zone may not affect the operation of the other zones. Another advantage of segregating the system into zones is that components or nodes of the control system 100 may be serviced, for example, in teach mode, or shut down with power removed, while other components or nodes continue to function.

A control system with multiple work zones may provides a global immediate stop functionality across all of the zones, and locally handle interlocks in each zone to provide access to selected zones while maintaining operations in other zones. Teach pendant and liveman functionality may also supported on a per-zone basis. Each zone may also have its own power distribution unit with integrated safety support.

Figure 39A:
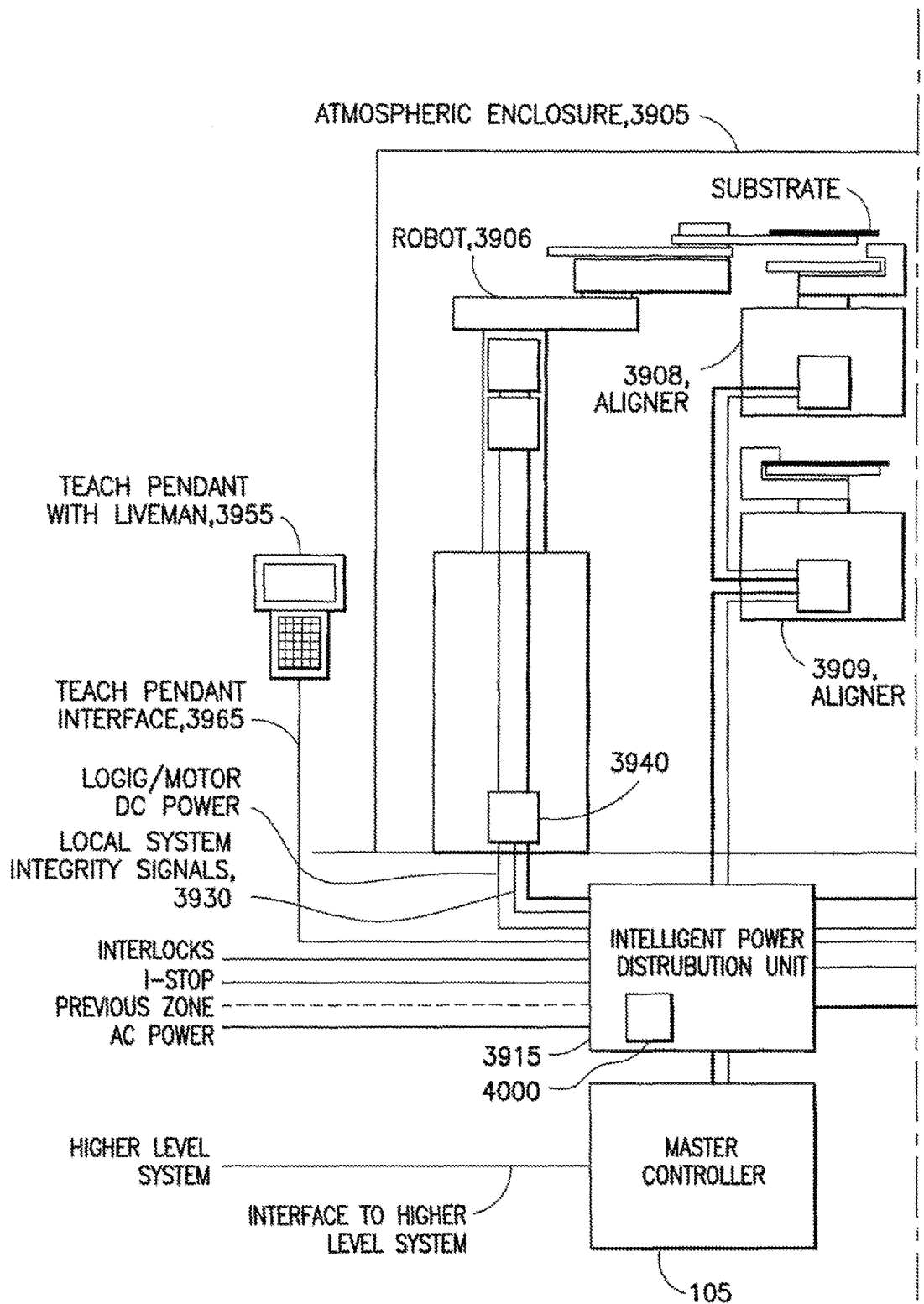
FIGS. 39(39a-39c) shows an example application of a control system with multiple zones.
Figure 39B:
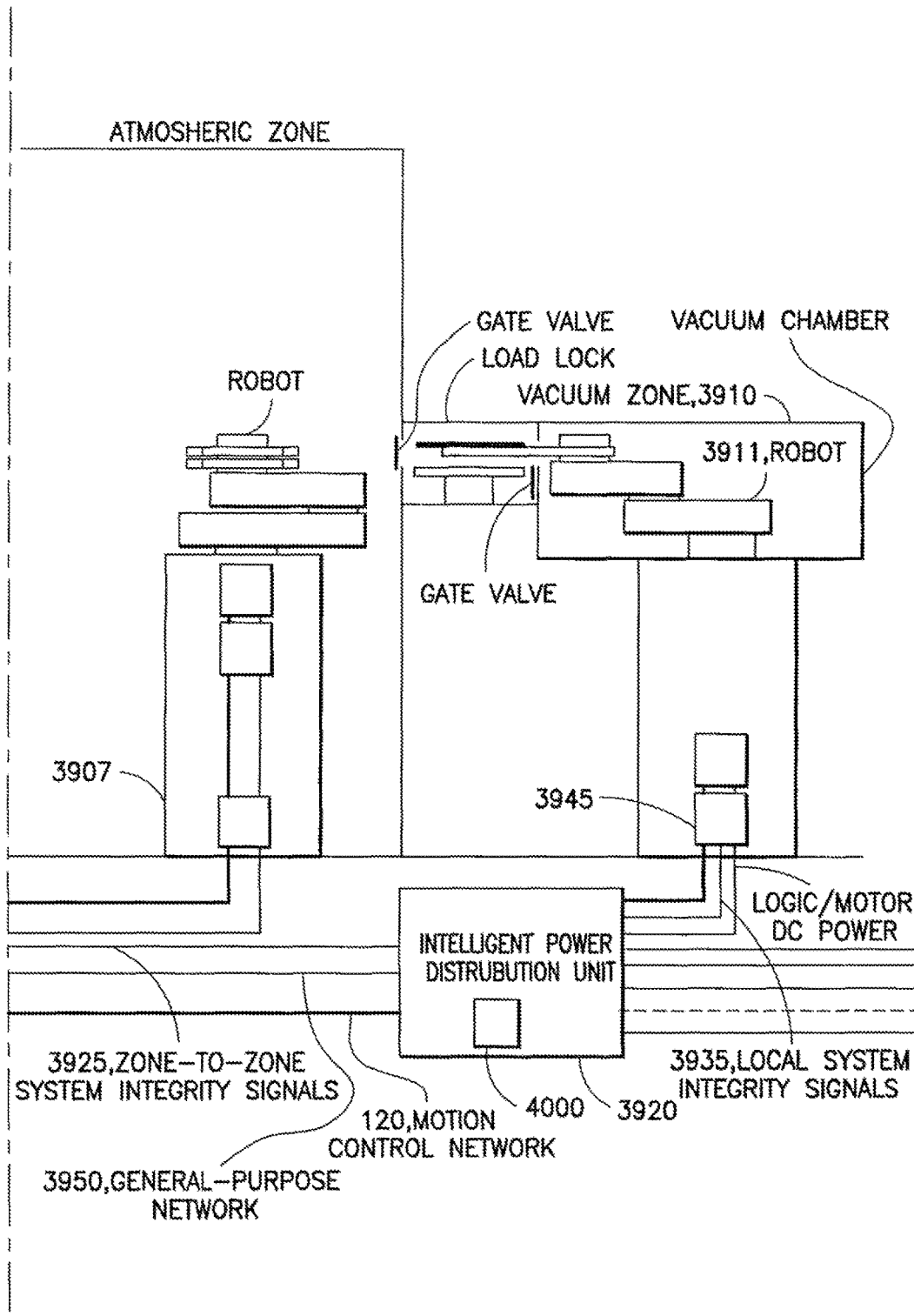
Figure 39C:
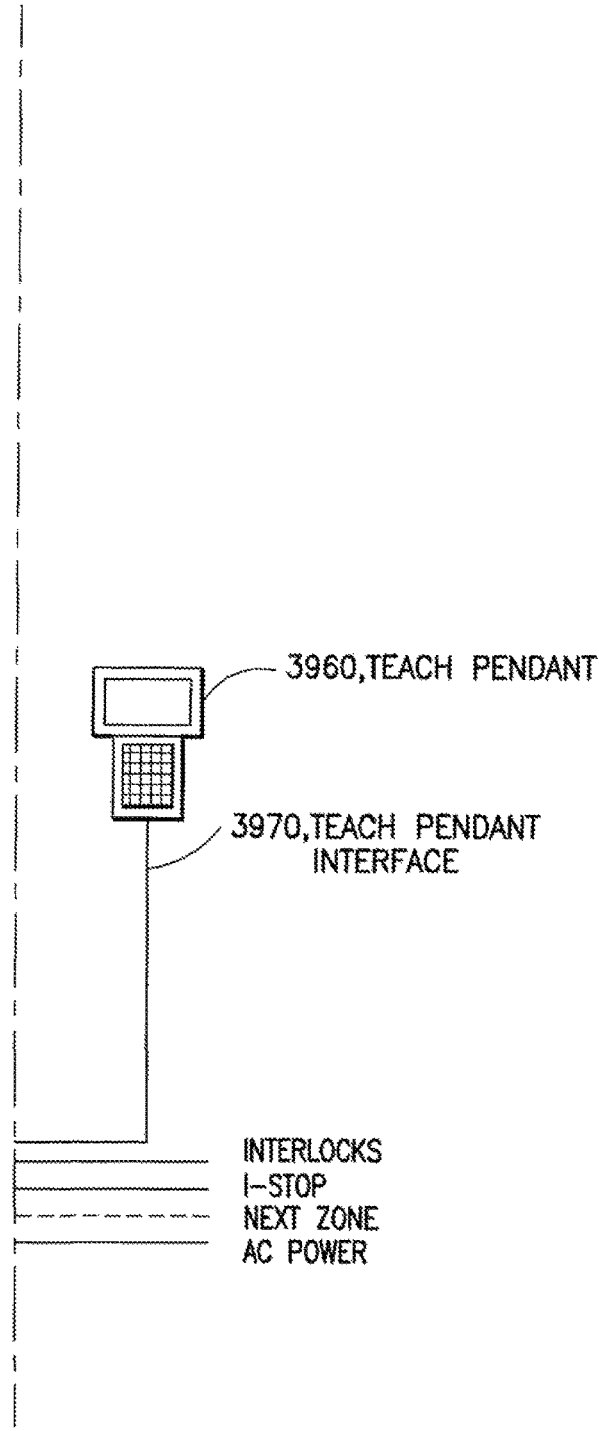

An example application of a control system with multiple zones according to the disclosed embodiments is shown in FIG. 39(39*a*-39*c*).

FIG. 39(39*a*-39*c*) shows a portion of control system 100 having an atmospheric zone 3905 and a vacuum zone 3910. The atmospheric zone 3905 includes two robots 3906, 3907 and two aligners 3909, 3908. Vacuum zone 3910 includes a robot 3911. Each zone may have an associated intelligent power distribution unit 3915, 3920 which may include a power control function 4000 as described above. Local system integrity signals 3930 are used to communicate I-stop, interlock or liveman events to the master controller 105 for initiating a controlled stop either globally or within a single zone. In this particular example, the local system integrity signals 3030 are fed to one a remote controller 3940, 3945 within each zone and communicated to the master controller 105. The master controller communicates to the components in each zone through the communication network 120.

In addition, a general communication network 3950, for example, an Ethernet network, may generally serve to accommodate communication of the control system with other subordinated or independent automation components, such as loadports in semiconductor substrate-handling applications, including communication with one or multiple teach pendants 3955, 3960. A teach pendant interface provides communication to the general communication network 3950, and may also include I-stop, lineman and pendant presence signals.

Each zone 3905, 3910 shares zone to zone integrity signals 3925 that include signals for interlocks, immediate stop indications, and the status of system AC power. A previous zone and next zone signal may be included that indicates the presence of adjacent zones.

The master controller operates to isolate motion in the zones 3905, 3910 so that events occurring in the atmospheric zone 3905 do not effect the operation of actions in the vacuum zone 3910. For example, in the event of a failure in the atmospheric zone 3905, the atmospheric zone may be disabled and brought to a controlled stop. While the embodiments serve to isolate the actions in one zone from another, they also provide the ability to communicate events among the zones and to the master controller that may warrant a coordinated controlled shutdown of more that one zone.

For example, the master controller may identify a zone to zone immediate stop signal as requiring a shut down of the atmospheric zone 3905. The master controller 105 may also shut down vacuum zone 3910 because it receives material from the atmospheric zone 3905. Alternately, the master controller may route work originally scheduled for the atmospheric zone 3905 to another zone in the control system 100.

Thus, the disclosed embodiments provide a method of maintaining the integrity of a control system network by assigning nodes of the network into zones such that motion in a first zone is isolated from motion in zones other than the first zone.

It has been observed that if some robots are stationary for a period of time they may have positional errors upon restarting. For example, upon startup after idle, the robot may not proceed to a proper location or place a substrate at a proper location within an acceptable operational tolerance. These errors may be due to the temperatures and relative locations of various components, lubricant viscosity, or any number of other factors. These errors are generally eliminated after a number of movements.

It is a feature of the disclosed embodiments to record the amount of time a robot is idle. If a certain idle time has been exceeded, performance characteristics of the robot may be determined. If the performance characteristics do not meet specifications, the robot may be directed to perform a warm up exercise. The warm up exercise may include one or more motions that provide enough movement to eliminate positional accuracy errors that surface as a result of the robot being idle.

In another aspect of the disclosed embodiments, if the idle time has been exceeded, the robot may be directed to perform the warm up exercise without determining the performance characteristics.

Figure 29:
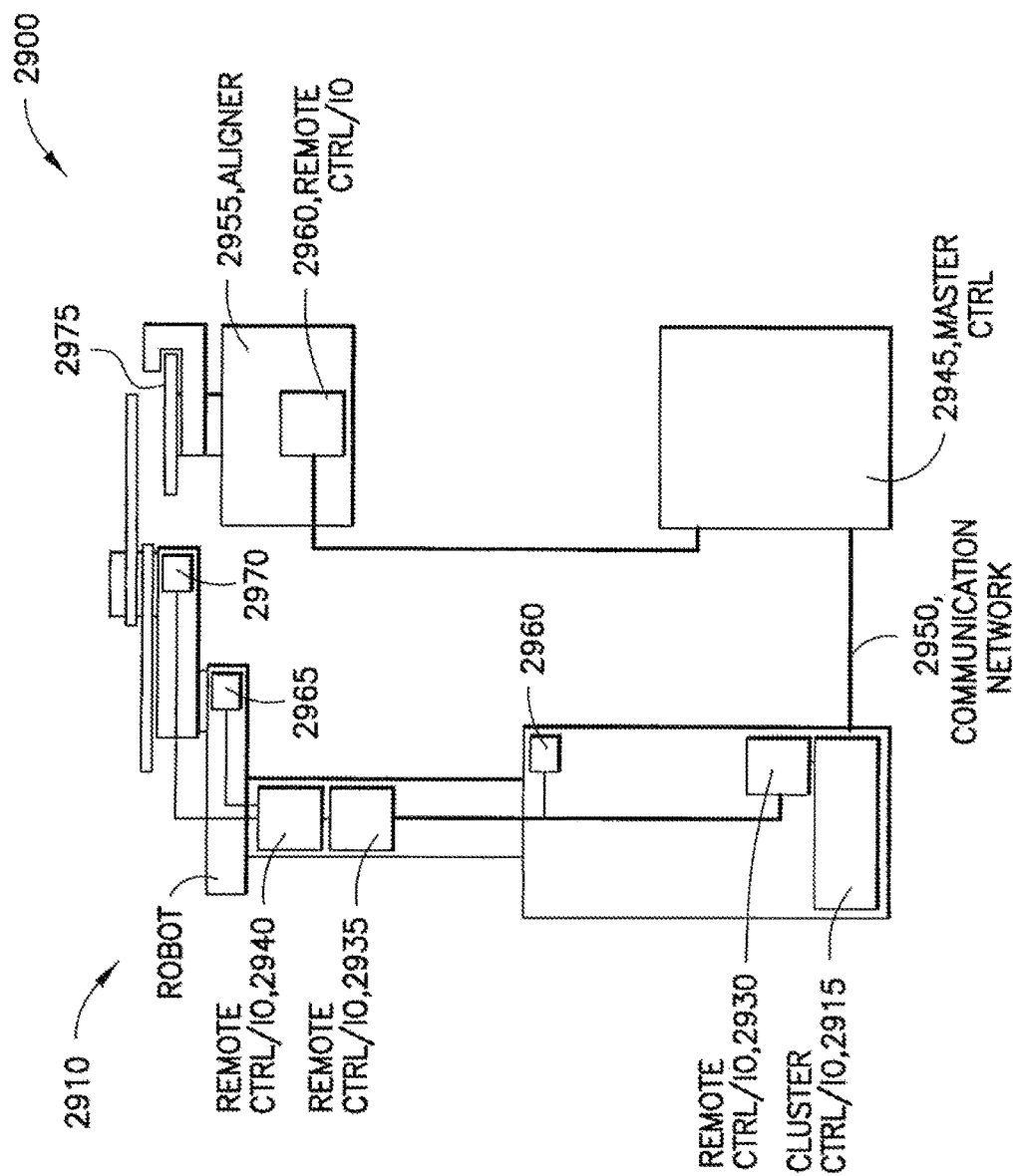
FIG. 29 shows a diagram of a work cell suitable for implementing a robot warm up exercise.

FIG. 29 shows a work cell 2900 in which this embodiment may be implemented. Work cell 2900 includes a robot 2910 with a cluster controller 2915 and three remote controllers 2930, 2935, 2940. The cluster controller 2915 communicates with a master controller 2945 through a communications network 2950. The work cell 2900 may also include an aligner 2955 which may be controlled by a remote controller 2960. The remote controller 2960 may be controlled by the master controller 2945. The work cell 2900 may optionally include one or more sensors 2960, 2965, 2970 that sense the position of the robot. In one embodiment, the sensors 2960, 2965, 2970 may be mounted on or otherwise incorporated into robot 2910. In an exemplary embodiment, the work cell 2900 may be part of the clustered architecture control system 100 (FIG. 1,1a-1b).

Referring back to FIG. 3, cluster controller 2915 generally includes a processor 305, read only memory 310, random access memory 315, program storage 320, and a network interface 330 to network 120. Processor 305 is generally operable to read information and programs from a computer program product, for example, a computer useable medium, such as on board programmable memory 335, read only memory 310, random access memory 315, and program storage 320.

On board programmable memory 335, read only memory 310, random access memory 315, and program storage 320 may include programs for determining performance characteristics of robot 2910 and for directing robot 2910 through the motions of the warm up exercise.

Exemplary operations of the disclosed embodiments will now be described while referring to FIGS. 29 and 30.

While the functions associated with determining a robot idle time, robot performance characteristics, and implementing a robot warm up exercise are described primarily as being performed by the cluster controller 2915, it should be understood that the functions may be performed by the master controller 2945, a remote controller 2930, 2935, 2940, any suitable component of the work cell 2900, or any suitable component of the clustered architecture control system 100 (FIG. 1,1a-1b) when the work cell 2900 is part of such a system.

Furthermore, while the idle time, performance characteristics, and warm up exercise are generally associated with the robot 2910, the functions associated with determining these functions and characteristics may also be implemented for individual axes or joints of a robot, other components of the work cell 2900, or for other clustered architecture control system components.

The cluster controller 2915 may be equipped with circuitry or programs that recognize when the robot 2910 is in an idle state. For example, the robot 2910 may receive an express command to enter a stand by mode, to shut down, or simply may not receive any motion commands for a certain time. As shown in block 3010, the cluster controller 2915 determines that the robot 2910 is idle, and as shown in block 3015 saves a time stamp as an indication of the time that the idle state was determined.

The cluster controller 2915 monitors commands sent to the robot 2910 as shown in block 3020. If a motion command is received, the cluster controller 2915 retrieves the time stamp and determines how long the robot has been idle as shown in block 3025. As shown in block 3030, if an idle time threshold has been exceeded, the cluster controller may then issue a warm up exercise to the robot 2910 in the form of for example, one or more motion commands that generally provide enough movement to eliminate positional accuracy errors due to the robot being idle, as shown in block 3035. After executing the warm up exercise, the robot may then execute the motion command, as shown in block 3045.

Figure 30:
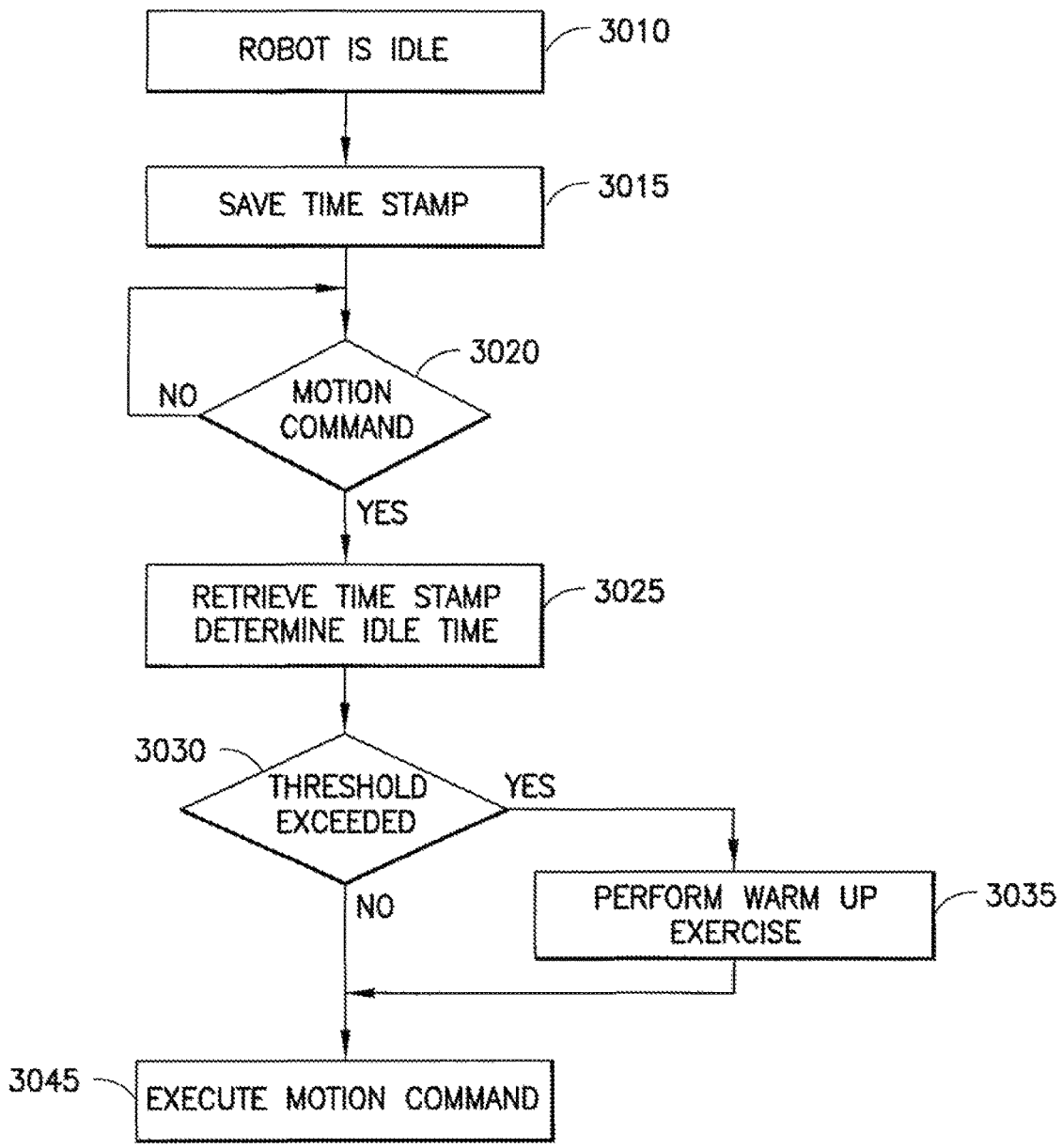
FIG. 30 shows a flow diagram of an implementation of a robot warm up exercise procedure.
Figure 31:
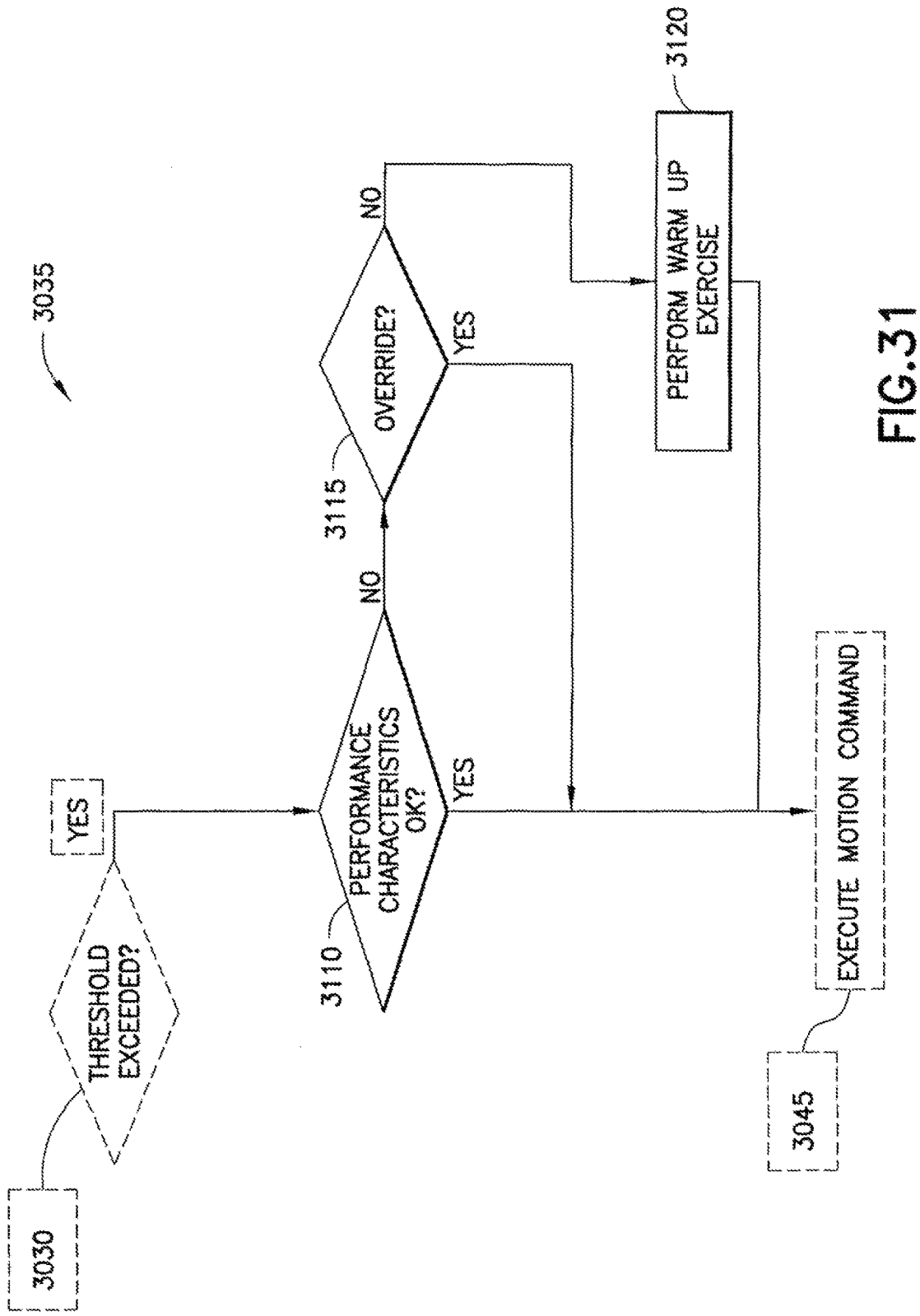
FIG. 31 shows a flow diagram of an alternative robot warm up exercise procedure.

FIG. 31 shows an alternate procedure for block 3035 of FIG. 30. As shown in block 3110, if the idle time threshold has been exceeded, the cluster controller 2915 may check the performance characteristics of the robot 2910. For example, the cluster controller 2915 may issue a test motion command to the robot and then may check sensors 2960, 2965, 2970 to ensure that the robot executed the command within specifications. As another example, the cluster controller may check the performance characteristics by instructing the robot 2910 to place a substrate 2975 on aligner 2955 and then checking the alignment of the placed substrate.

If the performance characteristics are within specification, the cluster controller 2915 may allow the robot to execute the motion command, as shown in block 3045 of FIG. 31. If the specifications are not met, the cluster controller 2915 may issue an alert to an operator or a request to assist, for example through user interface 225 (FIG. 2), requesting an override, as shown in block 3115. As another alternative, the cluster controller 2915 may stop the operation of the robot 2910 until a user intervenes. Once an override has been provided, the robot may then execute the motion command as shown in block 3045 of FIG. 31.

It can be seen that the disclosed embodiments provide a mechanism for compensating for robot placement errors by executing a warm up exercise. In one aspect of the embodiments, the warm up procedure may be performed if the robot has been idle for a certain period of time. As a further refinement, the performance characteristics of the robot may be determined and the warm up exercise may be performed if certain specifications are not met. The warm up exercise may include one or more motions that provide enough movement to eliminate positional accuracy errors that surface as a result of the robot being idle.

In a complex control system it may be advantageous to utilize a standardized set of interface conventions for accessing the system components. These may be provided by an application program interface (API) that may include a set of commands, parameters, variables, etc. that provide a user with a common form for communicating with various system components.

It is a feature of the disclosed embodiments to provide an API that includes a generalized command set that allows the use of a general command to perform an operation and specific arguments to identify particular components, locations, and other parameters for performing the operation.

It is another feature of the disclosed embodiments that, through the API, the actual motions to accomplish the operation may vary depending on the arguments. For example, using a "PickFrom" command specifying a robot and an aligner as the location may result in an entirely different set of movements than specifying a robot and a loadport as the location.

Figure 42A:
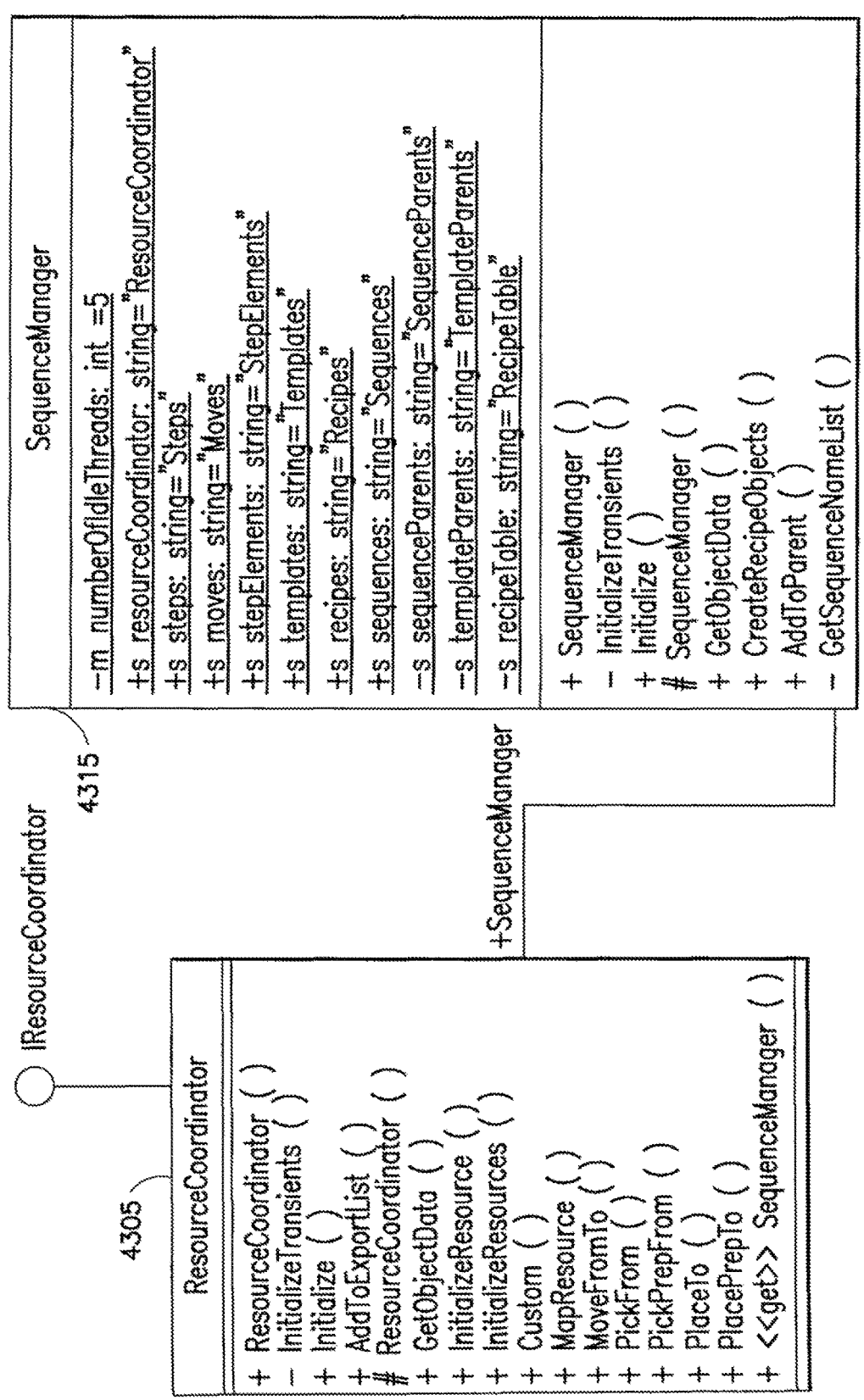
FIGS. 42(42a-42c) shows a block diagram of an application program interface.

Referring to FIG. 42(42a-42c), the API may include a number of objects including a resource coordinator 4305, a sequence recipe 4310, and a sequence manager 4315. Commands from the resource coordinator 4305 are populated into the sequence recipe 4310. The sequence recipe 4310 then presents the sequence manager 4315 with a sequence of commands and the sequence manager 4315 assigns resources and causes the command sequence to execute. The API may include a set of commands as described below. Each command generally includes a command name followed by command arguments. In the commands of the disclosed embodiments the terms actor, resource, and robot refer to any device capable of performing an operation.

A command for picking material from a specified material source location using a specified robot location may be called a PickFrom command and may have the following format.

PickFrom(IRobot robot, int robotLocation, IMaterialHolder materialSource, int sourceLocation)

where: robot specifies the primary actor for the pick operation;
  robotLocation specifies the actor index, usually the tip to be used for the pick operation;
  materialSource specifies the device that currently holds the material; and
  sourceLocation specifies the index into the device the material resides in.

A command for placing material to a specified material destination location using a specified robot location may be called a PlaceTo command and may have the following format.

PlaceTo(IRobot robot, int robotLocation, IMaterialHolder materialDestination, int destinationLocation)

where robot specifies the primary actor(robot) for the place operation;
  robotLocation specifies the actor index, usually the tip the material resides in;
  materialDestination specifies the destination object; and
  destinationLocation specifies the index into the destination object.

A command for executing part of a PickFrom operation to a configured point may be called PickPrep command. A PickPrep command may generally be used to move a robot close to a specified material source to increase tool throughput. The operation may stop at a configured point unless a PickFrom command is sent prior to robot deceleration.

The PickPrep command may have the following form.

PickPrep(IRobot robot, int robotLocation, IMaterialHolder materialSource, int sourceLocation)

where robot specifies the primary actor for the pick operation;
  robotLocation specifies the actor index, usually the tip to be used for the pick operation;
  materialSource specifies the device that currently holds the material; and
  sourceLocation specifies the index into the device the material resides in.

A command that executes part of a PlaceTo operation to a configured point may be called a PlacePrep command. A PlacePrep command may generally be used to move a robot close to a specified material source to increase tool throughput. The operation may stop at the configured point unless a PlaceTo command is sent prior to robot deceleration.

The PlacePrep command may have the following form.

PlacePrep(IRobot robot, int robotLocation, IMaterialHolder materialDestination, int destinationLocation)

where robot specifies the primary actor(robot) for the place operation;
  robotLocation specifies the actor index, usually the tip the material resides in;
  materialDestination specifies the destination object; and
  destinationLocation specifies the index into the destination object.

A command that moves a substrate from a material source location to a destination location using a specified robot location may be called a MoveFromTo command and may have the following form.

MoveFromTo(IRobot robot, int robotLocation, IMaterialHolder materialSource, in sourceLocation IMaterialHolder materialDestination, int destinationLocation)

where robot specifies the primary actor to be used for the operation;
  robotLocation specifies the actor index usually tip to be used for operation;
  materialSource specifies the object that currently holds the material;
  sourceLocation specifies the index into the object the material resides in;
  materialDestination specifies the destination object; and
  DestinationLocation specifies the index into the destination object.

A command that maps a specified resource using a specified mapping device may be referred to as a MapResource command. Mapping a resource may include determining if the resource is holding or supporting any items and may also include determining the location of the items being held or supported. The MapResource command may also update a record of the state of locations in the specified resource to an appropriate value, for example, occupied, unoccupied, etc.

The MapResource command may have the following form.

MapResource(IMapper mapper, IMaterialHolder resource)

where mapper identifies a device capable of mapping the specified resource; and
  resource identifies a device requiring mapping.

A command for initializing a specified resource to a ready condition may be referred to as an InitializeResource command. For example; if the resource is a robot the InitializeResource command will cause the robot to move to a known position, or home and then to move to a safe position. This command may also reset a locking mechanism of the resource in the event that the mechanism has been enabled.

The InitializeResource command may have the following form.

InitializeResource(IWorkcellObject resource)

where resource specifies a resource to initialize.

A command for initializing resources based on a strategy or a recipe may also be referred to as an InitializeResources command. In the event that a strategy or recipe is not specified, a standard or default recipe could be to initialize robots first and then attached modules.

The InitializeResources command that utilizes a strategy may have the form:

InitializeResources(recipe)

where recipe specifies an initialization strategy.

It can be seen that the disclosed embodiments provide an API that allows the use of a general command to perform an operation with specific arguments to identify particular components, locations, and other parameters for performing the operation. Thus, the disclosed embodiments describe a networked control system that has the advantages of both centralized and distributed controls, that is flexible and scalable, that provides model based control, synchronizes component operations, and provides protocol extensions specifically for a system of this architecture. The control system also provides distributed event capture and an application program interface. In addition, the system includes a wireless communication capability, accommodates human presence in a component workspace, provides a high level of system integrity, provides for power losses and circumstances that require an immediate stop, and provides a warm-up capability to eliminate positional errors due to a robot's sitting idle.

What is claimed is:

1. A method for controlling an axis of a control system comprising:
   calculating an operating parameter value describing a predetermined trajectory of the end effector of the axis and defining a predetermined force value of the end effector of the axis along at least a continuous portion of the predetermined trajectory generated in a first mode of axis operation, which predetermined force value is different than a corresponding predetermined force value of the end effector along at least the continuous portion of the predetermined trajectory generated in a second mode of axis operation; and
   generating a motion profile for an individual joint of the axis such that a motion profile for the end effector along the at least continuous portion of the predetermined trajectory does not exceed the predetermined force value of the end effector in the first mode of axis operation.

2. The method of claim 1, wherein the operating parameter value is a maximum velocity.

3. The method of claim 1, wherein the operating parameter value is a maximum torque.

4. A method for controlling an axis comprising:
   calculating, with a controller, a velocity and a torque for a position of the axis describing a predetermined trajectory of the end effector of the axis;
   calculating, with the controller, a predetermined first maximum time period during which an axis velocity along the predetermined trajectory may exceed the calculated velocity along the predetermined trajectory;
   calculating, with the controller, a predetermined second maximum time period during which an axis torque along the predetermined trajectory may exceed the calculated torque along the predetermined trajectory; and
   disabling, with the controller, the axis if one or more of the predetermined first maximum time period and the predetermined second maximum time period is exceeded along the predetermined trajectory.

5. The method of claim 4, comprising disabling the axis if the calculated velocity exceeds a predetermined maximum velocity.

6. The method of claim 5, comprising disabling the axis if the calculated torque exceeds a predetermined maximum torque.

7. The method of claim 4, comprising disabling the axis upon failure to receive a periodic communication from the axis.

8. The method of claim 4, comprising disabling the axis upon failure to receive a periodic communication from an axis controller.

* * * * *